US012580717B2

(12) United States Patent
Manolakos et al.

(10) Patent No.: US 12,580,717 B2
(45) Date of Patent: Mar. 17, 2026

(54) ACTIVATION OR DEACTIVATION OF MULTIPLE DOWNLINK (DL) OR UPLINK (UL) POSITIONING REFERENCE SIGNALS (PRS) WITH A SINGLE MAC-CE COMMAND

(71) Applicant: QUALCOMM Incorporated, San Diego, CA (US)

(72) Inventors: Alexandros Manolakos, Escondido, CA (US); Sony Akkarakaran, Poway, CA (US); Sven Fischer, Nuremberg (DE)

(73) Assignee: QUALCOMM Incorporated, San Diego, CA (US)

( * ) Notice: Subject to any disclaimer, the term of this patent is extended or adjusted under 35 U.S.C. 154(b) by 353 days.

(21) Appl. No.: 17/793,568

(22) PCT Filed: Dec. 18, 2020

(86) PCT No.: PCT/US2020/066203
§ 371 (c)(1),
(2) Date: Jul. 18, 2022

(87) PCT Pub. No.: WO2021/162784
PCT Pub. Date: Aug. 19, 2021

(65) Prior Publication Data
US 2023/0076043 A1     Mar. 9, 2023

(30) Foreign Application Priority Data
Feb. 12, 2020     (GR) ............................... 20200100070

(51) Int. Cl.
| | |
|---|---|
| *H04L 5/00* | (2006.01) |
| *H04W 16/28* | (2009.01) |
| *H04W 80/02* | (2009.01) |

(52) U.S. Cl.
CPC .......... *H04L 5/0098* (2013.01); *H04L 5/0051* (2013.01); *H04W 16/28* (2013.01); *H04W 80/02* (2013.01)

(58) Field of Classification Search
CPC ... H04L 5/0098; H04L 5/0051; H04L 5/0023; H04L 5/0048; H04L 5/0091;
(Continued)

(56) References Cited

U.S. PATENT DOCUMENTS

2017/0111880 A1* 4/2017 Park ...................... H04W 64/00
2019/0281588 A1* 9/2019 Zhang .................. H04B 7/0617
(Continued)

FOREIGN PATENT DOCUMENTS

| CN | 104115422 A | 10/2014 |
|---|---|---|
| EP | 4020869 A1 | 6/2022 |

OTHER PUBLICATIONS

Huawei, et al., "Considerations on UL Procedures for NR Positioning", 3GPP Draft, 3GPP TSG-RAN WG2 Meeting #108, R2-1914979, 3rd Generation Partnership Project (3GPP), Mobile Competence Centre, 650, Route Des Lucioles, F-06921, Sophia-Antipolis Cedex, France, vol. RAN WG2, No. Reno, US; Nov. 18, 2019-Nov. 22, 2019, Nov. 8, 2019 (Nov. 8, 2019), XP051816914, 8 pages, Retrieved from the Internet: URL: https://ftp.3gpp.org/tsg_ran/WG2_RL2/TSGR2_108/Docs/R2-1914979.zip R2-1914979 Considerations on UL procedures for NR positioning.docx [retrieved on Nov. 8, 2019] pp. 1-4, 2 UE related procedures pp. 4-6, 3 UL Supporting procedures.

(Continued)

*Primary Examiner* — Yu-Wen Chang
(74) *Attorney, Agent, or Firm* — QUALCOMM Incorporated

(57) ABSTRACT
A user equipment (UE) receives configurations for multiple downlink (DL) positioning reference signals (PRS), multiple
(Continued)

uplink (UL) PRS, or a combination thereof. A single Medium Access Control-Control Element (MAC-CE) block from a serving base station is provided that activates or deactivates in the UE the transmissions of the multiple UL PRS; reception of the multiple DL PRS, or a combination thereof, and in response the UE activates or deactivates the transmission and/or reception of the multiple UL PRS and/or DL PRS. The MAC-CE block, for example, may identify multiple UL PRS resource sets, each of which includes at least one PRS resource, for activation or deactivation. The MAC-CE block may additionally or alternatively, identify multiple DL PRS resources, multiple DL PRS resource sets, or multiple DL PRS frequency layers for activation or deactivation.

42 Claims, 15 Drawing Sheets

(58) Field of Classification Search
CPC ..... H04W 16/28; H04W 80/02; H04W 64/00; H04W 72/046
See application file for complete search history.

(56) References Cited

U.S. PATENT DOCUMENTS

| | | | | |
|---|---|---|---|---|
| 2020/0358576 | A1* | 11/2020 | Zarifi | H04L 5/0051 |
| 2021/0076359 | A1* | 3/2021 | Sosnin | H04W 72/56 |
| 2021/0184812 | A1* | 6/2021 | MolavianJazi | H04L 1/0041 |
| 2022/0038239 | A1* | 2/2022 | Guo | G01S 5/0236 |
| 2022/0086601 | A1* | 3/2022 | Qi | H04L 5/0048 |
| 2022/0110085 | A1* | 4/2022 | Khoryaev | H04W 64/003 |
| 2022/0209927 | A1* | 6/2022 | Shreevastav | H04L 5/0096 |
| 2022/0268873 | A1* | 8/2022 | Shi | H04L 5/0051 |
| 2022/0271888 | A1* | 8/2022 | Cha | H04W 52/32 |
| 2022/0295441 | A1* | 9/2022 | Michalopoulos | H04W 64/00 |
| 2022/0295442 | A1* | 9/2022 | Goyal | H04W 64/00 |
| 2022/0368488 | A1* | 11/2022 | Berggren | H04L 5/0094 |
| 2023/0344589 | A1* | 10/2023 | Shreevastav | H04L 5/0023 |

OTHER PUBLICATIONS

International Search Report and Written Opinion—PCT/US2020/066203—ISA/EPO—Apr. 8, 2021.
Oppo: "Discussion on Physical-Layer Procedures for NR Positioning", 3GPP Draft, 3GPP TSG RAN WG1 #99, R1-1911850, 3rd Generation Partnership Project (3GPP), Mobile Competence Centre, 650, Route Des Lucioles, F-06921, Sophia-Antipolis Cedex, France, vol. RAN WG1, No. Reno, USA, Nov. 18, 2019-Nov. 22, 2019, Nov. 8, 2019 (Nov. 8, 2019), XP051819871, 6 pages, Retrieved from the Internet: URL: https://ftp.3gpp.org/tsg_ran/WG1_RL1/TSGR1_99/Docs/R1-1911850.zip R1-1911850.docx [retrieved on Nov. 8, 2019] the whole document.
Qualcomm Incorporated: "On UE Rx-Tx Time Difference Measurements for NR Positioning", 3GPP Draft, 3GPP TSG-RAN WG4 Meeting #93, R4-1915191, 3rd Generation Partnership Project (3GPP), Mobile Competence Centre, 650, Route Des Lucioles, F-06921, Sophia-Antipolis Cedex, France, vol. RAN WG4, No. Reno, NV, USA; Nov. 18, 2019-Nov. 22, 2019, Nov. 8, 2019 (Nov. 8, 2019), XP051819429, 5 pages, Retrieved from the Internet: URL: https://ftp.3gpp.org/tsg_ran/WG4_Radio/TSGR4_93/Docs/R4-1915191.zip R4-1915191—On UE Rx-Tx time difference measurements for NR positioning.docx [retrieved on Nov. 8, 2019], the whole document.
Qualcomm Incorporated: "Stage 2 for Multi-RTT Positioning", 3GPP Draft, 3GPP TSG-RAN WG2 Meeting #108, R2-1915558, 3rd Generation Partnership Project (3GPP), Mobile Competence Centre, 650, Route Des Lucioles, F-06921, Sophia-Antipolis Cedex, France, vol. RAN WG2, No. Reno, Nevada, USA, Nov. 18, 2019-Nov. 22, 2019, Nov. 8, 2019 (Nov. 8, 2019), XP051817272, 19 Pages, Retrieved from the Internet: URL: https://ftp.3gpp.org/tsg_ran/WG2_RL2/TSGR2_108/Docs/R2-1915558.zip R2-1915558 (TP for mRTT Stage 2).docx [retrieved-on Nov. 8, 2019] pp. 1-11, p. 2, paragraph 1 and 2, p. 12, paragraph 3.1, paragraph [8. x.2. 2], figures 8.x.3.1.3.1-1.

* cited by examiner

| A/D | SRS Resource Set's Cell ID | SRS Resource Set's BWP ID | | Oct 1 |
|---|---|---|---|---|

| R | P | C | SUL | SP SRS Resource Set ID | Oct 2 |
|---|---|---|---|---|---|

| $F_0$ | Resource $ID_0$ | | Oct 3 |
|---|---|---|---|

...

| $F_{M-1}$ | Resource $ID_{M-1}$ | Oct N-M |
|---|---|---|

| R | Resource Serving Cell $ID_0$ | Resource BWP $ID_0$ | Oct N-M+1 |
|---|---|---|---|

...

| R | Resource Serving Cell $ID_{M-1}$ | Resource BWP $ID_{M-1}$ | Oct N |
|---|---|---|---|

600

606

604

| | CC ID | BWP ID |
|---|---|---|
| PRS Set ID1 | PRS Set ID2 | . . . | PRS Set IDN |

602

700

704

| A/D | | |
|---|---|---|
| PRS Set ID1 | PRS Set ID2 | . . . | PRS Set IDN |

702

800

802

| | | |
|---|---|---|
| PRS Set ID1 | PRS Set ID2 | . . . | PRS Set IDN |
| Spatial Relation Info Type | | |

804

910 ⌐

| PRS Set ID1 | PRS Set ID2 | . . . | PRS Set IDN |

912

900 ⌐

Identifier of Set(s)

902

1000 ⌐

1002

| PRS Set ID1 | PRS Set ID2 | . . . | PRS Set IDN |

Spatial Relation Info Identifier

1004

1110 ⟍

| DL PRS Set ID1 / UL PRS Set ID1 | DL PRS Set ID2 / UL PRS Set ID2 | · · · | DL PRS Set IDN / UL PRS Set IDN |
|---|---|---|---|

1112

1100 ⟍

| | | | |
|---|---|---|---|
| | | | Identifier of Set(s) |

1102

1200 ⟍

| | | | |
|---|---|---|---|
| DL PRS ID1 / UL PRS ID1 | DL PRS ID2 / UL PRS ID2 | · · · | DL PRS IDN / UL PRS IDN |
| QCL Source | | | |

1202

1204

1500

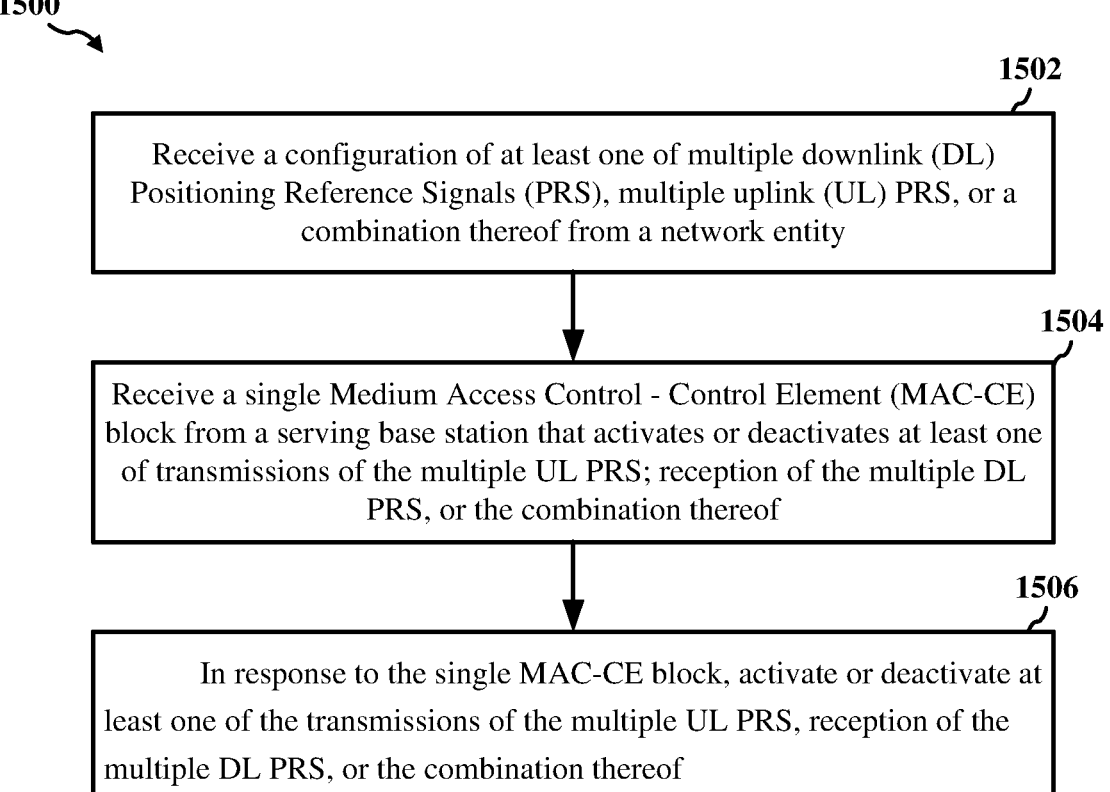

1502

Receive a configuration of at least one of multiple downlink (DL) Positioning Reference Signals (PRS), multiple uplink (UL) PRS, or a combination thereof from a network entity

1504

Receive a single Medium Access Control - Control Element (MAC-CE) block from a serving base station that activates or deactivates at least one of transmissions of the multiple UL PRS; reception of the multiple DL PRS, or the combination thereof

1506

In response to the single MAC-CE block, activate or deactivate at least one of the transmissions of the multiple UL PRS, reception of the multiple DL PRS, or the combination thereof

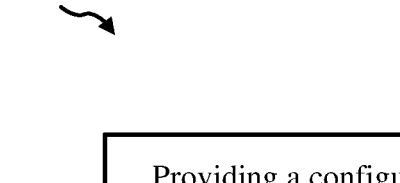

1602

Providing a configuration of at least one of multiple downlink (DL) Positioning Reference Signals (PRS), multiple uplink (UL) PRS, or a combination thereof to the UE

1604

Transmit a single Medium Access Control - Control Element (MAC-CE) block to the UE that activates or deactivates in the UE at least one of transmissions of the multiple UL PRS; reception of the multiple DL PRS, or the combination thereof

1606

In response to the single MAC-CE block, receiving or stop receiving from the UE the transmissions of the multiple UL PRS, transmitting or stop transmitting to the UE multiple DL PRS, or a combination thereof

*FIG. 16*

ACTIVATION OR DEACTIVATION OF MULTIPLE DOWNLINK (DL) OR UPLINK (UL) POSITIONING REFERENCE SIGNALS (PRS) WITH A SINGLE MAC-CE COMMAND

CROSS REFERENCE TO RELATED APPLICATIONS

This application is a National Stage Entry filed under 35 U.S.C. 371 of PCT/US2020/066203, filed on Dec. 18, 2020, entitled "ACTIVATION OR DEACTIVATION OF MULTIPLE DOWNLINK (DL) OR UPLINK (UL) POSITIONING REFERENCE SIGNALS (PRS) WITH A SINGLE MAC-CE COMMAND," which claims priority to Greek patent application No. 20200100070, filed on Feb. 12, 2020, entitled "ACTIVATION OR DEACTIVATION OF MULTIPLE DOWNLINK (DL) OR UPLINK (UL) POSITIONING REFERENCE SIGNALS (PRS) WITH A SINGLE MAC-CE COMMAND," both of which are assigned to the assignee hereof and are expressly incorporated herein by reference in their entirety.

FIELD OF THE DISCLOSURE

Aspects of the disclosure relate generally to wireless communications and the like.

BACKGROUND

Wireless communication systems have developed through various generations, including a first-generation analog wireless phone service (1G), a second-generation (2G) digital wireless phone service (including interim 2.5G networks), a third-generation (3G) high speed data, Internet-capable wireless service, and a fourth-generation (4G) service (e.g., Long-Term Evolution (LTE), WiMax). There are presently many different types of wireless communication systems in use, including cellular and personal communications service (PCS) systems. Examples of known cellular systems include the cellular Analog Advanced Mobile Phone System (AMPS), and digital cellular systems based on code division multiple access (CDMA), frequency division multiple access (FDMA), time division multiple access (TDMA), the Global System for Mobile access (GSM) variation of TDMA, etc.

A fifth generation (5G) mobile standard calls for higher data transfer speeds, greater numbers of connections, and better coverage, among other improvements. The 5G standard (also referred to as "New Radio" or "NR"), according to the Next Generation Mobile Networks Alliance, is designed to provide data rates of several tens of megabits per second to each of tens of thousands of users, with 1 gigabit per second to tens of workers on an office floor. Several hundreds of thousands of simultaneous connections should be supported in order to support large sensor deployments. Consequently, the spectral efficiency of 5G mobile communications should be significantly enhanced compared to the current 4G/LTE standard. Furthermore, signaling efficiencies should be enhanced and latency should be substantially reduced compared to current standards.

SUMMARY

A user equipment (UE) receives configurations for multiple downlink (DL) positioning reference signals (PRS), multiple uplink (UL) PRS, or a combination thereof. A single Medium Access Control-Control Element (MAC-CE)

block from a serving base station is provided that activates or deactivates in the UE the transmissions of the multiple UL PRS; reception of the multiple DL PRS, or a combination thereof, and in response the UE activates or deactivates the transmission and/or reception of the multiple UL PRS and/or DL PRS. The MAC-CE block, for example, may identify multiple UL PRS resource sets, each of which includes at least one PRS resource, for activation or deactivation. The MAC-CE block may additionally or alternatively, identify multiple DL PRS resources, multiple DL PRS resource sets, or multiple DL PRS frequency layers for activation or deactivation.

In one implementation, a method for a user equipment (UE) positioning performed by the UE, includes receiving a configuration of at least one of multiple downlink (DL) Positioning Reference Signals (PRS), multiple uplink (UL) PRS, or a combination thereof from a network entity; receiving a single Medium Access Control-Control Element (MAC-CE) block from a serving base station that activates or deactivates at least one of transmissions of the multiple UL PRS; reception of the multiple DL PRS, or the combination thereof; and in response to the single MAC-CE block, activating or deactivating at least one of the transmissions of the multiple DL PRS, reception of the multiple DL PRS, or the combination thereof.

In one implementation, a user equipment (UE) configured to perform positioning, includes at least one wireless transceiver configured to wirelessly communicate with a wireless network; and at least one processor coupled to the at least one wireless transceiver and configured to: receive, via the at least one wireless transceiver, a configuration of at least one of multiple downlink (DL) Positioning Reference Signals (PRS), multiple uplink (UL) PRS, or a combination thereof from a network entity; receive, via the at least one wireless transceiver, a single Medium Access Control-Control Element (MAC-CE) block from a serving base station that activates or deactivates at least one of transmissions of the multiple UL PRS; reception of the multiple DL PRS, or the combination thereof; and in response to the single MAC-CE block, activate or deactivate at least one of the transmissions of the multiple UL PRS, reception of the multiple DL PRS, or the combination thereof.

In one implementation, a user equipment (UE) configured to perform positioning, includes means for receiving a configuration of at least one of multiple downlink (DL) Positioning Reference Signals (PRS), multiple uplink (UL) PRS, or a combination thereof from a network entity; means for receiving a single Medium Access Control-Control Element (MAC-CE) block from a serving base station that activates or deactivates at least one of transmissions of the multiple UL PRS; reception of the multiple DL PRS, or the combination thereof; and means for activating or deactivating at least one of the transmissions of the multiple UL PRS, reception of the multiple DL PRS, or the combination thereof in response to the single MAC-CE block.

In one implementation, a non-transitory computer readable storage medium including program code stored thereon, the program code is operable to configure at least one processor in a user equipment (UE) configured to perform positioning, includes program code to receive a configuration of at least one of multiple downlink (DL) Positioning Reference Signals (PRS), multiple uplink (UL) PRS, or a combination thereof from a network entity; program code to receive a single Medium Access Control-Control Element (MAC-CE) block from a serving base station that activates or deactivates at least one of transmissions of the multiple UL PRS; reception of the multiple DL PRS, or the combination thereof; and program code to activate or deactivate at least one of the transmissions of the multiple UL PRS, reception of the multiple DL PRS, or the combination thereof in response to the single MAC-CE block.

In one implementation, a method for a user equipment (UE) positioning performed by a serving base station for the UE, includes providing a configuration of at least one of multiple downlink (DL) Positioning Reference Signals (PRS), multiple uplink (UL) PRS, or a combination thereof to the UE; transmitting a single Medium Access Control-Control Element (MAC-CE) block to the UE that activates or deactivates in the UE at least one of transmissions of the multiple UL PRS; reception of the multiple DL PRS, or the combination thereof; and in response to the single MAC-CE block, receiving or stop receiving from the UE the transmissions of the multiple UL PRS, transmitting or stop transmitting to the UE multiple DL PRS, or a combination thereof.

In one implementation, a serving base station for a user equipment (UE) configured for positioning for the UE, includes at least one wireless transceiver configured to wirelessly communicate with the UE; and at least one processor coupled to the at least one wireless transceiver and configured to: provide, via the at least one wireless transceiver, a configuration of at least one of multiple downlink (DL) Positioning Reference Signals (PRS), multiple uplink (UL) PRS, or a combination thereof to the UE; transmit, via the at least one wireless transceiver, a single Medium Access Control-Control Element (MAC-CE) block to the UE that activates or deactivates in the UE at least one of transmissions of the multiple UL PRS; reception of the multiple DL PRS, or the combination thereof; and in response to the single MAC-CE block, receive or stop receiving from the UE the transmissions of the multiple UL PRS, transmit or stop transmitting to the UE multiple DL PRS, or a combination thereof.

In one implementation, a serving base station for a user equipment (UE) configured for positioning for the UE, includes means for providing a configuration of at least one of multiple downlink (DL) Positioning Reference Signals (PRS), multiple uplink (UL) PRS, or a combination thereof to the UE; means for transmitting a single Medium Access Control-Control Element (MAC-CE) block to the UE that activates or deactivates in the UE at least one of transmissions of the multiple UL PRS; reception of the multiple DL PRS, or the combination thereof; and in response to the single MAC-CE block, a means for receiving or transmitting receives or stops receiving from the UE the transmissions of the multiple UL PRS, transmits or stops transmitting to the UE multiple DL PRS, or a combination thereof.

In one implementation, a non-transitory computer readable storage medium including program code stored thereon, the program code is operable to configure at least one processor in a serving base station for a user equipment (UE) configured for positioning for the UE, includes program code to provide a configuration of at least one of multiple downlink (DL) Positioning Reference Signals (PRS), multiple uplink (UL) PRS, or a combination thereof to the UE; program code to transmitting a single Medium Access Control-Control Element (MAC-CE) block to the UE that activates or deactivates in the UE at least one of transmissions of the multiple UL PRS; reception of the multiple DL PRS, or the combination thereof; and program code to receive or stop receiving from the UE the transmissions of the multiple UL PRS, transmit or stop transmitting to the UE multiple DL PRS, or a combination thereof in response to the single MAC-CE block.

4

BRIEF DESCRIPTION OF THE DRAWINGS

The accompanying drawings are presented to aid in the description of various aspects of the disclosure and are provided solely for illustration of the aspects and not limitation thereof.

FIG. 15 shows a flowchart for an exemplary method for position of a UE performed by the UE that includes a single MAC-CE to activate or deactivate multiple DL and/or UL PRS resource sets.

FIG. 16 shows a flowchart for an exemplary method for position of a UE performed by a serving base station that includes a single MAC-CE to activate or deactivate multiple DL and/or UL PRS resource sets.

DETAILED DESCRIPTION

Figure 1:
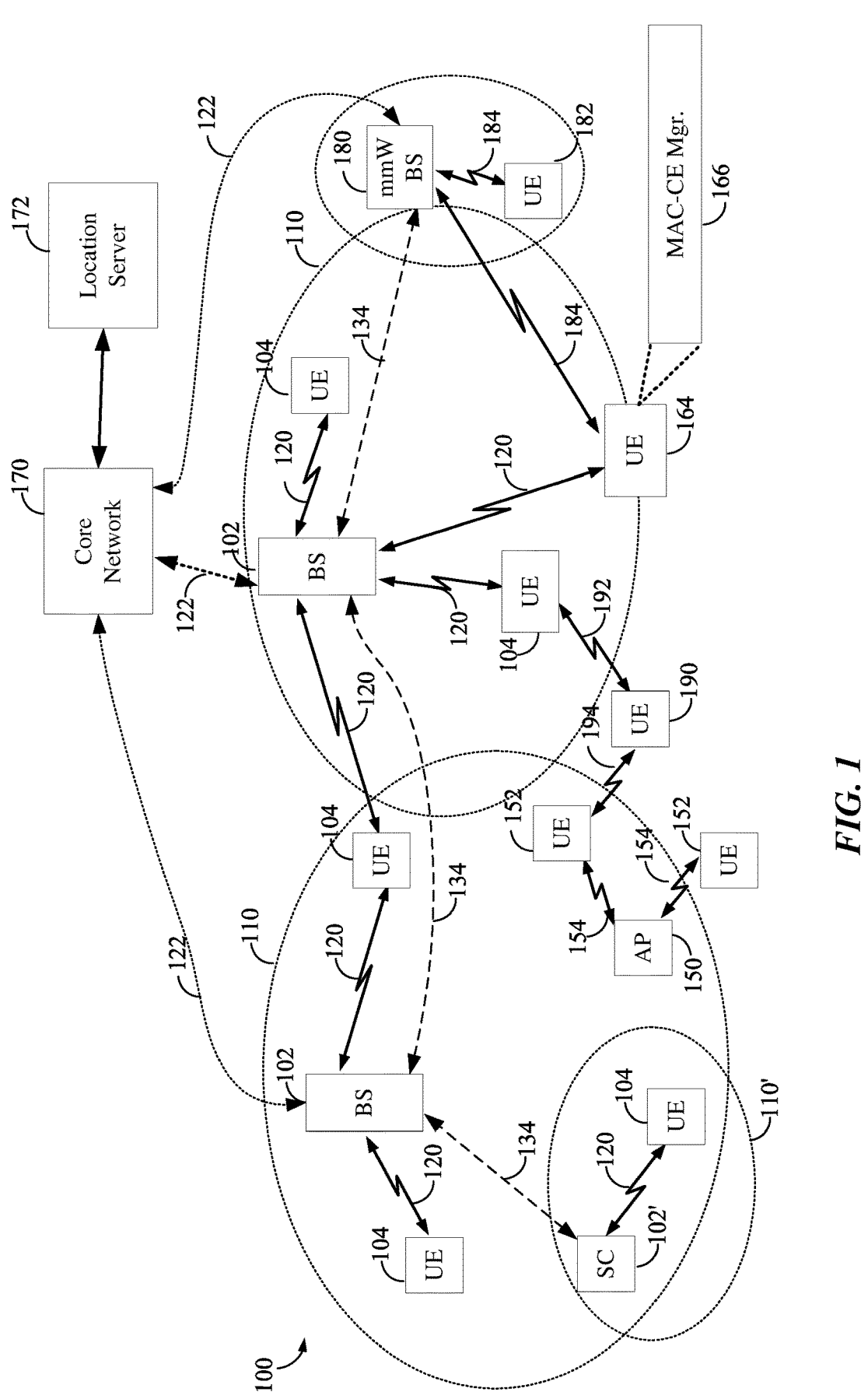
FIG. 1 illustrates an exemplary wireless communications system, according to various aspects of the disclosure.

Aspects of the disclosure are provided in the following description and related drawings directed to various examples provided for illustration purposes. Alternate aspects may be devised without departing from the scope of the disclosure. Additionally, well-known elements of the disclosure will not be described in detail or will be omitted so as not to obscure the relevant details of the disclosure.

The words "exemplary" and/or "example" are used herein to mean "serving as an example, instance, or illustration." Any aspect described herein as "exemplary" and/or "example" is not necessarily to be construed as preferred or advantageous over other aspects. Likewise, the term "aspects of the disclosure" does not require that all aspects of the disclosure include the discussed feature, advantage or mode of operation.

Those of skill in the art will appreciate that the information and signals described below may be represented using any of a variety of different technologies and techniques. For example, data, instructions, commands, information, signals, bits, symbols, and chips that may be referenced throughout the description below may be represented by voltages, currents, electromagnetic waves, magnetic fields or particles, optical fields or particles, or any combination thereof, depending in part on the particular application, in part on the desired design, in part on the corresponding technology, etc.

Further, many aspects are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, the sequence(s) of actions described herein can be considered to be embodied entirely within any form of non-transitory computer-readable storage medium having stored therein a corresponding set of computer instructions that, upon execution, would cause or instruct an associated processor of a device to perform the functionality described herein. Thus, the various aspects of the disclosure may be embodied in a number of different forms, all of which have been contemplated to be within the scope of the claimed subject matter. In addition, for each of the aspects described herein, the corresponding form of any such aspects may be described herein as, for example, "logic configured to" perform the described action.

As used herein, the terms "user equipment" (UE) and "base station" are not intended to be specific or otherwise limited to any particular Radio Access Technology (RAT), unless otherwise noted. In general, a UE may be any wireless communication device (e.g., a mobile phone, router, tablet computer, laptop computer, tracking device, wearable (e.g., smartwatch, glasses, augmented reality (AR)/virtual reality (VR) headset, etc.), vehicle (e.g., automobile, motorcycle, bicycle, etc.), Internet of Things (IoT) device, etc.) used by a user to communicate over a wireless communications network. A UE may be mobile or may (e.g., at certain times) be stationary, and may communicate with a Radio Access Network (RAN). As used herein, the term "UE" may be referred to interchangeably as an "access terminal" or "AT," a "client device," a "wireless device," a "subscriber device," a "subscriber terminal," a "subscriber station," a "user terminal" or UT, a "mobile terminal," a "mobile station," or variations thereof. Generally, UEs can communicate with a core network via a RAN, and through the core network the UEs can be connected with external networks such as the Internet and with other UEs. Of course, other mechanisms of connecting to the core network and/or the Internet are also possible for the UEs, such as over wired access networks, wireless local area network (WLAN) networks (e.g., based on IEEE 802.11, etc.) and so on.

A base station may operate according to one of several RATs in communication with UEs depending on the network in which it is deployed, and may be alternatively referred to as an access point (AP), a network node, a NodeB, an evolved NodeB (eNB), a New Radio (NR) Node B (also referred to as a gNB or gNodeB), etc. In addition, in some systems a base station may provide purely edge node signaling functions while in other systems it may provide additional control and/or network management functions. A communication link through which UEs can send signals to a base station is called an uplink (UL) channel (e.g., a reverse traffic channel, a reverse control channel, an access channel, etc.). A communication link through which the base station can send signals to UEs is called a downlink (DL) or forward link channel (e.g., a paging channel, a control channel, a broadcast channel, a forward traffic channel, etc.). As used herein the term traffic channel (TCH) can refer to either an UL/reverse or DL/forward traffic channel.

The term "base station" may refer to a single physical transmission point or to multiple physical transmission points that may or may not be co-located. For example, where the term "base station" refers to a single physical transmission point, the physical transmission point may be an antenna of the base station corresponding to a cell of the base station. Where the term "base station" refers to multiple co-located physical transmission points, the physical transmission points may be an array of antennas (e.g., as in a multiple-input multiple-output (MIMO) system or where the base station employs beamforming) of the base station. Where the term "base station" refers to multiple non-co-located physical transmission points, the physical transmission points may be a distributed antenna system (DAS) (a network of spatially separated antennas connected to a common source via a transport medium) or a remote radio head (RRH) (a remote base station connected to a serving base station). Alternatively, the non-co-located physical transmission points may be the serving base station receiving the measurement report from the UE and a neighbor base station whose reference RF signals the UE is measuring.

FIG. 1 illustrates an exemplary wireless communications system 100. The wireless communications system 100 (which may also be referred to as a wireless wide area network (WWAN)) may include various base stations 102 and various UEs 104. The base stations 102 may include macro cell base stations (high power cellular base stations) and/or small cell base stations (low power cellular base stations). In an aspect, the macro cell base station may include eNBs where the wireless communications system 100 corresponds to an LTE network, or gNBs where the wireless communications system 100 corresponds to a 5G network, or a combination of both, and the small cell base stations may include femtocells, picocells, microcells, etc.

The base stations 102 may collectively form a RAN and interface with a core network 170 (e.g., an evolved packet core (EPC) or next generation core (NGC)) through backhaul links 122, and through the core network 170 to one or more location servers 172. In addition to other functions, the base stations 102 may perform functions that relate to one or more of transferring user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, RAN sharing, multimedia broadcast multicast service (MBMS), subscriber and equipment trace, RAN information management (RIM), paging, positioning, and delivery of warning messages. The base stations 102 may communicate with each other directly or indirectly (e.g., through the EPC/NGC) over backhaul links 134, which may be wired or wireless.

The base stations 102 may wirelessly communicate with the UEs 104. Each of the base stations 102 may provide communication coverage for a respective geographic coverage area 110. In an aspect, one or more cells may be supported by a base station 102 in each coverage area 110. A "cell" is a logical communication entity used for communication with a base station (e.g., over some frequency resource, referred to as a carrier frequency, component carrier, carrier, band, or the like), and may be associated with an identifier (e.g., a physical cell identifier (PCID), a virtual cell identifier (VCID)) for distinguishing cells operating via the same or a different carrier frequency. In some cases, different cells may be configured according to different protocol types (e.g., machine-type communication (MTC), narrowband IoT (NB-IoT), enhanced mobile broadband (eMBB), or others) that may provide access for different types of UEs. In some cases, the term "cell" may also refer to a geographic coverage area of a base station (e.g., a sector), insofar as a carrier frequency can be detected and used for communication within some portion of geographic coverage areas 110.

While neighboring macro cell base station 102 geographic coverage areas 110 may partially overlap (e.g., in a handover region), some of the geographic coverage areas 110 may be substantially overlapped by a larger geographic coverage area 110. For example, a small cell base station 102' may have a coverage area 110' that substantially overlaps with the coverage area 110 of one or more macro cell base stations 102. A network that includes both small cell and macro cell base stations may be known as a heterogeneous network. A heterogeneous network may also include home eNBs (HeNBs), which may provide service to a restricted group known as a closed subscriber group (CSG).

The communication links 120 between the base stations 102 and the UEs 104 may include UL (also referred to as reverse link) transmissions from a UE 104 to a base station 102 and/or downlink (DL) (also referred to as forward link) transmissions from a base station 102 to a UE 104. The communication links 120 may use MIMO antenna technology, including spatial multiplexing, beamforming, and/or transmit diversity. The communication links 120 may be through one or more carrier frequencies. Allocation of carriers may be asymmetric with respect to DL and UL (e.g., more or less carriers may be allocated for DL than for UL).

The wireless communications system 100 may further include a wireless local area network (WLAN) access point (AP) 150 in communication with WLAN stations (STAs) 152 via communication links 154 in an unlicensed frequency spectrum (e.g., 5 GHz). When communicating in an unlicensed frequency spectrum, the WLAN STAs 152 and/or the WLAN AP 150 may perform a clear channel assessment (CCA) prior to communicating in order to determine whether the channel is available.

The small cell base station 102' may operate in a licensed and/or an unlicensed frequency spectrum. When operating in an unlicensed frequency spectrum, the small cell base station 102' may employ LTE or 5G technology and use the same 5 GHz unlicensed frequency spectrum as used by the WLAN AP 150. The small cell base station 102', employing LTE/5G in an unlicensed frequency spectrum, may boost coverage to and/or increase capacity of the access network. LTE in an unlicensed spectrum may be referred to as LTE-unlicensed (LTE-U), licensed assisted access (LAA), or MulteFire.

The wireless communications system 100 may further include a millimeter wave (mmW) base station 180 that may operate in mmW frequencies and/or near mmW frequencies in communication with a UE 182. Extremely high frequency (EHF) is part of the RF in the electromagnetic spectrum. EHF has a range of 30 GHz to 300 GHz and a wavelength between 1 millimeter and 10 millimeters. Radio waves in this band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band have high path loss and a relatively short range. The mmW base station 180 and the UE 182 may utilize beamforming (transmit and/or receive) over a mmW communication link 184 to compensate for the extremely high path loss and short range.

Further, it will be appreciated that in alternative configurations, one or more base stations 102 may also transmit using mmW or near mmW and beamforming. Accordingly, it will be appreciated that the foregoing illustrations are merely examples and should not be construed to limit the various aspects disclosed herein.

Transmit beamforming is a technique for focusing an RF signal in a specific direction. Traditionally, when a network node (e.g., a base station) broadcasts an RF signal, it broadcasts the signal in all directions (omni-directionally). With transmit beamforming, the network node determines where a given target device (e.g., a UE) is located (relative to the transmitting network node) and projects a stronger downlink RF signal in that specific direction, thereby providing a faster (in terms of data rate) and stronger RF signal for the receiving device(s). To change the directionality of the RF signal when transmitting, a network node can control the phase and relative amplitude of the RF signal at each of the one or more transmitters that are broadcasting the RF signal. For example, a network node may use an array of antennas (referred to as a "phased array" or an "antenna array") that creates a beam of RF waves that can be "steered" to point in different directions, without actually moving the antennas. Specifically, the RF current from the transmitter is fed to the individual antennas with the correct phase relationship so that the radio waves from the separate antennas add together to increase the radiation in a desired direction, while cancelling to suppress radiation in undesired directions.

In receive beamforming, the receiver uses a receive beam to amplify RF signals detected on a given channel. For example, the receiver can increase the gain setting and/or adjust the phase setting of an array of antennas in a particular direction to amplify (e.g., to increase the gain level of) the RF signals received from that direction. Thus, when a receiver is said to beamform in a certain direction, it means the beam gain in that direction is high relative to the beam gain along other directions, or the beam gain in that direction is the highest compared to the beam gain in that direction of all other receive beams available to the receiver. This results in a stronger received signal strength (e.g., reference signal received power (RSRP), reference signal received quality (RSRQ), signal-to-interference-plus-noise ratio (SINR), etc.) of the RF signals received from that direction.

In 5G, the frequency spectrum in which wireless nodes (e.g., base stations 102/180, UEs 104/182) operate is divided into multiple frequency ranges, FR1 (from 450 to 6000 MHz), FR2 (from 24250 to 52600 MHz), FR3 (above 52600 MHz), and FR4 (between FR1 and FR2). In a multi-carrier system, such as 5G, one of the carrier frequencies is referred to as the "primary carrier" or "anchor carrier" or "primary serving cell" or "PCell," and the remaining carrier frequencies are referred to as "secondary carriers" or "secondary serving cells" or "SCells." In carrier aggregation, the anchor carrier is the carrier operating on the primary frequency (e.g., FR1) utilized by a UE 104/182 and the cell in which the UE 104/182 either performs the initial radio resource control (RRC) connection establishment procedure or initiates the RRC connection re-establishment procedure. The primary carrier carries all common and UE-specific control channels. A secondary carrier is a carrier operating on a second frequency (e.g., FR2) that may be configured once the RRC connection is established between the UE 104 and the anchor carrier and that may be used to provide additional radio resources. The secondary carrier may contain only necessary signaling information and signals, for example, those that are UE-specific may not be present in the secondary carrier, since both primary uplink and downlink carriers are typically UE-specific. This means that different UEs 104/182 in a cell may have different downlink primary carriers. The same is true for the uplink primary carriers. The network is able to change the primary carrier of any UE 104/182 at any time. This is done, for example, to balance the load on different carriers. Because a "serving cell" (whether a PCell or an SCell) corresponds to a carrier frequency/component carrier over which some base station is communicating, the term "cell," "serving cell," "component carrier," "carrier frequency," and the like can be used interchangeably.

For example, still referring to FIG. 1, one of the frequencies utilized by the macro cell base stations 102 may be an anchor carrier (or "PCell") and other frequencies utilized by the macro cell base stations 102 and/or the mmW base station 180 may be secondary carriers ("SCells"). The simultaneous transmission and/or reception of multiple carriers enables the UE 104/182 to significantly increase its data transmission and/or reception rates. For example, two 20 MHz aggregated carriers in a multi-carrier system would theoretically lead to a two-fold increase in data rate (i.e., 40 MHz), compared to that attained by a single 20 MHz carrier.

The wireless communications system 100 may further include one or more UEs, such as UE 190, that connects indirectly to one or more communication networks via one or more device-to-device (D2D) peer-to-peer (P2P) links. In the example of FIG. 1, UE 190 has a D2D P2P link 192 with one of the UEs 104 connected to one of the base stations 102 (e.g., through which UE 190 may indirectly obtain cellular connectivity) and a D2D P2P link 194 with WLAN STA 152 connected to the WLAN AP 150 (through which UE 190 may indirectly obtain WLAN-based Internet connectivity). In an example, the D2D P2P links 192 and 194 may be supported with any well-known D2D RAT, such as LTE Direct (LTE-D), WiFi Direct (WiFi-D), Bluetooth®, and so on.

The wireless communications system 100 may further include a UE 164 that may communicate with a macro cell base station 102 over a communication link 120 and/or the mmW base station 180 over a mmW communication link 184. For example, the macro cell base station 102 may support a PCell and one or more SCells for the UE 164 and the mmW base station 180 may support one or more SCells for the UE 164. In an aspect, the UE 164 may include a MAC-CE manager 166 that may enable the UE 164 to perform the UE operations described herein. Note that although only one UE in FIG. 1 is illustrated as having a MAC-CE manager 166, any of the UEs in FIG. 1 may be configured to perform the UE operations described herein.

Figure 2A:
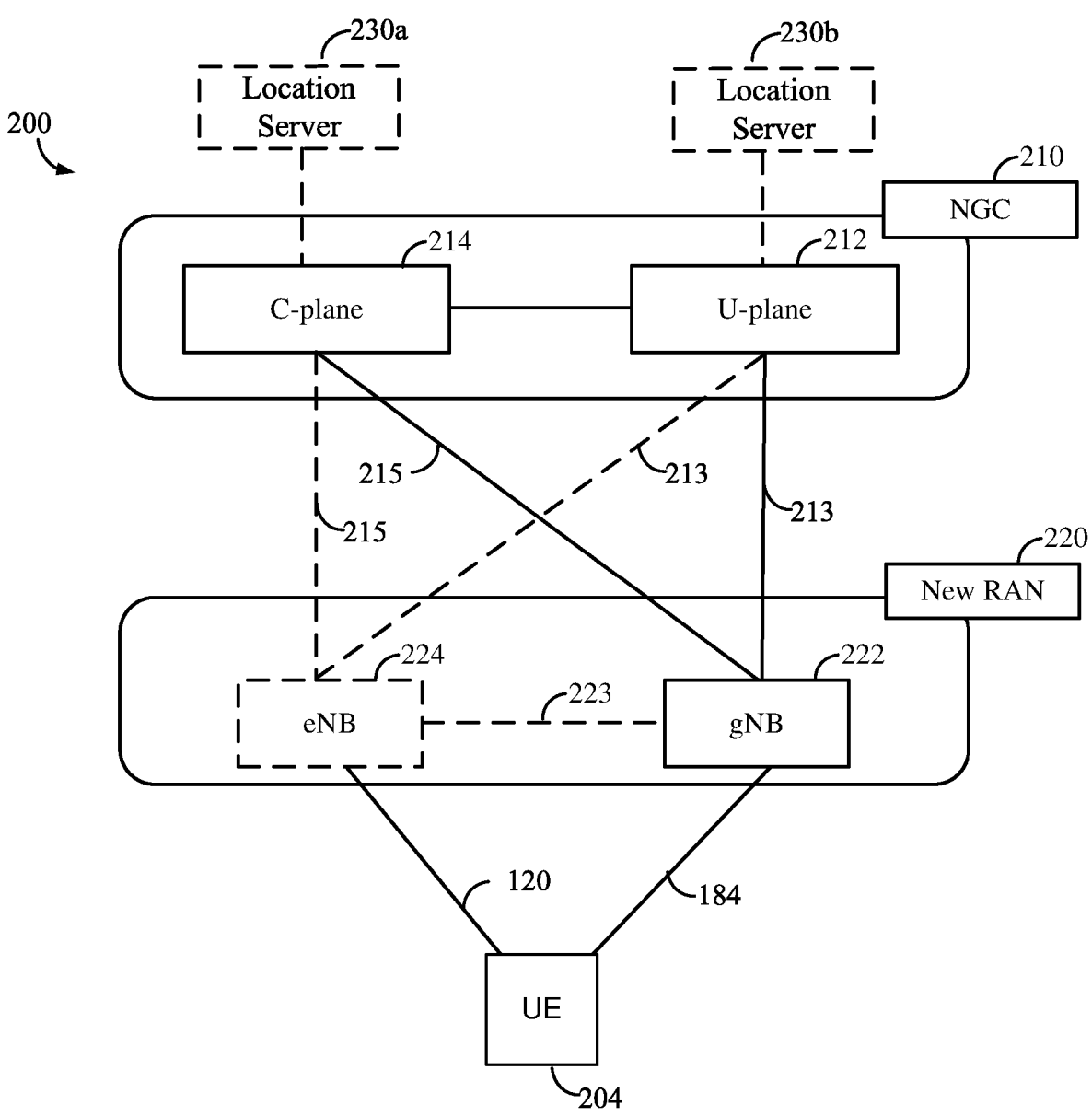
FIGS. 2A and 2B illustrate example wireless network structures, according to various aspects of the disclosure.

FIG. 2A illustrates an example wireless network structure 200. For example, an NGC 210 (also referred to as a "5GC") can be viewed functionally as control plane functions 214 (e.g., UE registration, authentication, network access, gateway selection, etc.) and user plane functions 212, (e.g., UE gateway function, access to data networks, IP routing, etc.) which operate cooperatively to form the core network. User plane interface (NG-U) 213 and control plane interface (NG-C) 215 connect the gNB 222 to the NGC 210 and specifically to the control plane functions 214 and user plane functions 212. In an additional configuration, an eNB 224 may also be connected to the NGC 210 via NG-C 215 to the control plane functions 214 and NG-U 213 to user plane functions 212. Further, eNB 224 may directly communicate with gNB 222 via a backhaul connection 223. In some configurations, the New RAN 220 may only have one or more gNBs 222, while other configurations include one or more of both eNBs 224 and gNBs 222. Either gNB 222 or eNB 224 may communicate with UEs 204 (e.g., any of the UEs depicted in FIG. 1). Another optional aspect may include one or more location servers 230*a*, 230*b* (sometimes collectively referred to as location server 230 (which may correspond to location server 172), which may be in communication with the control plane functions 214 and user plane functions 212, respectively, in the NGC 210 to provide location assistance for UEs 204. The location server 230 can be implemented as a plurality of separate servers (e.g., physically separate servers, different software modules on a single server, different software modules spread across multiple physical servers, etc.), or alternately may each correspond to a single server. The location server 230 can be configured to support one or more location services for UEs 204 that can connect to the location server 230 via the core network, NGC 210, and/or via the Internet (not illustrated). Further, the location server 230 may be integrated into a component of the core network, or alternatively may be external to the core network, e.g., in the New RAN 220.

Figure 2B:
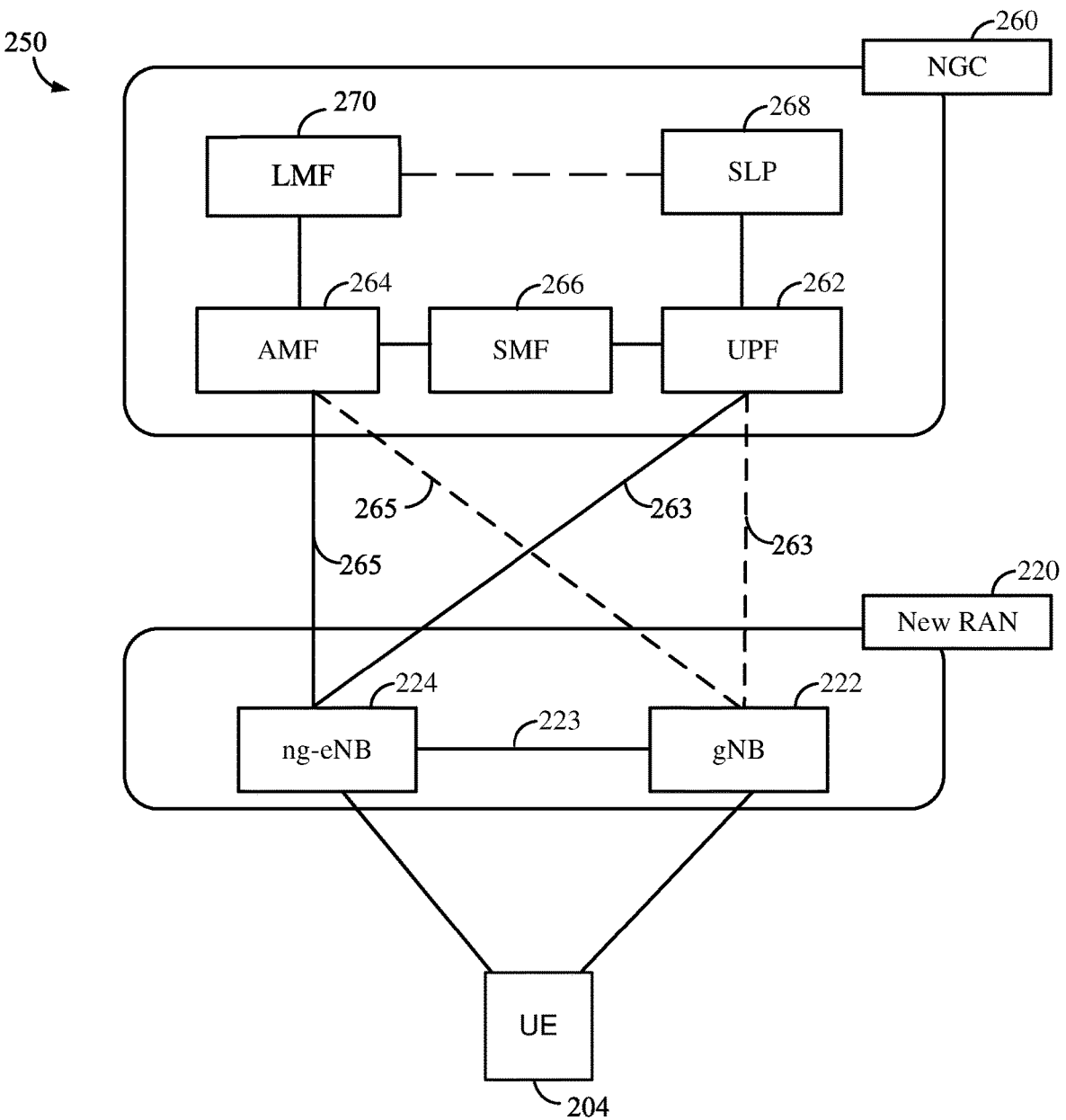

FIG. 2B illustrates another example wireless network structure 250. For example, an NGC 260 (also referred to as a "5GC") can be viewed functionally as control plane functions, provided by an access and mobility management function (AMF) 264, user plane function (UPF) 262, a session management function (SMF) 266, SLP 268, and an LMF 270, which operate cooperatively to form the core network (i.e., NGC 260). User plane interface 263 and control plane interface 265 connect the ng-eNB 224 to the NGC 260 and specifically to UPF 262 and AMF 264, respectively. In an additional configuration, a gNB 222 may also be connected to the NGC 260 via control plane interface 265 to AMF 264 and user plane interface 263 to UPF 262. Further, eNB 224 may directly communicate with gNB 222 via the backhaul connection 223, with or without gNB direct connectivity to the NGC 260. In some configurations, the New RAN 220 may only have one or more gNBs 222, while other configurations include one or more of both ng-eNBs 224 and gNBs 222. Either ng-gNB 222 or eNB 224 may communicate with UEs 204 (e.g., any of the UEs depicted in FIG. 1). The base stations of the New RAN 220 communicate with the AMF 264 over the N2 interface and the UPF 262 over the N3 interface.

The functions of the AMF include registration management, connection management, reachability management, mobility management, lawful interception, transport for session management (SM) messages between the UE 204 and the SMF 266, transparent proxy services for routing SM messages, access authentication and access authorization, transport for short message service (SMS) messages between the UE 204 and the short message service function (SMSF) (not shown), and security anchor functionality (SEAF). The AMF also interacts with the authentication server function (AUSF) (not shown) and the UE 204, and receives the intermediate key that was established as a result of the UE 204 authentication process. In the case of authentication based on a UMTS (universal mobile telecommunications system) subscriber identity module (USIM), the AMF retrieves the security material from the AUSF. The functions of the AMF also include security context management (SCM). The SCM receives a key from the SEAF that it uses to derive access-network specific keys. The functionality of the AMF also includes location services management for regulatory services, transport for location services messages between the UE 204 and the location management function (LMF) 270 (which may correspond to location server 172), as well as between the New RAN 220 and the LMF 270, evolved packet system (EPS) bearer identifier allocation for interworking with the EPS, and UE 204 mobility event notification. In addition, the AMF also supports functionalities for non-Third Generation Partnership Project (3GPP) access networks.

Functions of the UPF include acting as an anchor point for intra-/inter-RAT mobility (when applicable), acting as an external protocol data unit (PDU) session point of interconnect to the data network (not shown), providing packet routing and forwarding, packet inspection, user plane policy rule enforcement (e.g., gating, redirection, traffic steering), lawful interception (user plane collection), traffic usage reporting, quality of service (QoS) handling for the user plane (e.g., UL/DL rate enforcement, reflective QoS marking in the DL), UL traffic verification (service data flow (SDF) to QoS flow mapping), transport level packet marking in the UL and DL, DL packet buffering and DL data notification triggering, and sending and forwarding of one or more "end markers" to the source RAN node.

The functions of the SMF 266 include session management, UE Internet protocol (IP) address allocation and management, selection and control of user plane functions, configuration of traffic steering at the UPF to route traffic to the proper destination, control of part of policy enforcement and QoS, and downlink data notification. The interface over which the SMF 266 communicates with the AMF 264 is referred to as the N11 interface.

Another optional aspect may include an LMF 270, which may be in communication with the NGC 260 to provide location assistance for UEs 204. The LMF 270 can be implemented as a plurality of separate servers (e.g., physically separate servers, different software modules on a single server, different software modules spread across multiple physical servers, etc.), or alternately may each correspond to a single server. The LMF 270 can be configured to support one or more location services for UEs 204 that can connect to the LMF 270 via the core network, NGC 260, and/or via the Internet (not illustrated).

Figure 3:
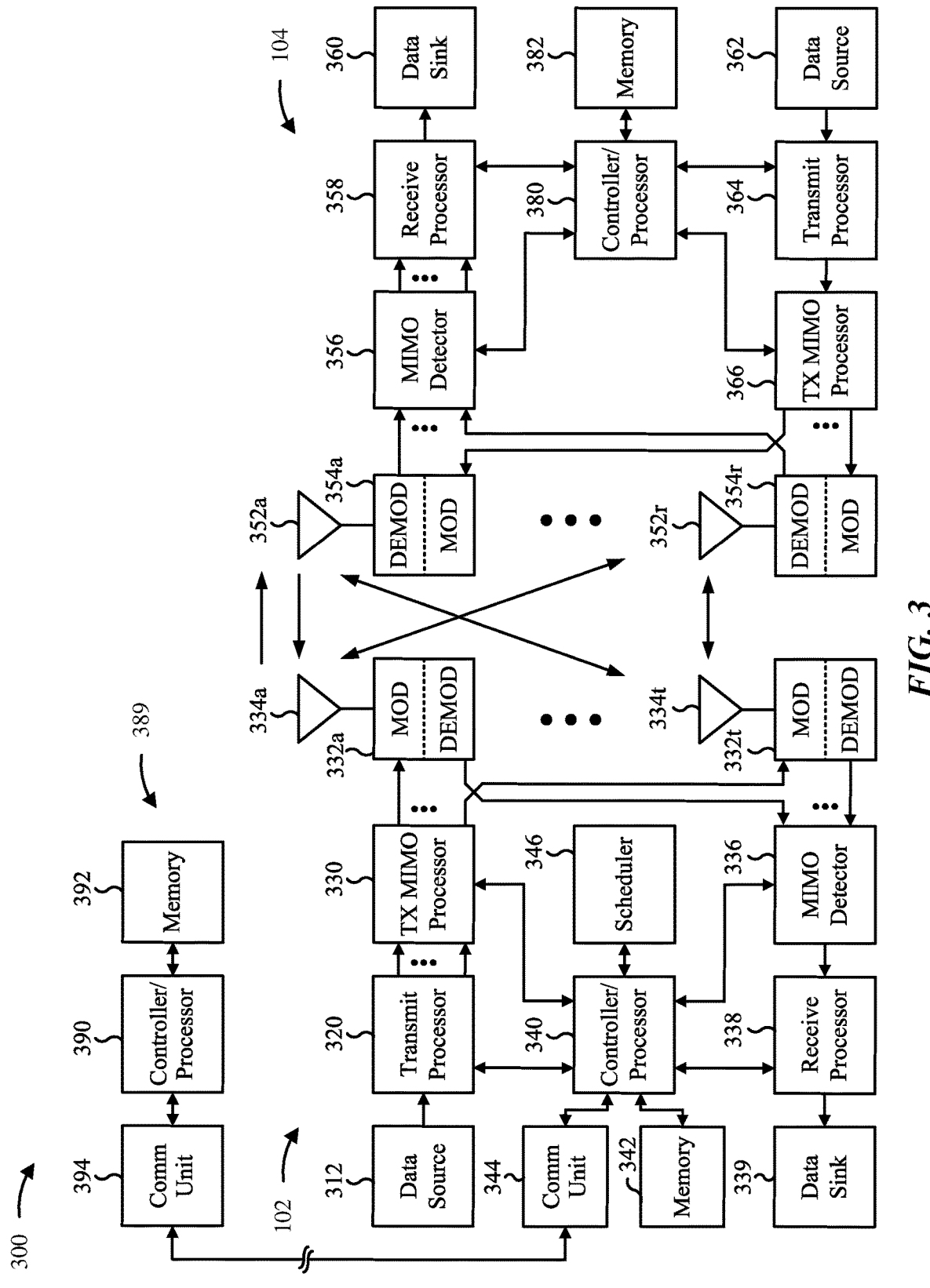
FIG. 3 illustrates a block diagram of a design of base station and user equipment (UE), which may be one of the base stations and one of the UEs in FIG. 1.

FIG. 3 shows a block diagram of a design 300 of base station 102 and UE 104, which may be one of the base stations and one of the UEs in FIG. 1. Base station 102 may be equipped with T antennas 334a through 334t, and UE 104 may be equipped with R antennas 352a through 352r, where in general T≥1 and R≥1.

At base station 102, a transmit processor 320 may receive data from a data source 312 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 320 may also process system information (e.g., for semi-static resource partitioning information (SRPI) and/or the like) and control information (e.g., CQI requests, grants, upper layer signaling, and/or the like) and provide overhead symbols and control symbols. Transmit processor 320 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 330 may perform spatial processing (e.g., precoding) on the data symbols, the control symbols, the overhead symbols, and/or the reference symbols, if applicable, and may provide T output symbol streams to T modulators (MODs) 332a through 332t. Each modulator 332 may process a respective output symbol stream (e.g., for OFDM and/or the like) to obtain an output sample stream. Each modulator 332 may further process (e.g., convert to analog, amplify, filter, and upconvert) the output sample stream to obtain a downlink signal. T downlink signals from modulators 332a through 332t may be transmitted via T antennas 334a through 334t, respectively. According to various aspects described in more detail below, the synchronization signals can be generated with location encoding to convey additional information.

At UE 104, antennas 352a through 352r may receive the downlink signals from base station 102 and/or other base stations and may provide received signals to demodulators (DEMODs) 354a through 354r, respectively. Each demodulator 354 may condition (e.g., filter, amplify, down convert, and digitize) a received signal to obtain input samples. Each demodulator 354 may further process the input samples (e.g., for OFDM and/or the like) to obtain received symbols. A MIMO detector 356 may obtain received symbols from all R demodulators 354a through 354r, perform MIMO detection on the received symbols if applicable, and provide detected symbols. A receive processor 358 may process (e.g., demodulate and decode) the detected symbols, provide decoded data for UE 104 to a data sink 360, and provide decoded control information and system information to a controller/processor 380. A channel processor may determine reference signal received power (RSRP), received signal strength indicator (RSSI), reference signal received quality (RSRQ), channel quality indicator (CQI), and/or the like. In some aspects, one or more components of UE 104 may be included in a housing.

On the uplink, at UE 104, a transmit processor 364 may receive and process data from a data source 362 and control information (e.g., for reports comprising RSRP, RSSI, RSRQ, CQI, and/or the like) from controller/processor 380. Transmit processor 364 may also generate reference symbols for one or more reference signals. The symbols from transmit processor 364 may be precoded by a TX MIMO processor 366 if applicable, further processed by modulators 354a through 354r (e.g., for DFT-s-OFDM, CP-OFDM, and/or the like), and transmitted to base station 102. At base station 102, the uplink signals from UE 104 and other UEs may be received by antennas 334, processed by demodulators 332, detected by a MIMO detector 336 if applicable, and further processed by a receive processor 338 to obtain decoded data and control information sent by UE 104. Receive processor 338 may provide the decoded data to a data sink 339 and the decoded control information to controller/processor 340. Base station 102 may include communication unit 344 and communicate to network controller 389 via communication unit 344. Network controller 389 may include communication unit 394, controller/processor 390, and memory 392.

Controller/processor 340 of base station 102, controller/processor 380 of UE 104, and/or any other component(s) of FIG. 3 may perform one or more techniques associated with activation or deactivation of the reception of multiple DL PRS and/or the transmissions of multiple UL PRS in the UE 104 using a single MAC-CE, as described in more detail elsewhere herein. For example, controller/processor 340 of base station 102, controller/processor 380 of UE 104, and/or any other component(s) of FIG. 3 may perform or direct operations of, for example, process 1500 of FIG. 15, process 1600 of FIG. 16, and/or other processes as described herein. Memories 342 and 382 may store data and program codes for base station 102 and UE 104, respectively. In some aspects, memory 342 and/or memory 382 may comprise a non-transitory computer-readable medium storing one or more instructions for wireless communication. For example, the one or more instructions, when executed by one or more processors of the base station 102 and/or the UE 104, may perform or direct operations of, for example, process 1500 of FIG. 15, process 160 of FIG. 16, and/or other processes as described herein. A scheduler 346 may schedule UEs for data transmission on the downlink and/or uplink.

As indicated above, FIG. 3 is provided as an example. Other examples may differ from what is described with regard to FIG. 3.

Figure 4:
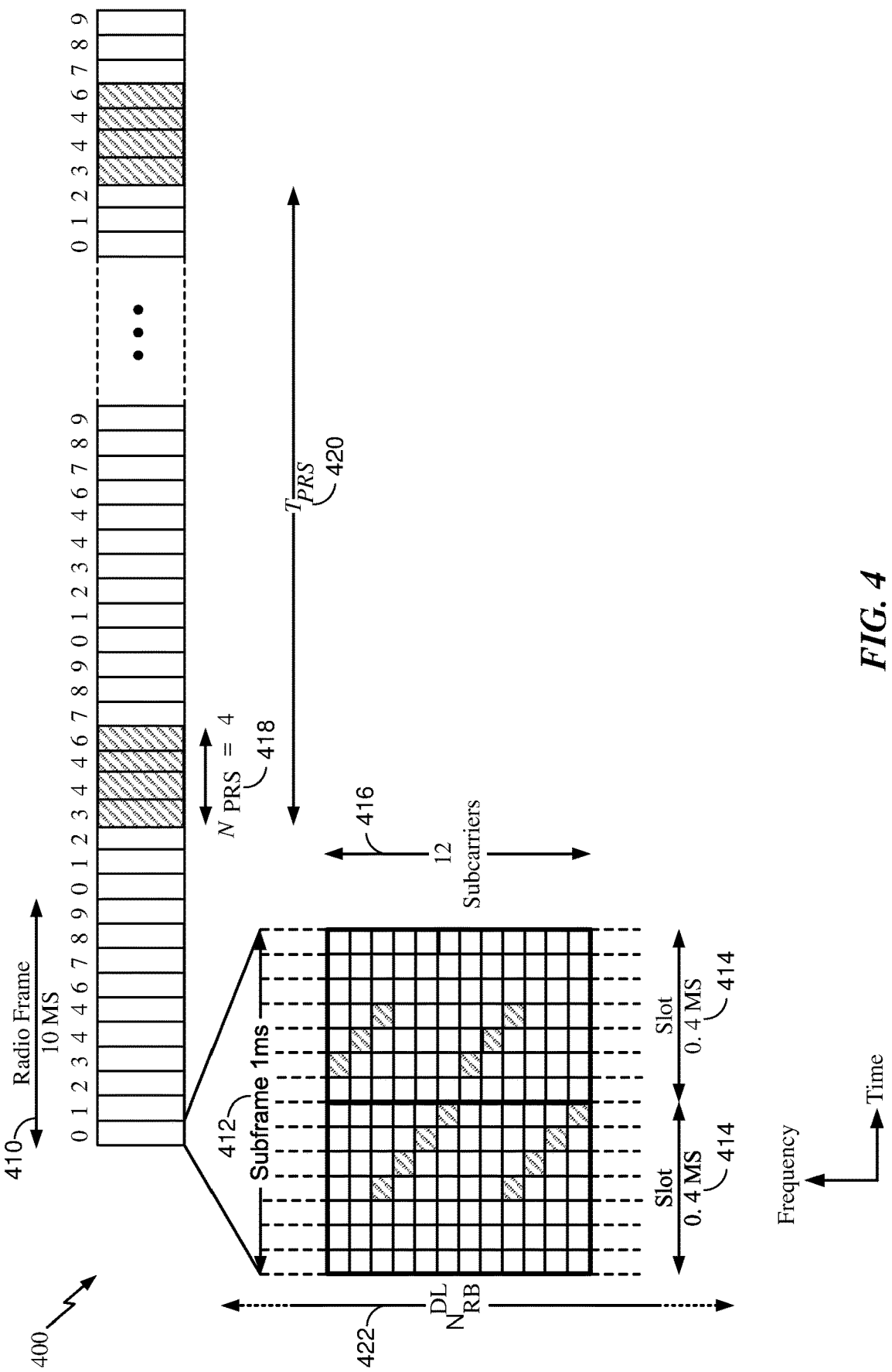
FIG. 4 is a diagram of a structure of an exemplary subframe sequence with positioning reference signal (PRS) positioning occasions.

FIG. 4 shows a structure of an exemplary subframe sequence 400 with positioning reference signal (PRS) positioning occasions, according to aspects of the disclosure. Subframe sequence 400 may be applicable to the broadcast of PRS signals from a base station (e.g., any of the base stations described herein) or other network node. The subframe sequence 400 may be used in LTE systems, and the same or similar subframe sequence may be used in other communication technologies/protocols, such as 5G and NR. In FIG. 4, time is represented horizontally (e.g., on the X axis) with time increasing from left to right, while frequency is represented vertically (e.g., on the Y axis) with frequency increasing (or decreasing) from bottom to top. As shown in FIG. 4, downlink and uplink radio frames 410 may be of 10 millisecond (ms) duration each. For downlink frequency division duplex (FDD) mode, radio frames 410 are organized, in the illustrated example, into ten subframes 412 of 1 ms duration each. Each subframe 412 comprises two slots 414, each of, for example, 0.5 ms duration.

In the frequency domain, the available bandwidth may be divided into uniformly spaced orthogonal subcarriers 416 (also referred to as "tones" or "bins"). For example, for a normal length cyclic prefix (CP) using, for example, 15 kHz spacing, subcarriers 416 may be grouped into a group of twelve (12) subcarriers. A resource of one OFDM symbol length in the time domain and one subcarrier in the frequency domain (represented as a block of subframe 412) is referred to as a resource element (RE). Each grouping of the 12 subcarriers 416 and the 14 OFDM symbols is termed a resource block (RB) and, in the example above, the number of subcarriers in the resource block may be written as $N_{SC}^{RB}=12$. For a given channel bandwidth, the number of available resource blocks on each channel 422, which is also called the transmission bandwidth configuration 422, is indicated as $N_{RB}^{DL}$. For example, for a 3 MHz channel bandwidth in the above example, the number of available resource blocks on each channel 422 is given by $N_{RB}^{DL}=15$. Note that the frequency component of a resource block (e.g., the 12 subcarriers) is referred to as a physical resource block (PRB).

A base station may transmit radio frames (e.g., radio frames 410), or other physical layer signaling sequences, supporting PRS signals (i.e. a downlink (DL) PRS) according to frame configurations either similar to, or the same as that, shown in FIG. 4, which may be measured and used for a UE (e.g., any of the UEs described herein) position estimation. Other types of wireless nodes (e.g., a distributed antenna system (DAS), remote radio head (RRH), UE, AP, etc.) in a wireless communications network may also be configured to transmit PRS signals configured in a manner similar to (or the same as) that depicted in FIG. 4.

A collection of resource elements that are used for transmission of PRS signals is referred to as a "PRS resource." The collection of resource elements can span multiple PRBs in the frequency domain and N (e.g., 1 or more) consecutive symbol(s) within a slot 414 in the time domain. For example, the cross-hatched resource elements in the slots 414 may be examples of two PRS resources. A "PRS resource set" is a set of PRS resources used for the transmission of PRS signals, where each PRS resource has a PRS resource identifier (ID). In addition, the PRS resources in a PRS resource set are associated with the same transmission-reception point (TRP). A PRS resource ID in a PRS resource set is associated with a single beam transmitted from a single TRP (where a TRP may transmit one or more beams). Note that this does not have any implications on whether the TRPs and beams from which signals are transmitted are known to the UE.

PRS may be transmitted in special positioning subframes that are grouped into positioning occasions. A PRS occasion is one instance of a periodically repeated time window (e.g., consecutive slot(s)) where PRS are expected to be transmitted. Each periodically repeated time window can include a group of one or more consecutive PRS occasions. Each PRS occasion can comprise a number $N_{PRS}$ of consecutive positioning subframes. The PRS positioning occasions for a cell supported by a base station may occur periodically at intervals, denoted by a number $T_{PRS}$ of milliseconds or subframes. As an example, FIG. 4 illustrates a periodicity of positioning occasions where $N_{PRS}$ equals 4 418 and $T_{PRS}$ is greater than or equal to 20 420. In some aspects, $T_{PRS}$ may be measured in terms of the number of subframes between the start of consecutive positioning occasions. Multiple PRS occasions may be associated with the same PRS resource configuration, in which case, each such occasion is referred to as an "occasion of the PRS resource" or the like.

A PRS may be transmitted with a constant power. A PRS can also be transmitted with zero power (i.e., muted). Muting, which turns off a regularly scheduled PRS transmission, may be useful when PRS signals between different cells overlap by occurring at the same or almost the same time. In this case, the PRS signals from some cells may be muted while PRS signals from other cells are transmitted (e.g., at a constant power). Muting may aid signal acquisition and time of arrival (TOA) and reference signal time difference (RSTD) measurement, by UEs, of PRS signals that are not muted (by avoiding interference from PRS signals that have been muted). Muting may be viewed as the non-transmission of a PRS for a given positioning occasion for a particular cell. Muting patterns (also referred to as muting sequences) may be signaled (e.g., using the LTE positioning protocol (LPP)) to a UE using bit strings. For example, in a bit string signaled to indicate a muting pattern, if a bit at position j is set to '0', then the UE may infer that the PRS is muted for a $j^{th}$ positioning occasion.

To further improve hearability of PRS, positioning subframes may be low-interference subframes that are transmitted without user data channels. As a result, in ideally synchronized networks, PRS may be interfered with by other cells' PRS with the same PRS pattern index (i.e., with the same frequency shift), but not from data transmissions. The frequency shift may be defined as a function of a PRS ID for a cell or other transmission point (TP) (denoted as $N_{ID}^{PRS}$) or as a function of a physical cell identifier (PCI) (denoted as $N_{ID}^{cell}$) if no PRS ID is assigned, which results in an effective frequency re-use factor of six (6).

To also improve hearability of a PRS (e.g., when PRS bandwidth is limited, such as with only six resource blocks corresponding to 1.4 MHz bandwidth), the frequency band for consecutive PRS positioning occasions (or consecutive PRS subframes) may be changed in a known and predictable manner via frequency hopping. In addition, a cell supported by a base station may support more than one PRS configuration, where each PRS configuration may comprise a distinct frequency offset (vshift), a distinct carrier frequency, a distinct bandwidth, a distinct code sequence, and/or a distinct sequence of PRS positioning occasions with a particular number of subframes ($N_{PRS}$) per positioning occasion and a particular periodicity ($T_{PRS}$). In some implementation, one or more of the PRS configurations supported in a cell may be for a directional PRS and may then have additional distinct characteristics, such as a distinct direction of transmission, a distinct range of horizontal angles, and/or a distinct range of vertical angles.

A PRS configuration, as described above, including the PRS transmission/muting schedule, is signaled to the UE to enable the UE to perform PRS positioning measurements. The UE is not expected to blindly perform detection of PRS configurations.

Note that the terms "positioning reference signal" and "PRS" may sometimes refer to specific reference signals that are used for positioning in LTE systems. However, as used

TABLE 1

| BWP-UplinkDedicated ::= | SEQUENCE { |
|---|---|
| pucch-Config | SetupRelease { PUCCH-Config } |
| OPTIONAL, -- Need M | |
| pusch-Config | SetupRelease { PUSCH-Config } |
| OPTIONAL, -- Need M | |
| configuredGrantConfig | SetupRelease { ConfiguredGrantConfig } |
| OPTIONAL, -- Need M | |
| srs-Config | SetupRelease { SRS-Config } |
| OPTIONAL, -- Need M | |
| beamFailureRecoveryConfig | SetupRelease { BeamFailureRecoveryConfig } |
| OPTIONAL, -- Cond SpCellOnly | |
| ... | |
| } | |

Table 2 illustrates another fragment of ASN.1 showing inside the SRS-Config, configuration of SRS resources and SRS resource sets.

TABLE 2

| SRS-Config ::= | SEQUENCE { |
|---|---|
| srs-ResourceSetToReleaseList | SEQUENCE (SIZE(1..maxNrofSRS- |
| ResourceSets)) OF SRS-ResourceSetId | OPTIONAL, -- Need N |
| srs-ResourceSetToAddModList | SEQUENCE (SIZE(1..maxNrofSRS- |
| ResourceSets)) OF SRS-ResourceSet | OPTIONAL, -- Need N |
| srs-ResourceToReleaseList | SEQUENCE (SIZE(1..maxNrofSRS- |
| Resources)) OF SRS-ResourceId | OPTIONAL, -- Need N |
| srs-ResourceToAddModList | SEQUENCE (SIZE(1..maxNrofSRS- |
| Resources)) OF SRS-Resource | OPTIONAL, -- Need N |
| tpc-Accumulation | ENUMERATED {disabled} |
| OPTIONAL, -- Need S | |
| ... | |
| } | | herein, unless otherwise indicated, the terms "positioning reference signal" and "PRS" refer to any type of reference signal that can be used for positioning, such as but not limited to, PRS signals in LTE, navigation reference signals (NRS), transmitter reference signals (TRS), cell-specific reference signals (CRS), channel state information reference signals (CSI-RS), primary synchronization signals (PSS), secondary synchronization signals (SSS), etc.

Similar to DL PRS transmitted by base stations, discussed above, a UE may transmit UL PRS for positioning. The UL PRS may be, e.g., sounding reference signals (SRS) for positioning. Using received DL PRS from base stations and/or UL PRS transmitted to base stations, the UE may perform various positioning methods, such as time of arrival (TOA), reference signal time difference (RSTD), time difference of arrival (TDOA), reference signal received power (RSRP), time difference between reception and transmission of signals (Rx-Tx), Angle of Arrival (AoA) or Angle of Departure (AoD), etc. In some implementations, the DL PRS and UL PRS are received and transmitted jointly to perform multi-cell Round Trip Time (M-RTT) positioning measurements.

As discussed above, the UE is provided with the configuration of DL PRS to be received so that the UE may perform PRS positioning measurements. Similarly, the UL PRS, e.g., SRS for positioning, to be transmitted by the UE 104 may be configured using an SRS-Config Information Element (IE). The configuration is defined per bandwidth part (BWP) and defines a list of SRS Resources and a list of SRS Resource sets. Each resource set defines a set of SRS Resources. Table 1 illustrates a fragment of Abstract Syntax Notation One (ASN.1) showing the SRS-Config per BWP.

Table 3 illustrates another fragment of ASN.1 showing configuration of SRS resources.

TABLE 3

| SRS-Resource ::= | SEQUENCE { |
|---|---|
| srs-ResourceId | SRS-ResourceId, |
| ... | |
| spatialRelationInfo | SRS-SpatialRelationInfo |
| OPTIONAL, -- Need R | |
| ... | |
| } | |

Table 4 illustrates another fragment of ASN.1 showing configuration of SRS SpatialRelationInfo.

TABLE 4

| SRS-SpatialRelationInfo ::= | SEQUENCE { |
|---|---|
| servingCellId | ServingCellIndex |
| OPTIONAL, -- Need S | |
| referenceSignal | CHOICE { |
| ssb-Index | SSB-Index, |
| csi-RS-Index | NZP-CSI-RS-Resource-Index, |
| srs | SEQUENCE { |
| recourseId | SRS-ResourceId, |
| uplinkBWP | BWP-Id |
| } | |
| } | |
| } | |

Thus, an RRC configuration of the SRS transmission settings uses the IE SRS-Config, which is configured per BWP and contains a list of SRS-Resources, wherein each SRS resource contains information of the physical mapping of the reference signal on the time-frequency resource grid, time-domain information, sequence Identifiers (IDs), etc.

The SRS-Config contains a list of SRS resource sets, which contains a list of SRS resources.

Three types of SRS transmissions may be supported. Periodic SRS is transmitted periodically in certain slots. This SRS transmission is semi-statically configured by the RRC using parameters such as SRS resource, periodicity, and slot offset. Aperiodic SRS is a one-shot SRS transmission that can happen in any slot. Here, one-shot means that SRS transmission only happens once per trigger. Semi-Persistent SRS (SP SRS) is similar to P SRS in that resources for SP SRS transmissions are semi-statically configured with parameters such as periodicity and slot offset. Dynamic signaling is used to activate and deactivate the SP SRS transmission.

The transmissions of SRS may be activated or deactivated within a UE 104 with a Medium Access Control-Control Element (MAC-CE). For example, SRS for positioning for example, may have a semi-persistent configuration with MAC-CE activation or deactivation, and is received by the serving base station and neighbor base stations. SRS for positioning may also be aperiodic, which may be activated or deactivated by a downlink control information (DCI) communication.

For example, in the case of SP SRS, a base station 102 may first configure the UE 104 with the SP SRS resources, and a SP SRS resource set is then activated or deactivated using MAC-CE.

A spatial relation indication may be provided for SRS resources. The spatial relation may be, e.g., a downlink Reference Signal (RS) (SSB or CSI-RS) or a previously transmitted SRS. The spatial relation may be used, for example, to indicate what uplink transmission beam the UE 104 may use for precoding the SRS. If the UE 104 is capable of beam correspondence, the uplink beam may be derived from the downlink beam management procedure and a spatial relation to a downlink RS can be indicated, e.g., where the UE 104 may transmit the SRS in the reciprocal direction to how it set its receive beam when receiving the downlink RS. Alternatively, an uplink beam management procedure can be used, where the UE 104 transmits an SRS beam sweep and the base station refers back to one of the swept beams in a previously transmitted SRS resource to indicate the spatial relation to the SRS resource.

Figure 5:
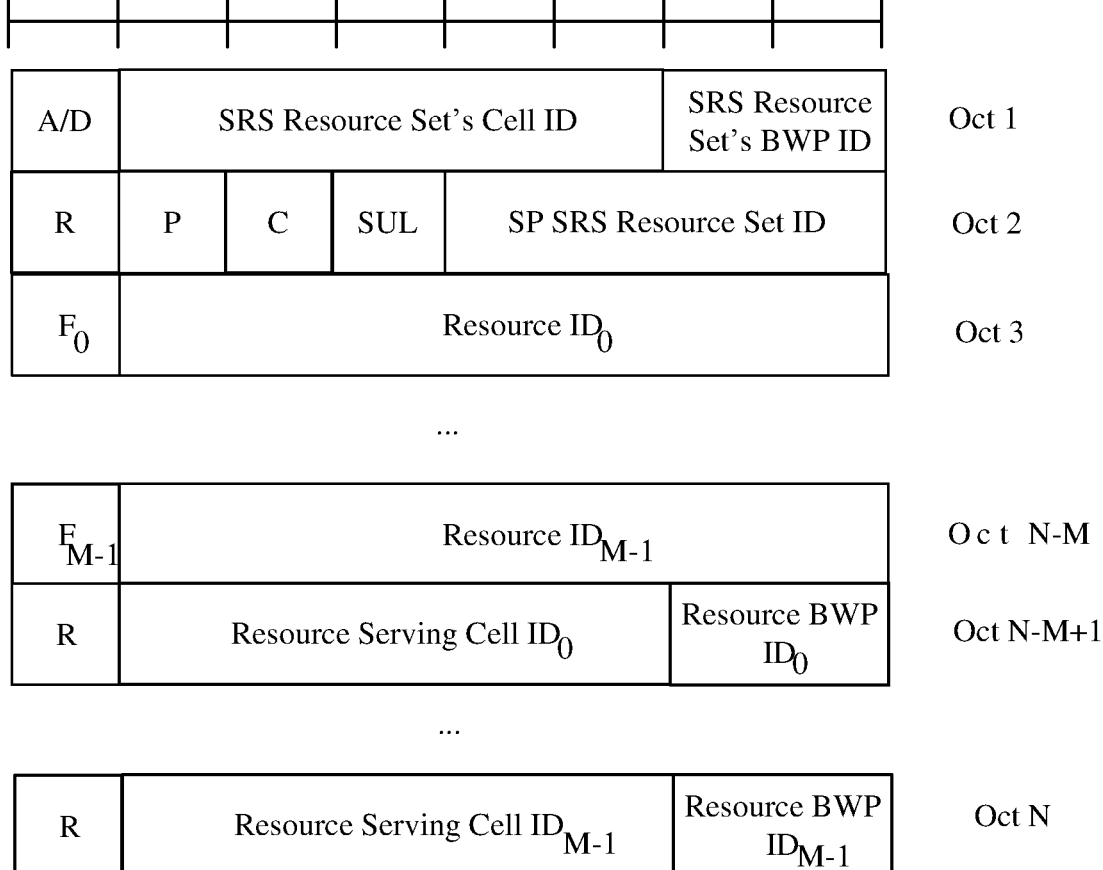
FIG. 5 illustrates, a MAC-CE block for activation or deactivation of a single semi-persistent sounding reference signals.

FIG. 5, by way of example, illustrates, a MAC-CE block 500 for activation or deactivation of a single semi-persistent (SP) SRS. As illustrated, the MAC-CE block 500 includes the following fields.

An A/D field indicates whether to activate or deactivate the indicated SP SRS resource set. The field is set to 1 to indicate activation, otherwise it indicates deactivation.

The SRS Resource Set's Cell ID field indicates the identity of the Serving Cell, which contains activated/deactivated SP SRS Resource Set. If the C field is set to 0, this field also indicates the identity of the Serving Cell which contains all resources indicated by the Resource $ID_i$ fields. The length of the field is 5 bits.

The SRS Resource Set's BWP ID field indicates a UL bandwidth part (BWP) as the codepoint of the DCI bandwidth part indicator field as specified in 3GPP Technical Specification (TS) 38.212, which contains activated/deactivated SP SRS Resource Set. If the C field is set to 0, this field also indicates the identity of the BWP which contains all resources indicated by the Resource $ID_i$ fields. The length of the field is 2 bits.

Thus, the SRS Resource Set's Cell ID and SRS Resource Set's BWP ID field respectively identify the serving cell and the component carrier (CC) of the SP SRS, which is generally needed, because the SRS resource set ID is locally defined. Accordingly, to uniquely identify an SRS resource set, within the context of a serving cell and BWP of a CC, the cell-ID, BWP-ID, and SRS Resource Set ID are needed.

The C field indicates whether the octets containing Resource Serving Cell ID field(s) and Resource BWP ID field(s) are present. If this field is set to 1, the octets containing Resource Serving Cell ID field(s) and Resource BWP ID field(s) are present, otherwise they are not present.

The SUL field indicates whether the MAC CE applies to the NUL carrier or SUL carrier configuration. This field is set to 1 to indicate that it applies to the Supplementary Uplink (SUL) carrier configuration, and it is set to 0 to indicate that it applies to the Normal Uplink (NUL) carrier configuration;

The SP SRS Resource Set ID field indicates the SP SRS Resource Set ID identified by SRS-ResourceSetId as specified in 3GPP TS 38.331, which is to be activated or deactivated. The length of the field is 4 bits.

The $F_i$ field indicates the type of a resource used as a spatial relationship for SRS resource within SP SRS Resource Set indicated with SP SRS Resource Set ID field. $F_0$ refers to the first SRS resource within the resource set, $F_1$ to the second one and so on. The field is set to 1 to indicate non-zero power (NZP) channel state information reference signal (CSI-RS) resource index is used, and it is set to 0 to indicate either SSB index or SRS resource index is used. The length of the field is 1 bit. This field is only present if MAC CE is used for activation, i.e. the A/D field is set to 1.

The Resource $ID_i$ field contains an identifier of the resource used for spatial relationship derivation for SRS resource i. Resource $ID_0$ refers to the first SRS resource within the resource set, Resource $ID_1$ to the second one and so on. If $F_i$ is set to 0, and the first bit of this field is set to 1, the remainder of this field contains synchronization signal block (SSB)-Index as specified in 3GPP TS 38.331. If $F_i$ is set to 0, and the first bit of this field is set to 0, the remainder of this field contains SRS-ResourceId as specified in 3GPP TS 38.331. The length of the field is 7 bits. This field is only present if MAC CE is used for activation, i.e. the A/D field is set to 1.

The Resource Serving Cell $ID_i$ field indicates the identity of the Serving Cell on which the resource used for spatial relationship derivation for SRS resource i is located. The length of the field is 5 bits. Thus, the Resource Serving Cell $ID_i$ field is an indicator of the CC ID of the SRS or CSI-RS used for spatial relation The Resource BWP $ID_i$ field indicates a UL BWP as the codepoint of the DCI bandwidth part indicator field as specified in 3GPP TS 38.212, on which the resource used for spatial relationship derivation for SRS resource i is located. The length of the field is 2 bits. Thus, the Resource BWP $ID_i$ field is an indicator of the BWP ID of the SRS used for spatial relation.

The R field is a reserved bit and is set to 0.

The $F_i$ field and the Resource $ID_i$ field provide spatial relation information that is configured per SRS resource. For example, for SRS for positioning, the spatial relation may come from an SRS resource for "communication" (Fi=0); SSB (Fi=0); or CSI-RS resource (Fi=1).

If the spatial relation information where to indicate that the spatial relation comes from a DL-PRS, the following parameters of the DL-PRS may be provided in the UL-SRS for positioning configuration in the MAC-CE block. The DL-PRS ID may be provided, which can be associated with multiple DL-PRS Resource Sets associated with a single TRP. Additionally, the DL PRS Resource Set ID and the DL PRS Resource ID are provided.

A DL PRS Resource may be uniquely identified, e.g., using an identity that can be associated with multiple DL PRS Resource Sets associated with a single TRP. The identity may be used along with a DL PRS Resource Set ID, which is locally defined within the TRP, and a DL PRS Resources ID, which are locally defined within DL PRS Resource Set, to uniquely identify the DL PRS Resource. Each TRP may be only associated with one such identity.

With respect to DL PRS quasi-collocation (QCL), for a DL PRS resource, QCL Type-C (Doppler shift, average delay) from an SSB from a TRP may be supported. For positioning purposes, to assist a UE to perform receive (Rx) beamforming, the DL PRS may be configured to be QCL Type-D (spatial Rx parameter) with a DL Reference Signal from a serving or neighboring cell. Either SSB or DL-PRS may be the QCL Type D source of DL-PRS. If the DL PRS QCL information for a DL-PRS Resource of a TRP indicates "QCL Type-D from a DL-PRS Resource," the DL-PRS Resource Set ID and the DL-PRS-Resource ID for the indicated source DL-PRS Resource may be provided. The QCL relation between two DL-PRS Resources may only be provided for DL-PRS Resources of the same TRP. The SSB index indicated for QCL Type-D and QCL Type-C for a DL-PRS resource may be the same.

If the spatial relation information indicates that the spatial relation comes from an SRS resource, the following parameters for the SRS for positioning may be provided: the SRS Resource ID, the UL BWP ID and the serving cell ID.

The maximum number of supported SRS resource sets for positioning is based on the UE capability, and may be configurable up to 16 resource sets per BWP.

When spatialRelationInfo is activated or updated for a semi-persistent or aperiodic SRS resource by a MAC CE for a set of CCs and/or BWPs, where the applicable list of CCs is indicated by higher layer parameter, e.g., applicableCellList, the spatialRelationInfo is applied for the semi-persistent or aperiodic SRS resource(s) with the same SRS resource ID for all the BWPs in the indicated CCs.

The spatial relation information that may be signaled for SP SRS may be summarized in Table 5.

transmission from the UE towards different subsets of TRPs. For example, up to 16 SRS resource sets for positioning per BWP per UE may be supported.

Current implementation contemplates a separate MAC-CE command for activation/deactivation of each SRS resource set. Multiple MAC-CE commands, however, would not be optimal with respect to overhead. Additionally, due to the high overhead, a high latency may be expected. Similar problems are associated with the use of multiple MAC-CE commands to activate/deactivate the UE's reception of SP DL PRS.

In accordance with an implementation, a single MAC-CE block may be defined that is used to activate or deactivate in a UE the transmission of multiple UL PRS (e.g., SRS for positioning) or the reception of multiple DL PRS, or a combination of transmission of multiple UL PRS and reception of multiple DL PRS. For example, a single MAC-CE block may be used to activate or deactivate transmissions of multiple SRS resource sets for positioning. In another example, a single MAC-CE block may be used to activate or deactivate reception of multiple DL PRS resources resource sets of frequency layers. In another example, a single MAC-CE block may be used to jointly activate or deactivate transmissions of multiple SRS resource sets for positioning and reception of multiple DL PRS resources resource sets of frequency layers, which may be used, for example, for multiple cell RTT positioning. With the use of a single MAC-CE to activate or deactivate multiple DL and/or UL PRS resource sets, fewer bits will be required and, thus, less overhead and latency, compared to the case where one MAC-CE block is used for each separate DL or UL PRS resource set.

Figure 6:
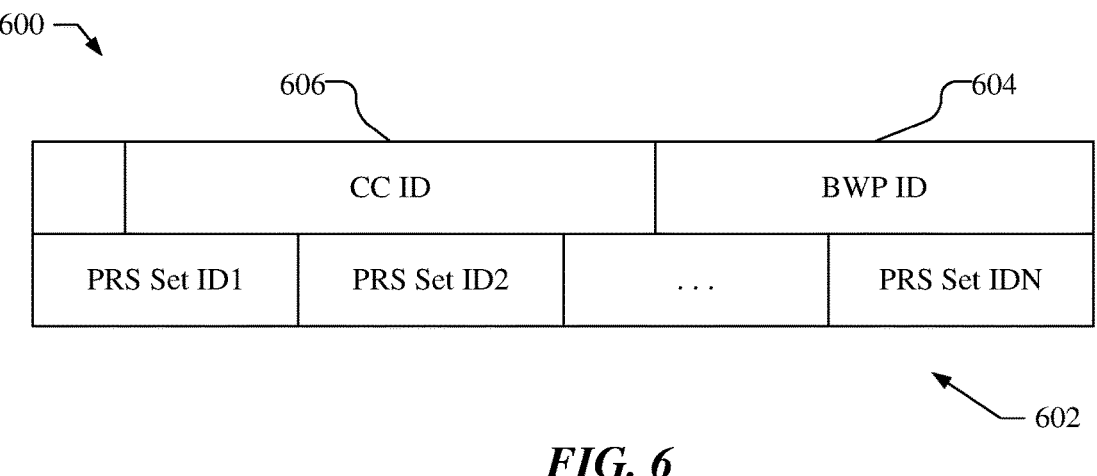
FIGS. 6-13 illustrate various implementations of a MAC-CE block that may be used to activate or deactivate multiple DL and/or UL PRS resource sets.

FIG. 6, by way of example, illustrates an implementation of a MAC-CE block 600 that may be used to activate or deactivate multiple DL or UL PRS resource sets. As illustrated in FIG. 6, the MAC-CE block 600 includes multiple PRS resource set identifiers (IDs) 602 with a single BWP ID 604 and a single component carrier (CC) ID 606. The BWP ID 604 provides an identifier for the BWP and the CC ID provides an identifier of the component carrier that are associated with the multiple PRS resource sets indicated by the multiple PRS resource set IDs 602. It should be under-

TABLE 5

| Case ID for QCL Source of Each SRS Resource of the SP SRS | Description | Bits | Why? |
| --- | --- | --- | --- |
| Case 1 | SRS resource for "communication" | 6 | Up to 64 resources per BWP and the BWP ID is provided separately |
| Case 2 | SSB ID | 6 | Up to 64 resources per CC |
|  | PCI for SSB | 8 | Up to 256 TRPs across all FLs per UE (X6) |
| Case 3 | CSIRS resource ID | 8 | Up to 192 resources. So this needs 8 bits. |
| Case 4 | SRS resource ID for positioning | 6 | Up to 64 resources per BWP and the BWP ID is provided separately |
| Case 5 | DL PRS resource ID in the set | 6 | Definition of X4 with max value set to 64 |
|  | DL PRS resource set ID of the TRP | 3 | Up to 2 sets per FL per TRP |
|  | DL-PRS ID | 8 | Up to 256 TRPs across all FLs per UE (X6) |

Multiple SRS resource sets may be needed to be triggered to a UE. Each SRS resource set may have a different Tx Beam and/or power control parameters, for an optimization stood that the MAC-CE block 600 may include additional fields, such as those illustrated in FIG. 5 or described in FIGS. 7-10. The multiple PRS resource set IDs 602 may be DL PRS or for UL PRS, e.g., SRS for positioning. The multiple PRS resource set IDs 602 are illustrated as a plurality of separate fields in the MAC-CE block 600, but may be a single field that includes a list with the multiple PRS resource set IDs. With MAC-CE block 600, all of the PRS resource sets identified by PRS resource set IDs 602 correspond to the single BWP identified with the BWP ID 604 and correspond to the single CC identified with the CC ID 606. Accordingly, with the use of MAC-CE block 600, there is no need to separately configure the BWP and CC for each activated or deactivated DL or UL PRS.

Figure 7:
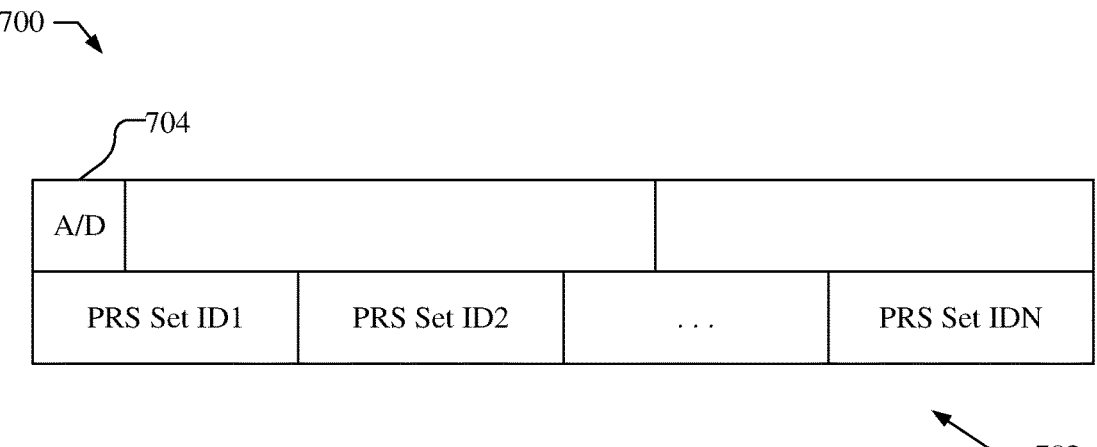

FIG. 7 illustrates an implementation of a MAC-CE block 700 that may be used to activate or deactivate multiple DL or UL PRS resource sets. As illustrated in FIG. 7, the MAC-CE block 700 includes multiple PRS resource set IDs 702 with a single A/D field 704 that indicates whether to activate or deactivate all of the indicated PRS resource sets, e.g., with a 1 to indicate activation and a 0 to indicate deactivation. It should be understood that the MAC-CE block 700 may include additional fields such as those illustrated in FIG. 5 or described in FIGS. 6 and 8-10. The multiple PRS resource set IDs 702 may be DL PRS or for UL PRS, e.g., SRS for positioning. The multiple PRS resource set IDs 702 are illustrated as a plurality of separate fields in the MAC-CE block 700, but may be a single field that includes a list with the multiple PRS resource set IDs. With MAC-CE block 700, all of the PRS resource sets identified by PRS resource set IDs 702 are either activated or deactivated with the same A/D field 704.

Figure 8:
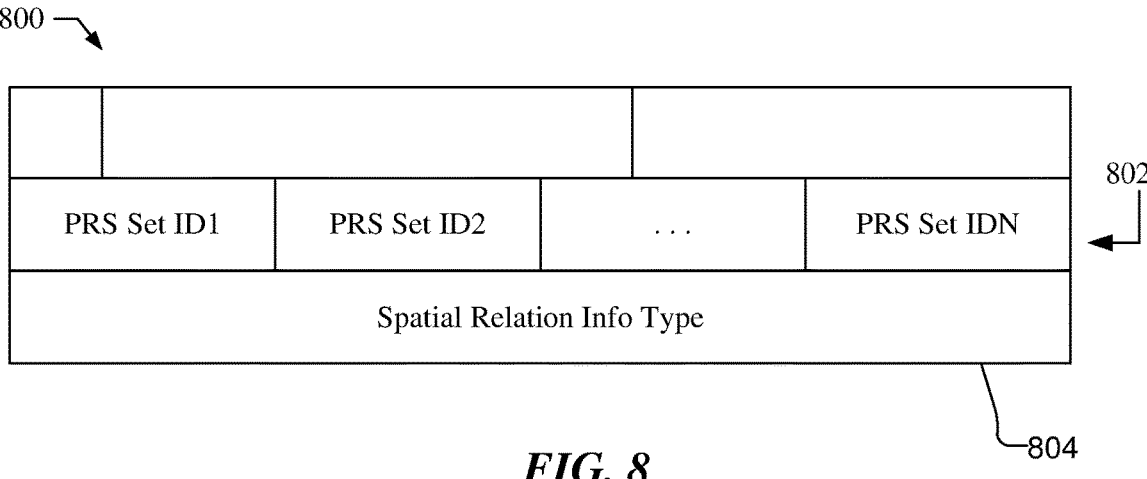

FIG. 8 illustrates an implementation of a MAC-CE block 800 that may be used to activate multiple DL or UL PRS resource sets. As illustrated in FIG. 8, the MAC-CE block 800 includes multiple PRS resource set IDs 802 with a single spatial relation info type 804 that indicates the type or case of spatial relation reference signal. The type or case of spatial relation reference signal, for example, identifies the type of reference signal that is used to indicate what uplink transmission beam the UE may use for precoding the UL PRS resource sets. For DL PRS, the spatial relation information is sometimes referred to as QCL source or transmission configuration indicator (TCI) state. The type or case of spatial relation reference signal may be, e.g., UL PRS, DL PRS, SSB or CSIRS. It should be understood that the MAC-CE block 800 may include additional fields such as those illustrated in FIG. 5 or described in FIGS. 6, 7, 9, and 10. The multiple PRS resource set IDs 802 may be DL PRS or for UL PRS, e.g., SRS for positioning. The multiple PRS resource set IDs 802 are illustrated as a plurality of separate fields in the MAC-CE block 800, but may be a single field that includes a list with the multiple PRS resource set IDs. With MAC-CE block 800, all of the PRS resource sets identified by PRS resource set IDs 802 have the same type of spatial relation reference signal.

Figure 9:
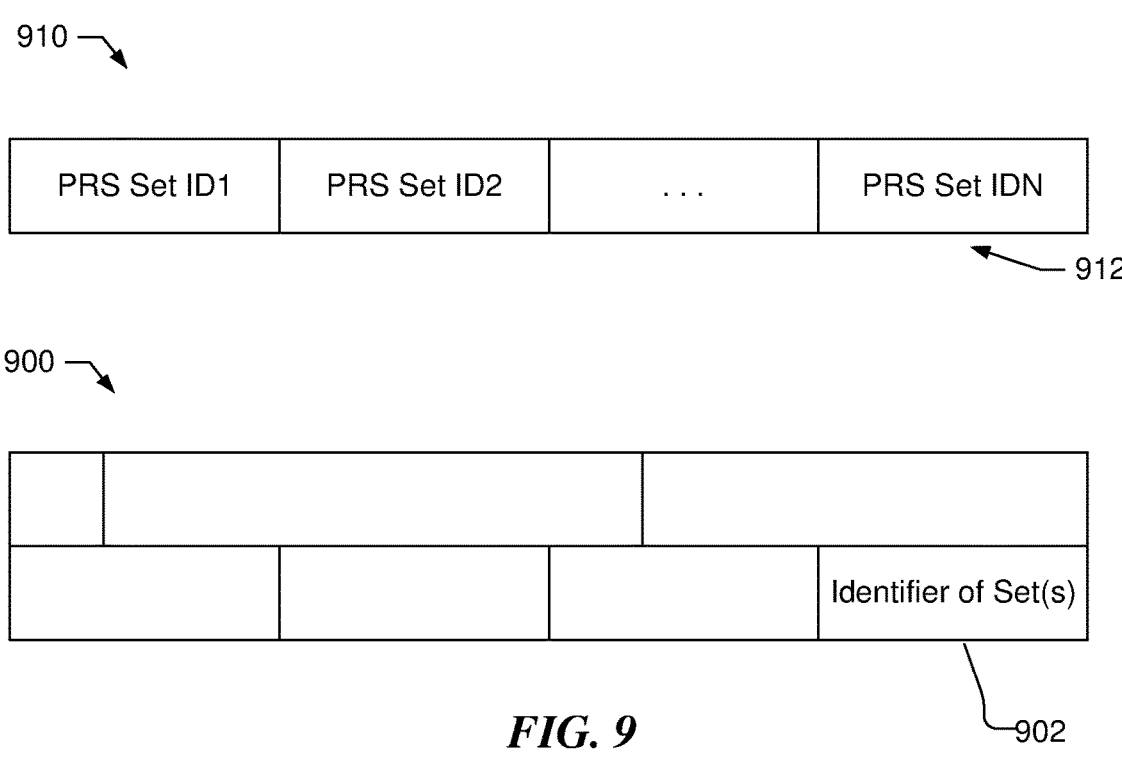

FIG. 9 illustrates an implementation of a MAC-CE block 900 and an RRC 910 that may be used to activate or deactivate multiple DL and/or UL PRS resource sets. As illustrated in FIG. 9, the RRC 910 includes multiple PRS resource set IDs 912 that may be activated or deactivated by a MAC-CE block 900. The multiple PRS resource set IDs 912 are illustrated as a plurality of separate fields in the RRC 910, but may be a single field that includes a list with the multiple PRS resource set IDs. In one implementation, the RRC 910 may include a list containing a collection of PRS resource sets, such as Row 1: {Set0, Set1}, Row 2: {Set2, Set3}, etc. The MAC-CE 900 includes an identifier field 902 that indicates one or more of the collection of PRS resource sets from the RRC 910 to activate or deactivate. It should be understood that the MAC-CE block 900 may include additional fields such as those illustrated in FIG. 5 or described in FIGS. 6-8 and 10. The multiple PRS resource set IDs 912 in RRC 910 may be DL PRS or for UL PRS, e.g., SRS for positioning. With the use of MAC-CE block 900 and RRC 910, multiple PRS resource sets may be indicated for activation or deactivation without the need to dedicate 4 bits for each PRS resource set in the MAC-CE block 900.

Figure 10:
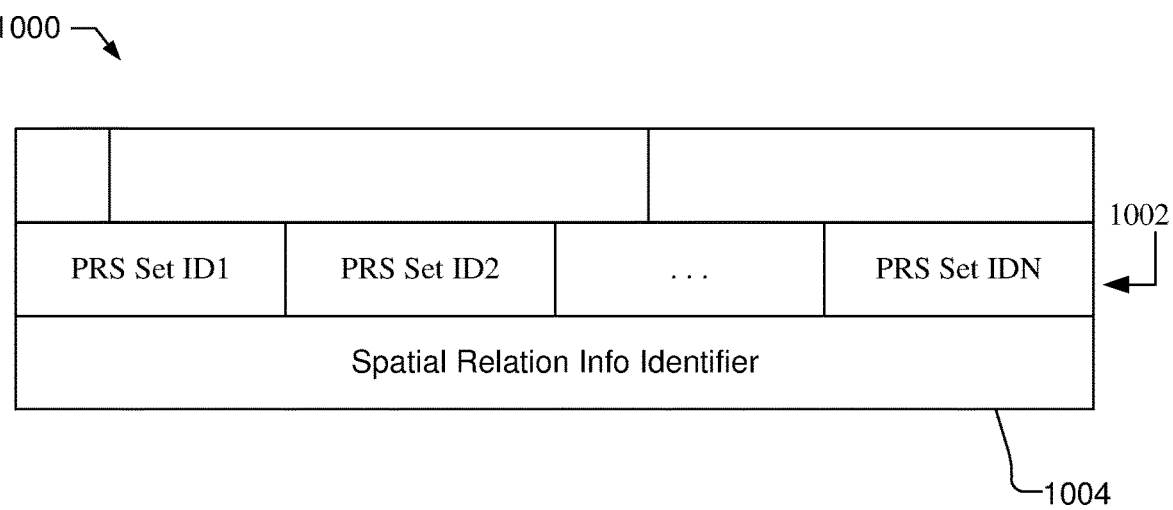

FIG. 10 illustrates an implementation of a MAC-CE block 1000 that may be used to activate multiple DL or UL PRS resource sets. As illustrated in FIG. 10, the MAC-CE block 1000 includes multiple PRS resource set IDs 1002 with a single spatial relation info ID 104 that indicate the identity of the spatial relation reference signal. The identity of the spatial relation reference signal, for example, identifies the reference signal beam that is used to indicate what uplink transmission beam the UE may use for precoding the UL PRS resource sets. For DL PRS, the spatial relation information is sometimes referred to as QCL source or transmission configuration indicator (TCI) state. It should be understood that the MAC-CE block 1000 may include additional fields such as those illustrated in FIG. 5 or described in FIGS. 6-9. The multiple PRS resource set IDs 1002 may be DL PRS or for UL PRS, e.g., SRS for positioning. The multiple PRS resource set IDs 1002 are illustrated as a plurality of separate fields in the MAC-CE block 1000, but may be a single field that includes a list with the multiple PRS resource set IDs. With MAC-CE block 1000, all of the PRS resource sets identified by PRS resource set IDs 1002 have the same spatial relation reference signal.

Figures 11, 12:
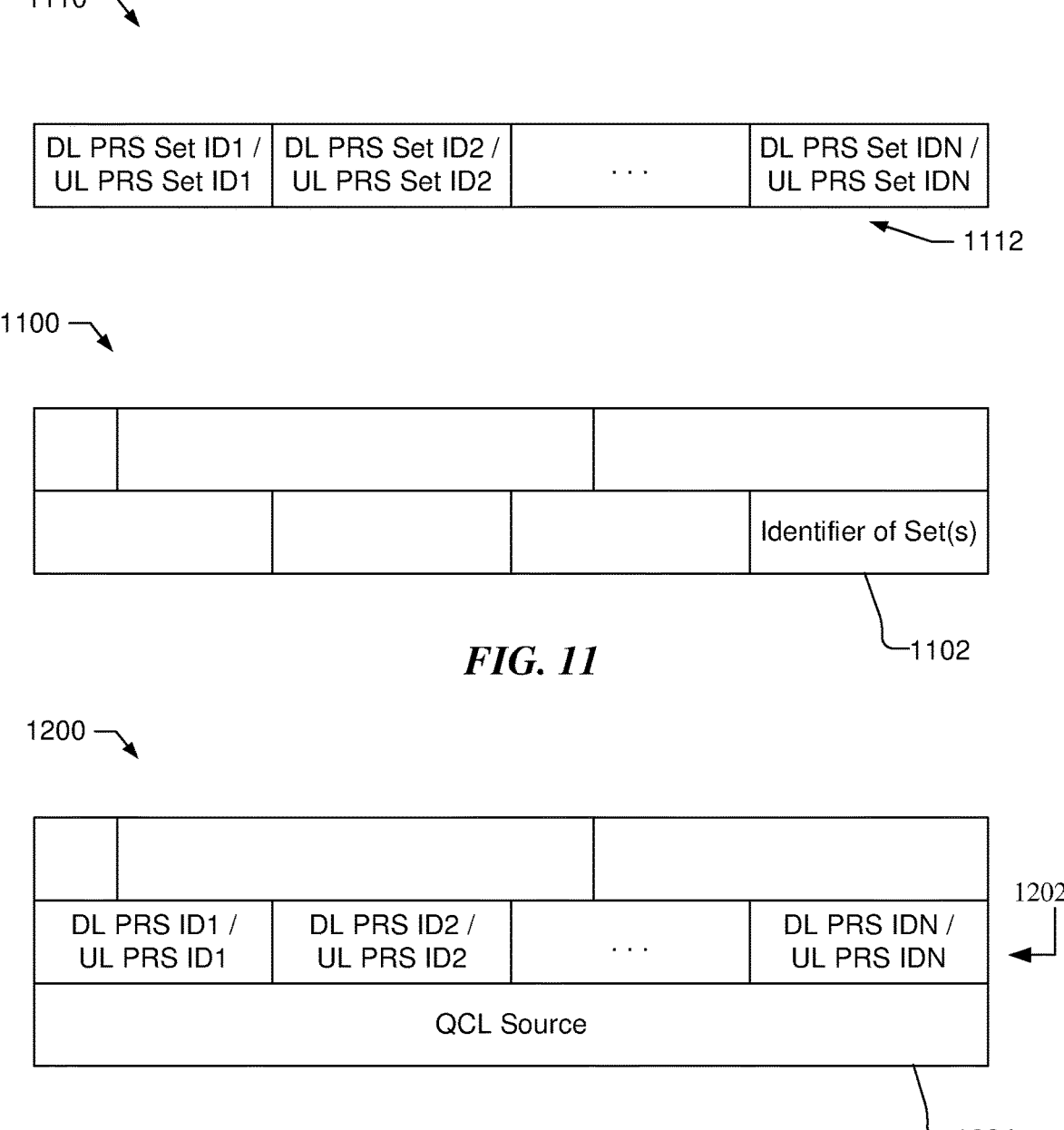

FIG. 11 illustrates an implementation of a MAC-CE block 1100 and an RRC 1110 that may be used to jointly activate or deactivate multiple DL and UL PRS resource sets. As illustrated in FIG. 11, the RRC 1110 includes a plurality of different sets of joint UL PRS and DL PRS 1112, e.g., listed as tuples of a DL-PRS resource or resource set IDs and UL PRS (e.g., SRS for positioning) resource set IDs. The joint UL PRS resource sets IDs and DL PRS resource set IDs are illustrated as a plurality of separate fields in the MAC-CE block 1100, but may be a single field that includes a list with the joint UL PRS resource sets IDs and DL PRS resource set IDs. The different sets of multiple UL PRS and multiple DL PRS listed in RRC 1110 may be activated or deactivated by the MAC-CE block 1100. The MAC-CE block 1100 may include an identifier field 1102 that indicates one or more of the different sets of multiple UL PRS and multiple DL PRS from the RRC 1110 to activate or deactivate. It should be understood that the MAC-CE block 1100 may include additional fields such as those illustrated in FIG. 5 or described in FIGS. 6-8, and 10. With the use of MAC-CE block 1100 and RRC 1110, multiple UL and DL PRS resource sets may be indicated for activation or deactivation without the need to dedicate 4 bits for each separate UL and DL PRS resource set in the MAC-CE block 1100.

FIG. 12 illustrates an implementation of a MAC-CE block 1200 that may be used to jointly activate multiple DL and UL PRS resource sets. As illustrated in FIG. 12, the MAC-CE block 1200 includes a plurality of different sets of joint UL PRS IDs and DL PRS IDs 1202 with a single QCL field 1204 that indicates the QCL source for the indicated joint UL PRS and DL PRS to be activated. For DL PRS, the QCL source is sometimes referred to as spatial relation information. The joint UL PRS resource sets IDs and DL PRS IDs 1202 are illustrated as a plurality of separate fields in the MAC-CE block 1200, but may be a single field that includes a list with the joint UL PRS resource sets IDs and DL PRS resource set IDs. The identity of the QCL source, for example, identifies the reference signal beam that is used to indicate what uplink transmission beam the UE may use for precoding the SRS. It should be understood that the MAC-CE block 1200 may include additional fields such as those illustrated in FIG. 5 or described in FIGS. 6-9. With MAC-CE block 1200, all of the PRS resource sets identified by UL and DL PRS resource set IDs 1202 have the same QCL field and there is no need to separately configure a QCL field for each UL and each DL PRS resource set. Additionally, in one implementation, when a QCL source identified in QCL field 1204 for activated DL-PRS resource sets and SRS resource sets is another DL-PRS resource, there is no need to add a TRP-ID, e.g., PRS resource set ID, field as it will be the same as that of the active DL PRS resource set. For example, the TRP ID of the DL PRS that is used as the QCL source must be from the same TRP as that of the activated DL PRS.

While FIGS. 6-12 separately illustrate various fields that may be used with a single MAC-CE block that may be used to activate or deactivate multiple DL and/or UL PRS resource sets, any combination of fields may be included in a MAC-CE block, and additional fields may be used as well, e.g., such as those disclosed in FIG. 5.

Figure 13:
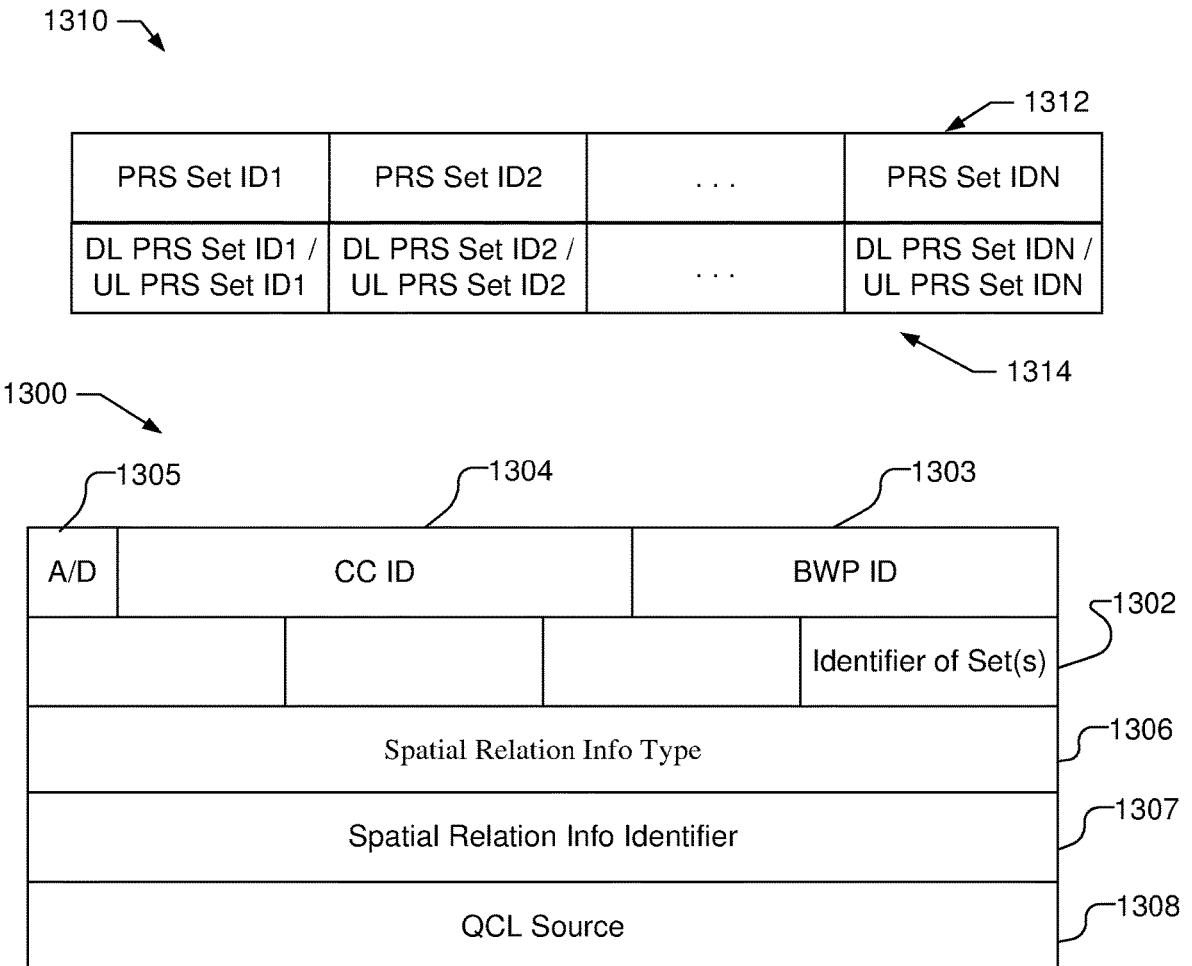

FIG. 13, by way of example, illustrates an implementation of a MAC-CE block 1300 that includes all of the fields discussed in FIGS. 6-12 to activate or deactivate multiple DL and/or UL PRS resource sets. FIG. 13, for example, illustrates an RRC 1310 that includes multiple PRS resource set IDs 1312 that may be activated or deactivated by a MAC-CE block 1300 and a number of sets 1314 of tuples of UL PRS and DL PRS that may be jointly activated or deactivated by a MAC-CE block 1300. The multiple PRS resource set IDs 131 may be DL PRS or for UL PRS, e.g., SRS for positioning. The multiple PRS resource set IDs 1312 and joint UL PRS resource set IDs and DL PRS resource set IDs are illustrated as a plurality of separate fields in the RRC 1310, but may be a single field or two fields that includes a list with multiple PRS resource set IDs and the joint UL PRS resource sets IDs and DL PRS resource set IDs. In some implementations, the PRS resource set IDs 1312 and the sets 1314 of tuples of UL PRS and DL PRS may be provided by separate RRCs. The MAC-CE block 1300 may include an identifier field 1302 that indicates one or more of the PRS resource set IDs 1312 or the sets 1314 of tuples of UL PRS and DL PRS from the RRC 1310 to activate or deactivate. The MAC-CE block 1300 may further include a BWP ID 1303 and CC ID 1304, to identify a single BWP and CC that corresponds with the activated or deactivated multiple UL and/or DL PRS. The MAC-CE block 1300 may further include an A/D field 1305 to indicate whether the indicated multiple UL and/or DL PRS are activated or deactivated. The MAC-CE block 1300 may further include a spatial relation info type 1306, a spatial relation info identifier 1307, and QCL source 1308 that corresponds to the indicated multiple UL and/or DL PRS.

Figure 14:
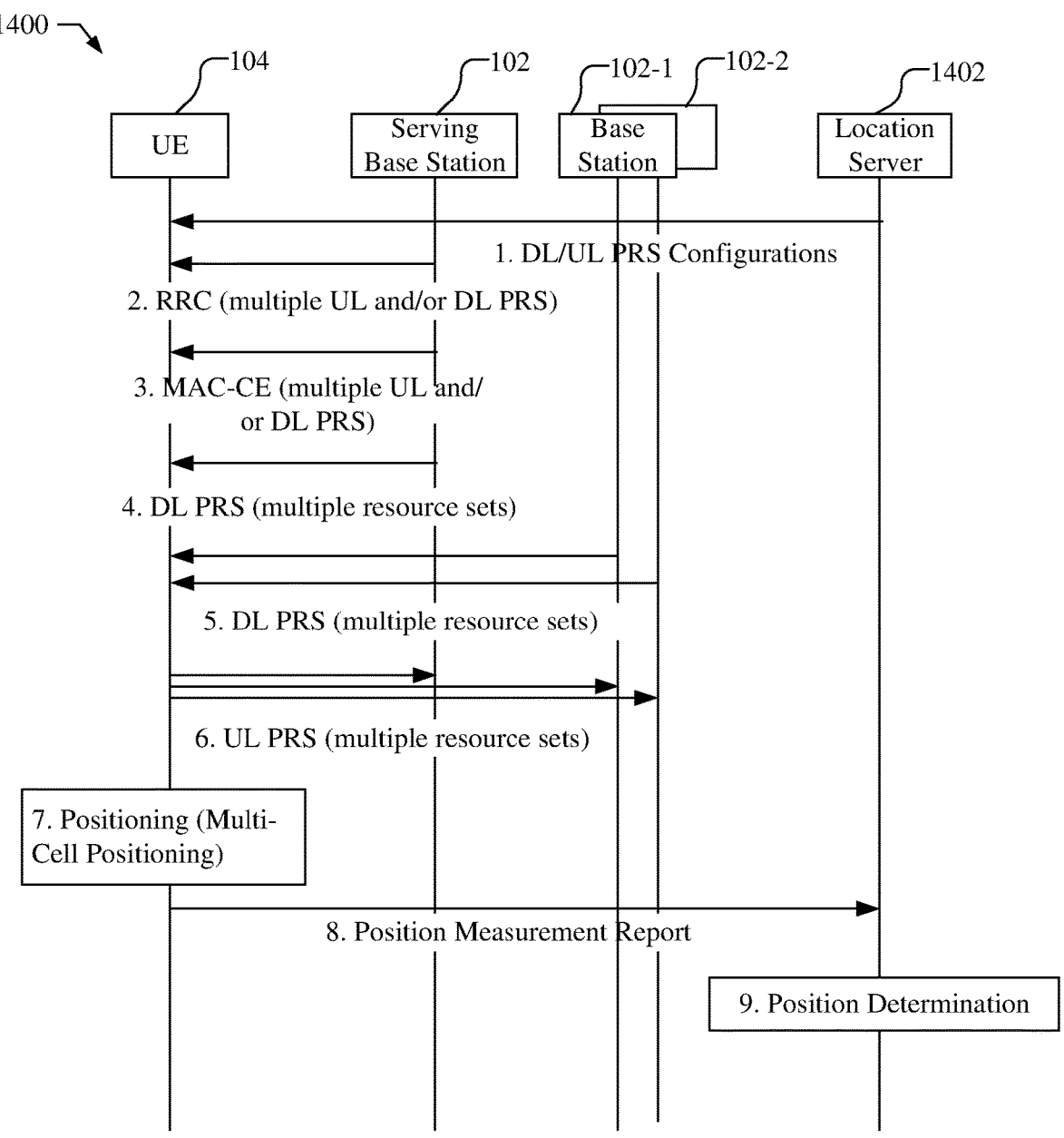
FIG. 14 is a message flow with various messages sent between components of a wireless communication system, illustrating the activation or deactivation of multiple DL and/or UL PRS resource sets using a single MAC-CE.

FIG. 14 is a message flow 1400 with various messages sent between components of the communication system 100 depicted in FIG. 1, illustrating the activation or deactivation of multiple DL and/or UL PRS resource sets using a single MAC-CE. Location server 1402 may be, e.g., location server 172 shown in FIG. 1, location server 230a, 230b of FIG. 2A or LMF 270 of FIG. 2B. The UE 104 may be configured to perform UE assisted positioning or UE based positioning, in which the UE itself determines its location using, for example, assistance data provided to it, and may be configured to perform multi-cell RTT positioning. In the message flow 1400, it is assumed that the UE 104 and location server 1402 communicate using the LPP positioning protocol referred to earlier, although use of NPP or a combination of LPP and NPP or other future protocol, such as NRPPa, is also possible. It should be understood that preliminary or additional conventional stages not shown in FIG. 14 may be performed, such as capability requests and responses, requests for and providing assistance data, etc.

At stage 1, the serving base station 102 provides a configuration for at least one of multiple DL PRS, multiple UL PRS (e.g., SRS for positioning), or a combination thereof to the UE 104. The serving base station 102, for example, may receive the configuration from location server 1402 and provide the configuration to the UE 104. The configuration of the multiple DL and/or UL PRS, for example, for example, may be defined per BWP and may define a list of PRS resources and a list of PRS resource sets, where resource set defines a set of PRS resources.

At stage 2, as indicated by the dotted line, the UE 104 may optionally receive from the serving base station 102 a message, such as an RRC message, that includes plurality of different sets of UL PRS or DL PRS that may be activated or deactivated by a single MAC-CE block and/or a plurality of different sets of UL PRS or DL PRS that may be jointly activated or deactivated by a single MAC-CE block. For example, an RRC message may include multiple different sets of PRS resource IDs for DL PRS to be received, UL PRS to be transmitted. The sets of PRS resource IDS may, for example, include tuples of DL PRS resource IDs and UL PRS resource IDs for DL PRS and UL PRS that are to be jointly activated or deactivated.

At stage 3, the UE 104 receives from the serving base station 102 a single MAC-CE block that activates or deactivates at least one of transmissions of the multiple UL PRS; reception of the multiple DL PRS, or the combination thereof. The MAC-CE block, for example, may activate or deactivate the transmission of multiple UL PRS, e.g., SRS for positioning, by identifying multiple UL PRS resource sets, wherein each UL PRS resource set includes at least on UL PRS resource. The MAC-CE block may activate or deactivate the reception of multiple DL PRS, e.g., by identifying multiple DL PRS resources, multiple DL PRS resource sets, or multiple DL PRS frequency layers. The MAC-CE block may activate or deactivate the transmutation of UL PRS and reception of DL PRS jointly, e.g., by identifying multiple UL PRS resource sets and associated multiple DL PRS resources, multiple DL PRS resource sets, or multiple DL PRS frequency layers. The MAC-CE block may identify the multiple UL and/or DL PRS using an identifier field that refers to one or more of the plurality of different sets of UL PRS and/or DL PRS in RRC message received at stage 2. In addition to identifying the multiple UL and/or DL PRS, the MAC-CE block may identify a single BWP ID and CC ID for all of the multiple UL and/or DL PRS. The MAC-CE block may include a single activate/deactivate (A/D) bit for all of the multiple UL and/or DL PRS. The MAC-CE block may include a single type or single case, e.g., UL PRS, DL PRS, SSB or CSIRS, of spatial relation for all of the multiple UL and/or DL PRS. The MAC-CE block may include spatial relation information identifier, e.g., that indicates the identity of the spatial relation reference signal for all of the multiple UL and/or DL PRS. The MAC-CE block may include a QCL field identifying the QCL source for multiple UL and DL PRS that are to be activated jointly.

At stage 4, the UE 104 may activate or deactivate reception of multiple DL PRS transmitted by the serving base station 102 in response to the single MAC-CE block received at stage 3. For example, the UE 104 may activate or deactivate multiple DL PRS resources, multiple DL PRS resource sets, or multiple DL PRS frequency layers as identified by the MAC-CE block received at stage 3. Stage 4 may be performed, for example, if MAC-CE identified DL PRS to be activated or deactivated either without UL PRS or jointly with UL PRS.

At stage 5, the UE 104 may activate or deactivate reception of multiple DL PRS transmitted by the neighbor base stations 102-1 and 102-2 in response to the single MAC-CE block received at stage 3. For example, the UE 104 may activate or deactivate multiple DL PRS resources, multiple DL PRS resource sets, or multiple DL PRS frequency layers as identified by the MAC-CE block received at stage 3. Stage 5 may be performed, for example, if MAC-CE identified DL PRS to be activated or deactivated either without UL PRS or jointly with UL PRS.

At stage 6, the UE 104 may activate or deactivate transmission of multiple UL PRS, e.g., SRS for positioning, to the serving base station 102 and the neighbor base stations 102-1 and 102-2 in response to the single MAC-CE block received at stage 3. For example, the UE 104 may activate or deactivate multiple UL PRS resource sets as identified by the MAC-CE block received at stage 3. Stage 6 may be performed, for example, if MAC-CE identified UL PRS to be activated or deactivated either without DL PRS or jointly with DL PRS.

At stage 7, the UE 104 may perform positioning measurements using the received DL PRS and/or transmitted UL PRS from stages 4, 5, and 6 after being activated or deactivated by MAC-CE block from stage 3. The UE 104 may perform positioning methods such as time of arrival (TOA), reference signal time difference (RSTD), time difference of arrival (TDOA), reference signal received power (RSRP), time difference between reception and transmission of signals (Rx-Tx), etc. In some implementations, the multiple DL PRS and UL PRS may be jointly activated or deactivated by the MAC-CE block from stage 3, and positioning measurements performed by the joint DL PRS and UL PRS may be, e.g., multi-cell RTT positioning measurements. In UE based positioning methods, the UE may further determine a position estimate using the position measurements, e.g., using positions of base stations, which may be provided in an assistance data message (not shown).

At stage 8, the UE 104 may transmit a position measurement report to the location server 1402, e.g., using LPP messaging. The position measurement report may provide the position measurements and/or position estimate, if determined, from stage 7.

At stage 9, the location server 1402 may determine the UE location based on any positioning measurements received at stage 8, or may verify the UE location received at stage 8.

FIG. 15 shows a flowchart for an exemplary method 1500 for position of a user equipment (UE), such as UE 104, performed by the UE, in a manner consistent with disclosed implementation.

At block 1502, the UE receives a configuration of at least one of multiple downlink (DL) Positioning Reference Signals (PRS), multiple uplink (UL) PRS, or a combination thereof from a network entity, such as a location server, as discussed, e.g., at stage 1 of FIG. 14. At block 1504, a single Medium Access Control-Control Element (MAC-CE) block is received from a serving base station that activates or deactivates at least one of transmissions of the multiple UL PRS; reception of the multiple DL PRS, or the combination thereof, e.g., as discussed at stage 3 of FIG. 14. At block 1506, in response to the single MAC-CE block, at least one of the transmissions of the multiple UL PRS, reception of the multiple DL PRS, or the combination thereof is activated or deactivated, e.g., as discussed at stages 4, 5, and 6 of FIG. 14.

In one implementation, the single MAC-CE block activates or deactivates transmissions of multiple UL PRS resource sets, wherein each UL PRS resource set comprises at least one PRS resource, and in response, the UE activates or deactivates transmissions of the multiple UL PRS, e.g., as discussed at stages 3 and 6 of FIG. 14. The at least one UL PRS resource, for example, may be at least one Sounding Reference Signals resource (SRS) for positioning.

In one implementation, the single MAC-CE block activates or deactivates reception of multiple DL PRS resources, multiple DL PRS resource sets, or multiple DL PRS frequency layers, and in response, the method comprises activating or deactivating reception of the multiple DL PRS resources, multiple DL PRS resource sets, or multiple DL PRS frequency layers, e.g., as discussed at stages 3-5 of FIG. 14.

In one implementation, the single MAC-CE block activates or deactivates transmission of multiple UL PRS resource sets for positioning and reception of multiple DL PRS resources, multiple DL PRS resource sets, or multiple DL PRS frequency layers, and in response, the UE activates or deactivates transmission of the multiple UL PRS resource sets for positioning and reception of the multiple DL PRS resources, multiple DL PRS resource sets, or multiple DL PRS frequency layers, e.g., as discussed at stages 3-6 of FIG. 14. The UE may further perform multiple cell RTT positioning using transmitted multiple UL PRS resource sets for positioning and received multiple DL PRS resources, multiple DL PRS resource sets, or multiple DL PRS frequency layers, e.g., as discussed at stage 7 of FIG. 14.

In one implementation, the single MAC-CE block comprises a resource set identifier (ID) for each of the multiple UL PRS or multiple DL PRS, and further comprises a single bandwidth part (BWP) ID and a single component carrier (CC) ID for all of the multiple UL PRS, multiple DL PRS, or combination thereof, e.g., as discussed at FIGS. 6 and 13 and stage 3 of FIG. 14.

In one implementation, the single MAC-CE block comprises a resource set identifier (ID) for each of the multiple UL PRS or multiple DL PRS, and further comprises a single activate/deactivate (A/D) bit for all of the multiple UL PRS, multiple DL PRS, or combination thereof, e.g., as discussed at FIGS. 7 and 13 and stage 3 of FIG. 14.

In one implementation, the single MAC-CE block comprises a resource set identifier (ID) for each of the multiple UL PRS or multiple DL PRS, and further comprises a single type or single case of spatial relation for all of the multiple UL PRS, multiple DL PRS, or combination thereof, e.g., as discussed at FIGS. 8 and 13 and stage 3 of FIG. 14.

In one implementation, the UE may further receive a Radio Resource Control (RRC) message that includes a plurality of different sets of the multiple UL PRS or multiple DL PRS, e.g., as discussed at FIGS. 9 and 13 and stage 2 of FIG. 14. The single MAC-CE block may include an identifier of one or more of the different sets of the multiple UL PRS or multiple DL PRS in the RRC message, e.g., as discussed at FIGS. 9 and 13 and stage 3 of FIG. 14.

In one implementation, the single MAC-CE block comprises a resource set identifier (ID) for each of the multiple UL PRS or multiple DL PRS, and further comprises a single spatial relation information identifier for all of the multiple UL PRS or multiple DL PRS, e.g., as discussed at FIGS. 10 and 13 and stage 3 of FIG. 14.

In one implementation, the UE may further receive a Radio Resource Control (RRC) message that includes a plurality of different sets of multiple UL PRS and multiple DL PRS, e.g., as discussed at FIGS. 11 and 13 and stage 2 of FIG. 14. The single MAC-CE block may include an identifier of one or more of the different sets of the multiple UL PRS and multiple DL PRS in the RRC message, wherein at least one UL PRS and at least one DL PRS are jointly activated or deactivated using the single MAC-CE block, e.g., as discussed at FIGS. 11 and 13 and stage 3 of FIG. 14.

In one implementation, the single MAC-CE block comprises a single Quasi Co-Location source that applies to the multiple UL PRS and multiple DL PRS, e.g., as discussed at FIGS. 12 and 13 and stage 3 of FIG. 14. In one example, a reference signal applied as single Quasi Co-Location (QCL) source to the multiple UL PRS and multiple DL PRS is another DL PRS resource, and wherein a Transmission Reception Point (TRP) identifier of the multiple DL PRS is also the TRP identifier for the DL PRS resource used as the QCL source, e.g., as discussed at FIG. 12.

FIG. 16 shows a flowchart for an exemplary method 1600 for position determination of a user equipment (UE), such as UE 104, performed by the serving base station for the UE, in a manner consistent with disclosed implementation.

At block 1602, the serving base station provides a configuration of at least one of multiple downlink (DL) Positioning Reference Signals (PRS), multiple uplink (UL) PRS, or a combination thereof to the UE, as discussed, e.g., at stage 1 of FIG. 14. At block 1604, a single Medium Access Control-Control Element (MAC-CE) block is transmitted to the UE that activates or deactivates in the UE at least one of transmissions of the multiple UL PRS; reception of the multiple DL PRS, or the combination thereof, e.g., as discussed at stage 3 of FIG. 14. At block 1606, in response to the single MAC-CE block, the serving base station receives or stop receiving from the UE the transmissions of the multiple UL PRS, transmits or stop transmitting to the UE multiple DL PRS, or a combination thereof, e.g., as discussed at stages 4, 5, and 6 of FIG. 14.

In one implementation, the serving base station provides the configuration of the at least one of the multiple DL PRS, the multiple UL PRS, or the combination thereof to the UE, by providing the configuration from a location server to the UE, e.g., as discussed at stage 1 of FIG. 14.

In one implementation, the single MAC-CE block activates or deactivates in the UE transmissions of multiple UL PRS resource sets, wherein each UL PRS resource set comprises at least one PRS resource, and in response, the serving base station receives or stop receiving the transmissions of the multiple UL PRS, e.g., as discussed at stages 3 and 6 of FIG. 14. The at least one UL PRS resource comprise at least one Sounding Reference Signals resource (SRS) for positioning.

In one implementation, the single MAC-CE block activates or deactivates in the UE reception of multiple DL PRS resources, multiple DL PRS resource sets, or multiple DL PRS frequency layers, and in response, the method comprises transmitting or stop transmitting the multiple DL PRS resources, multiple DL PRS resource sets, or multiple DL PRS frequency layers, e.g., as discussed at stages 3-5 of FIG. 14.

In one implementation, the single MAC-CE block activates or deactivates in the UE transmission of multiple UL PRS resource sets for positioning and reception of multiple DL PRS resources, multiple DL PRS resource sets, or multiple DL PRS frequency layers, and in response, the serving base station receives or stop receiving the transmission of the multiple UL PRS resource sets for positioning and transmits or stop transmitting to the UE the multiple DL PRS resources, multiple DL PRS resource sets, or multiple DL PRS frequency layers, e.g., as discussed at stages 3-6 of FIG. 14. For example, the multiple UL PRS resource sets for positioning and the UE the multiple DL PRS resources, multiple DL PRS resource sets, or multiple DL PRS frequency layers may be used for multiple cell RTT positioning, e.g., as discussed at stage 7 of FIG. 14.

In one implementation, the single MAC-CE block comprises a resource set identifier (ID) for each of the multiple UL PRS or multiple DL PRS, and further comprises a single bandwidth part (BWP) ID and a single component carrier (CC) ID for all of the multiple UL PRS, multiple DL PRS, or combination thereof, e.g., as discussed at FIGS. 6 and 13 and stage 3 of FIG. 14.

In one implementation, the single MAC-CE block comprises a resource set identifier (ID) for each of the multiple UL PRS or multiple DL PRS, and further comprises a single activate/deactivate (A/D) bit for all of the multiple UL PRS, multiple DL PRS, or combination thereof, e.g., as discussed at FIGS. 7 and 13 and stage 3 of FIG. 14.

In one implementation, the single MAC-CE block comprises a resource set identifier (ID) for each of the multiple UL PRS or multiple DL PRS, and further comprises a single type or single case of spatial relation for all of the multiple UL PRS, multiple DL PRS, or combination thereof, e.g., as discussed at FIGS. 8 and 13 and stage 3 of FIG. 14.

In one implementation, the serving base station may transmit a Radio Resource Control (RRC) message that includes a plurality of different sets of the multiple UL PRS or multiple DL PRS, e.g., as discussed at FIGS. 9 and 13 and stage 2 of FIG. 14. The single MAC-CE block may include an identifier of one or more of the different sets of the multiple UL PRS or multiple DL PRS in the RRC message, e.g., as discussed at FIGS. 9 and 13 and stage 3 of FIG. 14.

In one implementation, the single MAC-CE block comprises a resource set identifier (ID) for each of the multiple UL PRS or multiple DL PRS, and further comprises a single spatial relation information identifier for all of the multiple UL PRS or multiple DL PRS, e.g., as discussed at FIGS. 10 and 13 and stage 3 of FIG. 14.

In one implementation, the serving base station may transmit a Radio Resource Control (RRC) message that includes a plurality of different sets of multiple UL PRS and multiple DL PRS, e.g., as discussed at FIGS. 11 and 13 and stage 2 of FIG. 14. The single MAC-CE block comprises an identifier of one or more of the different sets of the multiple UL PRS and multiple DL PRS in the RRC message, wherein at least one UL PRS and at least one DL PRS are jointly activated or deactivated using the single MAC-CE block, e.g., as discussed at FIGS. 11 and 13 and stage 3 of FIG. 14.

In one implementation, the single MAC-CE block comprises a single Quasi Co-Location source that applies to the multiple UL PRS and multiple DL PRS, e.g., as discussed at FIGS. 12 and 13 and stage 3 of FIG. 14. In one example, a reference signal applied as single Quasi Co-Location (QCL) source to the multiple UL PRS and multiple DL PRS is another DL PRS resource, and wherein a Transmission Reception Point (TRP) identifier of the multiple DL PRS is also the TRP identifier for the DL PRS resource used as the QCL source, e.g., as discussed at FIG. 12.

Figure 17:
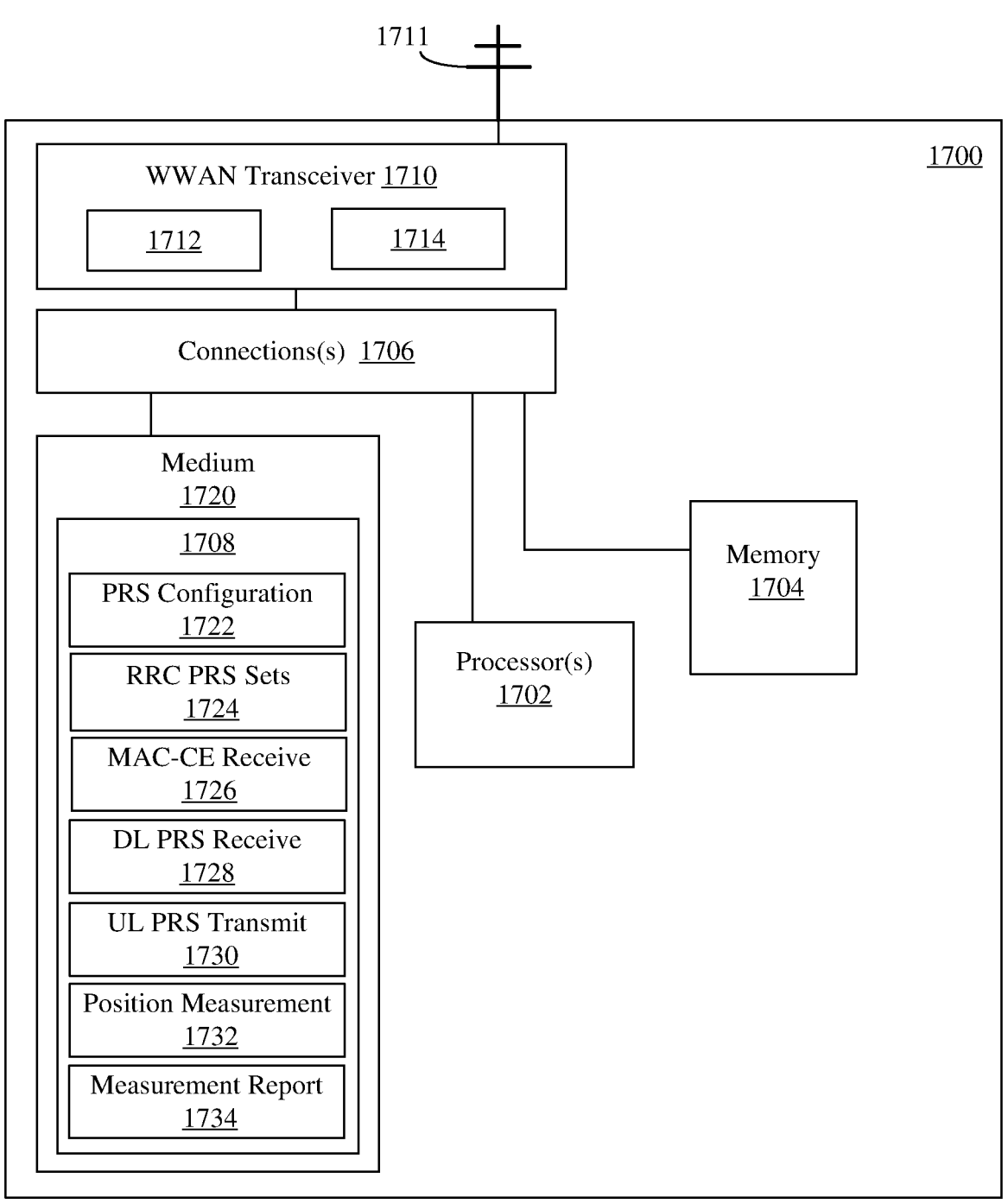
FIG. 17 shows a schematic block diagram illustrating certain exemplary features of a UE enabled to activate or deactivate the reception of multiple DL PRS and/or the transmissions of multiple UL PRS using a single MAC-CE.

FIG. 17 shows a schematic block diagram illustrating certain exemplary features of a UE 1700, e.g., which may be UE 104 shown in FIG. 1, enabled to activate or deactivate the reception of multiple DL PRS and/or the transmissions of multiple UL PRS using a single MAC-CE, as described herein. UE 1700 may, for example, include one or more processors 1702, memory 1704, an external interface such as a at least one wireless transceiver 1710 (e.g., wireless network interface), which may be operatively coupled with one or more connections 1706 (e.g., buses, lines, fibers, links, etc.) to non-transitory computer readable medium 1720 and memory 1704. The UE 1700 may further include additional items, which are not shown, such as a user interface that may include e.g., a display, a keypad or other input device, such as virtual keypad on the display, through which a user may interface with the UE, or a satellite positioning system receiver. In certain example implementations, all or part of UE 1700 may take the form of a chipset, and/or the like. Wireless transceiver 1710 may, for example, include a transmitter 1712 enabled to transmit one or more signals over one or more types of wireless communication networks and a receiver 1714 to receive one or more signals transmitted over the one or more types of wireless communication networks.

In some embodiments, UE 1700 may include antenna 1711, which may be internal or external. UE antenna 1711 may be used to transmit and/or receive signals processed by wireless transceiver 1710. In some embodiments, UE antenna 1711 may be coupled to wireless transceiver 1710. In some embodiments, measurements of signals received (transmitted) by UE 1700 may be performed at the point of connection of the UE antenna 1711 and wireless transceiver 1710. For example, the measurement point of reference for received (transmitted) RF signal measurements may be an input (output) terminal of the receiver 1714 (transmitter 1712) and an output (input) terminal of the UE antenna 1711. In a UE 1700 with multiple UE antennas 1711 or antenna arrays, the antenna connector may be viewed as a virtual point representing the aggregate output (input) of multiple UE antennas. In some embodiments, UE 1700 may measure received signals including signal strength and TOA measurements and the raw measurements may be processed by the one or more processors 1702.

The one or more processors 1702 may be implemented using a combination of hardware, firmware, and software. For example, the one or more processors 1702 may be configured to perform the functions discussed herein by implementing one or more instructions or program code 1708 on a non-transitory computer readable medium, such as medium 1720 and/or memory 1704. In some embodiments, the one or more processors 1702 may represent one or more circuits configurable to perform at least a portion of a data signal computing procedure or process related to the operation of UE 1700.

The medium 1720 and/or memory 1704 may store instructions or program code 1708 that contain executable code or software instructions that when executed by the one or more processors 1702 cause the one or more processors 1702 to operate as a special purpose computer programmed to perform the techniques disclosed herein. As illustrated in UE 1700, the medium 1720 and/or memory 1704 may include one or more components or modules that may be implemented by the one or more processors 1702 to perform the methodologies described herein. While the components or modules are illustrated as software in medium 1720 that is executable by the one or more processors 1702, it should be understood that the components or modules may be stored in memory 1704 or may be dedicated hardware either in the one or more processors 1702 or off the processors.

A number of software modules and data tables may reside in the medium 1720 and/or memory 1704 and be utilized by the one or more processors 1702 in order to manage both communications and the functionality described herein. It should be appreciated that the organization of the contents of the medium 1720 and/or memory 1704 as shown in UE 1700 is merely exemplary, and as such the functionality of the modules and/or data structures may be combined, separated, and/or be structured in different ways depending upon the implementation of the UE 1700.

The medium 1720 and/or memory 1704 may include a PRS configuration module 1722 that when implemented by the one or more processors 1702 configures the one or more processors 1702 to receive one or more PRS configuration messages via wireless transceiver 1710, e.g., from a serving base station. The PRS configuration messages may configure the UE 1700 to receive DL PRS and/or transmit UL PRS, e.g., SRS for positioning.

The medium 1720 and/or memory 1704 may include an RRC PRS sets module 1724 that when implemented by the one or more processors 1702 configures the one or more processors 1702 to receive an RRS message from a serving base station via wireless transceiver 1710 that includes plurality of different sets of UL PRS or DL PRS that may be activated or deactivated by a single MAC-CE block and/or a plurality of different sets of UL PRS or DL PRS that may be jointly activated or deactivated by a single MAC-CE block.

The medium 1720 and/or memory 1704 may include a MAC-CE receive module 1726 that when implemented by the one or more processors 1702 configures the one or more processors 1702 to receive a single MAC-CE block from a serving base station, via wireless transceiver 1710. The MAC-CE block is configured to activate or deactivate at least one of transmissions of the multiple UL PRS; reception of the multiple DL PRS, or the combination thereof. The MAC-CE block, for example, may identify multiple UL PRS resource sets, multiple DL PRS resources, multiple DL PRS resource sets, or multiple DL PRS frequency layers, or a combination thereof, for activation or deactivation. In addition to identifying the multiple UL and/or DL PRS, the MAC-CE block may identify a single BWP ID and CC ID for all of the multiple UL and/or DL PRS. The MAC-CE block may include a single activate/deactivate (A/D) bit for all of the multiple UL and/or DL PRS. The MAC-CE block may include a single type or single case, e.g., UL PRS, DL PRS, SSB or CSIRS, of spatial relation for all of the multiple UL and/or DL PRS. The MAC-CE block may include spatial relation information identifier, e.g., that indicates the identity of the spatial relation reference signal for all of the multiple UL and/or DL PRS. The MAC-CE block may include a QCL field identifying the QCL source for multiple UL and DL PRS that are to be activated jointly.

The medium 1720 and/or memory 1704 may include a DL PRS receive module 1728 that when implemented by the one or more processors 1702 configures the one or more processors 1702 to receive, via the wireless transceiver 1710, multiple DL PRS transmitted by one or more base stations. The reception of the multiple DL PRS may be activated or deactivated by the MAC-CE block.

The medium 1720 and/or memory 1704 may include a UL PRS transmit module 1730 that when implemented by the one or more processors 1702 configures the one or more processors 1702 to transmit, via the wireless transceiver 1710, multiple UL PRS, e.g., SRS for positioning. The transmissions of the multiple UL PRS may be activated or deactivated by the MAC-CE block.

The medium 1720 and/or memory 1704 may include a position measurement module 1732 that when implemented by the one or more processors 1702 configures the one or more processors 1702 to perform positioning measurements using received DL PRS and/or UL PRS. For example, the positioning measurements may be, e.g., TOA, RSTD, OTDOA, Rx-Tx, RSRP, RTT, AoA, or AoD. In some implementations, the one or more processors 1702 may be configured to estimate a position of the UE 1700 in a UE based positioning process using the position measurements and the locations of base stations, e.g., received in assistance data.

The medium 1720 and/or memory 1704 may include a reporting module 1734 that when implemented by the one or more processors 1702 configures the one or more processors 1702 to transmit position measurement report based on the positioning measurements and/or position estimate via the wireless transceiver 1710, e.g., to a location server via an LPP message.

The methodologies described herein may be implemented by various means depending upon the application. For example, these methodologies may be implemented in hardware, firmware, software, or any combination thereof. For a hardware implementation, the one or more processors 1702 may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For a firmware and/or software implementation, the methodologies may be implemented with modules (e.g., procedures, functions, and so on) that perform the functions described herein. Any machine readable medium tangibly embodying instructions may be used in implementing the methodologies described herein. For example, software codes may be stored in a non-transitory computer readable medium 1720 or memory 1704 that is connected to and executed by the one or more processors 1702. Memory may be implemented within the one or more processors or external to the one or more processors. As used herein the term "memory" refers to any type of long term, short term, volatile, nonvolatile, or other memory and is not to be limited to any particular type of memory or number of memories, or type of media upon which memory is stored.

If implemented in firmware and/or software, the functions may be stored as one or more instructions or program code 1708 on a non-transitory computer readable medium, such as medium 1720 and/or memory 1704. Examples include computer readable media encoded with a data structure and computer readable media encoded with a computer program 1708. For example, the non-transitory computer readable medium including program code 1708 stored thereon may include program code 1708 to support activation or deactivation of multiple UL and/or DL PRS based on a single MAC-CE in a manner consistent with disclosed embodiments. Non-transitory computer readable medium 1720 includes physical computer storage media. A storage medium may be any available medium that can be accessed by a computer. By way of example, and not limitation, such non-transitory computer readable media can comprise RAM, ROM, EEPROM, CD-ROM or other optical disk storage, magnetic disk storage or other magnetic storage devices, or any other medium that can be used to store desired program code 1708 in the form of instructions or data structures and that can be accessed by a computer; disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer readable media.

In addition to storage on computer readable medium 1720, instructions and/or data may be provided as signals on transmission media included in a communication apparatus. For example, a communication apparatus may include a wireless transceiver 1710 having signals indicative of instructions and data. The instructions and data are configured to cause one or more processors to implement the functions outlined in the claims. That is, the communication apparatus includes transmission media with signals indicative of information to perform disclosed functions.

Memory 1704 may represent any data storage mechanism. Memory 1704 may include, for example, a primary memory and/or a secondary memory. Primary memory may include, for example, a random access memory, read only memory, etc. While illustrated in this example as being separate from one or more processors 1702, it should be understood that all or part of a primary memory may be provided within or otherwise co-located/coupled with the one or more processors 1702. Secondary memory may include, for example, the same or similar type of memory as primary memory and/or one or more data storage devices or systems, such as, for example, a disk drive, an optical disc drive, a tape drive, a solid state memory drive, etc.

In certain implementations, secondary memory may be operatively receptive of, or otherwise configurable to couple to a non-transitory computer readable medium 1720. As such, in certain example implementations, the methods and/or apparatuses presented herein may take the form in whole or part of a computer readable medium 1720 that may include computer implementable code 1708 stored thereon, which if executed by one or more processors 1702 may be operatively enabled to perform all or portions of the example operations as described herein. Computer readable medium 1720 may be a part of memory 1704.

A UE, such as UE 1700, configured for positioning may include a means for receiving a configuration of at least one of multiple downlink (DL) Positioning Reference Signals (PRS), multiple uplink (UL) PRS, or a combination thereof from a network entity, which may be, e.g., at least one wireless transceiver 1710 and one or more processors 1702 with dedicated hardware or implementing executable code or software instructions in memory 1704 or medium 1720 such as the PRS configuration module 1722. A means for receiving a single Medium Access Control-Control Element (MAC-CE) block from a serving base station that activates or deactivates at least one of transmissions of the multiple UL PRS; reception of the multiple DL PRS, or the combination thereof may be, e.g., at least one wireless transceiver 1710 and one or more processors 1702 with dedicated hardware or implementing executable code or software instructions in memory 1704 or medium 1720 such as the MAC-CE receive module 1726. A means for activating or deactivating activates or deactivates at least one of the transmissions of the multiple UL PRS, reception of the multiple DL PRS, or the combination thereof in response to the single MAC-CE block, which may be, e.g., at least one wireless transceiver 1710 and one or more processors 1702 with dedicated hardware or implementing executable code or software instructions in memory 1704 or medium 1720 such as the DL PRS receive module 1728 or UL PRS transmit module 1730.

In one implementation, the UE may further include a means for receiving a Radio Resource Control (RRC) message that includes a plurality of different sets of the multiple UL PRS or multiple DL PRS which may be, e.g., at least one wireless transceiver 1710 and one or more processors 1702 with dedicated hardware or implementing executable code or software instructions in memory 1704 or medium 1720 such as the RRC PRS sets module 1724. The single MAC-CE block, for example, may include an identifier of one or more of the different sets of the multiple UL PRS or multiple DL PRS in the RRC message.

In one implementation, the UE may further include a means for performing multiple cell round trip time (RTT) positioning using transmitted multiple UL PRS resource sets for positioning and received multiple DL PRS resources, multiple DL PRS resource sets, or multiple DL PRS frequency layers, which may be, e.g., at least one wireless transceiver 1710 and one or more processors 1702 with dedicated hardware or implementing executable code or software instructions in memory 1704 or medium 1720 such as the position measurement module 1732.

In one implementation, the UE may further include a means for receiving a Radio Resource Control (RRC) message that includes a plurality of different sets of multiple UL PRS and multiple DL PRS, which may be, e.g., at least one wireless transceiver 1710 and one or more processors 1702 with dedicated hardware or implementing executable code or software instructions in memory 1704 or medium 1720 such as the RRC PRS sets module 1724. The single MAC-CE block, for example, may include an identifier of one or more of the different sets of the multiple UL PRS and multiple DL PRS in the RRC message, wherein at least one UL PRS and at least one DL PRS are jointly activated or deactivated using the single MAC-CE block.

Figure 18:
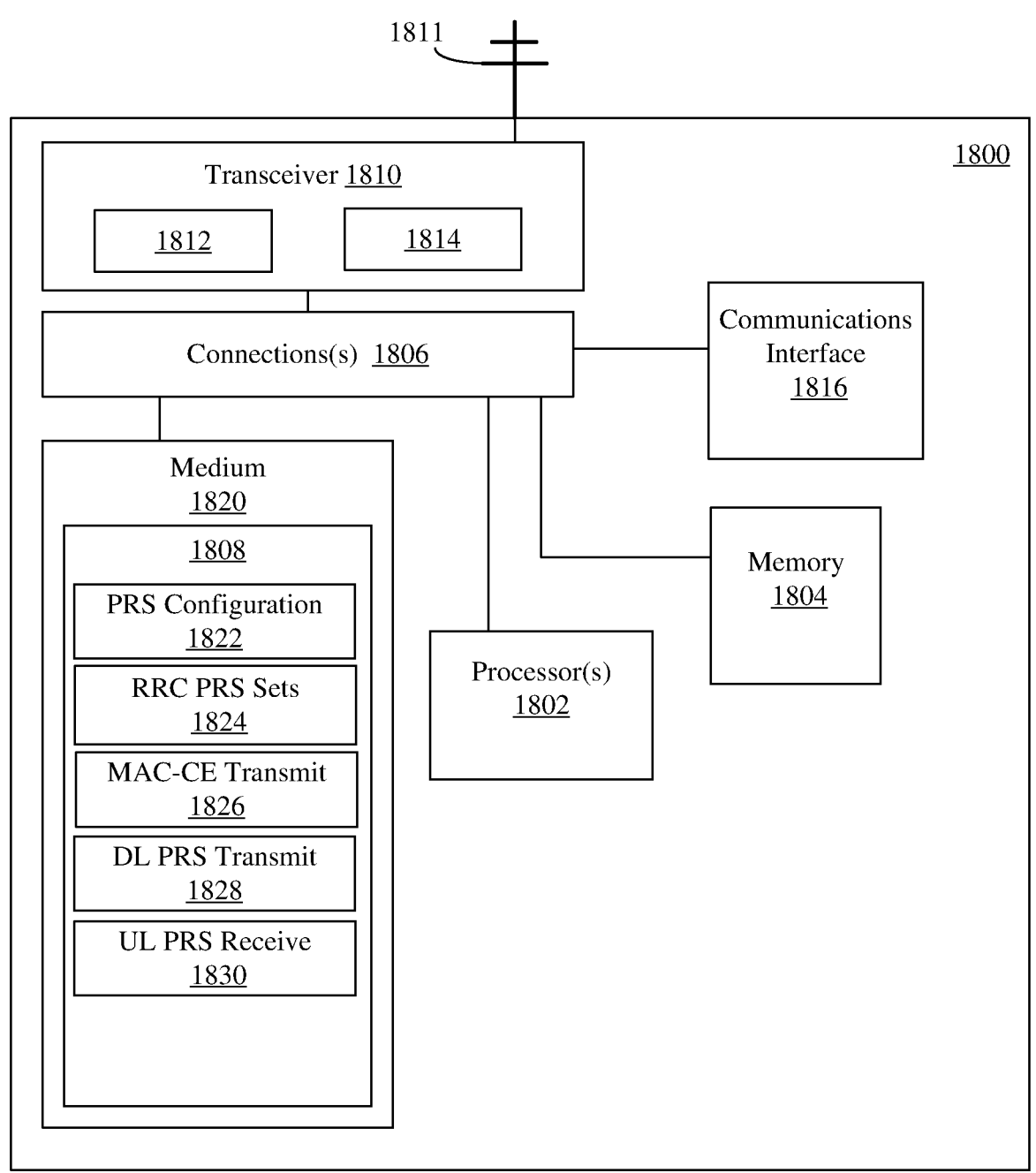
FIG. 18 shows a schematic block diagram illustrating certain exemplary features of a base station enabled to activate or deactivate the reception of multiple DL PRS and/or the transmissions of multiple UL PRS in a UE using a single MAC-CE.

FIG. 18 shows a schematic block diagram illustrating certain exemplary features of a base station 1800, e.g., base station 102 in FIG. 1, enabled to activate or deactivate the reception of multiple DL PRS and/or the transmissions of multiple UL PRS in a UE using a single MAC-CE, as described herein. Base station 1800 may, for example, include one or more processors 1802, memory 1804, an external interface, which may include a wireless transceiver 1810 (e.g., wireless network interface) and a communications interface 1816 (e.g., wireline or wireless network interface to other base stations and/or the core network), which may be operatively coupled with one or more connections 1806 (e.g., buses, lines, fibers, links, etc.) to non-transitory computer readable medium 1820 and memory 1804. In certain example implementations, all or part of base station 1800 may take the form of a chipset, and/or the like. Wireless transceiver 1810 may, for example, include a transmitter 1812 enabled to transmit one or more signals over one or more types of wireless communication networks and a receiver 1814 to receive one or more signals transmitted over the one or more types of wireless communication networks. The communications interface 1816 may be a wired or wireless interface capable of connecting to other base stations in the RAN or network entities, such as a location server 172 shown in FIG. 1.

In some embodiments, base station 1800 may include antenna 1811, which may be internal or external. Antenna 1811 may be used to transmit and/or receive signals processed by wireless transceiver 1810. In some embodiments, antenna 1811 may be coupled to wireless transceiver 1810. In some embodiments, measurements of signals received (transmitted) by base station 1800 may be performed at the point of connection of the antenna 1811 and wireless transceiver 1810. For example, the measurement point of reference for received (transmitted) RF signal measurements may be an input (output) terminal of the receiver 1814 (transmitter 1812) and an output (input) terminal of the antenna 1811. In a base station 1800 with multiple antennas 1811 or antenna arrays, the antenna connector may be viewed as a virtual point representing the aggregate output (input) of multiple antennas. In some embodiments, base station 1800 may measure received signals including signal strength and TOA measurements and the raw measurements may be processed by the one or more processors 1802.

The one or more processors 1802 may be implemented using a combination of hardware, firmware, and software. For example, the one or more processors 1802 may be configured to perform the functions discussed herein by implementing one or more instructions or program code 1808 on a non-transitory computer readable medium, such as medium 1820 and/or memory 1804. In some embodiments, the one or more processors 1802 may represent one or more circuits configurable to perform at least a portion of a data signal computing procedure or process related to the operation of base station 1800.

The medium 1820 and/or memory 1804 may store instructions or program code 1808 that contain executable code or software instructions that when executed by the one or more processors 1802 cause the one or more processors 1802 to operate as a special purpose computer programmed to perform the techniques disclosed herein. As illustrated in base station 1800, the medium 1820 and/or memory 1804 may include one or more components or modules that may be implemented by the one or more processors 1802 to perform the methodologies described herein. While the components or modules are illustrated as software in medium 1820 that is executable by the one or more processors 1802, it should be understood that the components or modules may be stored in memory 1804 or may be dedicated hardware either in the one or more processors 1802 or off the processors.

A number of software modules and data tables may reside in the medium 1820 and/or memory 1804 and be utilized by the one or more processors 1802 in order to manage both communications and the functionality described herein. It should be appreciated that the organization of the contents of the medium 1820 and/or memory 1804 as shown in base station 1800 is merely exemplary, and as such the functionality of the modules and/or data structures may be combined, separated, and/or be structured in different ways depending upon the implementation of the base station 1800.

The medium 1820 and/or memory 1804 may include a PRS configuration module 1822 that when implemented by the one or more processors 1802 configures the one or more processors 1802 to transmit one or more PRS configuration messages via wireless transceiver 1810 to a UE. The PRS configuration messages may configure the UE to receive DL PRS and/or transmit UL PRS, e.g., SRS for positioning.

The medium 1820 and/or memory 1804 may include an RRC PRS sets module 1824 that when implemented by the one or more processors 1802 configures the one or more processors 1802 to transmit an RRS message to the UE via wireless transceiver 1810 that includes plurality of different sets of UL PRS or DL PRS that may be activated or deactivated by a single MAC-CE block and/or a plurality of different sets of UL PRS or DL PRS that may be jointly activated or deactivated by a single MAC-CE block.

The medium 1820 and/or memory 1804 may include a MAC-CE transmit module 1826 that when implemented by the one or more processors 1802 configures the one or more processors 1802 to transmit a single MAC-CE block to a UE, via wireless transceiver 1810. The MAC-CE block is configured to activate or deactivate in the UE at least one of transmissions of the multiple UL PRS; reception of the multiple DL PRS, or the combination thereof. The MAC-CE block, for example, may identify multiple UL PRS resource sets, multiple DL PRS resources, multiple DL PRS resource sets, or multiple DL PRS frequency layers, or a combination thereof, for activation or deactivation. In addition to identifying the multiple UL and/or DL PRS, the MAC-CE block may identify a single BWP ID and CC ID for all of the multiple UL and/or DL PRS. The MAC-CE block may include a single activate/deactivate (A/D) bit for all of the multiple UL and/or DL PRS. The MAC-CE block may include a single type or single case, e.g., UL PRS, DL PRS, SSB or CSIRS, of spatial relation for all of the multiple UL and/or DL PRS. The MAC-CE block may include spatial relation information identifier, e.g., that indicates the identity of the spatial relation reference signal for all of the multiple UL and/or DL PRS. The MAC-CE block may include a QCL field identifying the QCL source for multiple UL and DL PRS that are to be activated jointly.

The medium 1820 and/or memory 1804 may include a DL PRS transmit module 1828 that when implemented by the one or more processors 1802 configures the one or more processors 1802 to transmit, via the wireless transceiver 1810, multiple DL PRS to the UE. The reception of the multiple DL PRS may be activated or deactivated in the UE by the MAC-CE block.

The medium 1820 and/or memory 1804 may include a UL PRS receive module 1830 that when implemented by the one or more processors 1802 configures the one or more processors 1802 to receive, via the wireless transceiver 1810, multiple UL PRS, e.g., SRS for positioning, from the UE. The transmissions of the multiple UL PRS may be activated or deactivated in the UE by the MAC-CE block.

The methodologies described herein may be implemented by various means depending upon the application. For example, these methodologies may be implemented in hardware, firmware, software, or any combination thereof. For a hardware implementation, the one or more processors 1802 may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For a firmware and/or software implementation, the methodologies may be implemented with modules (e.g., procedures, functions, and so on) that perform the functions described herein. Any machine readable medium tangibly embodying instructions may be used in implementing the methodologies described herein. For example, software codes may be stored in a non-transitory computer readable medium 1820 or memory 1804 that is connected to and executed by the one or more processors 1802. Memory may be implemented within the one or more processors or external to the one or more processors. As used herein the term "memory" refers to any type of long term, short term, volatile, nonvolatile, or other memory and is not to be limited to any particular type of memory or number of memories, or type of media upon which memory is stored.

If implemented in firmware and/or software, the functions may be stored as one or more instructions or program code 1808 on a non-transitory computer readable medium, such as medium 1820 and/or memory 1804. Examples include computer readable media encoded with a data structure and computer readable media encoded with a computer program 1808. For example, the non-transitory computer readable medium including program code 1808 stored thereon may include program code 1808 to support OTDOA measurements in a manner consistent with disclosed embodiments. Non-transitory computer readable medium 1820 includes physical computer storage media. A storage medium may be any available medium that can be accessed by a computer. By way of example, and not limitation, such non-transitory computer readable media can comprise RAM, ROM, EEPROM, CD-ROM or other optical disk storage, magnetic disk storage or other magnetic storage devices, or any other medium that can be used to store desired program code 1808 in the form of instructions or data structures and that can be accessed by a computer; disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer readable media.

In addition to storage on computer readable medium 1820, instructions and/or data may be provided as signals on transmission media included in a communication apparatus. For example, a communication apparatus may include a wireless transceiver 1810 having signals indicative of instructions and data. The instructions and data are configured to cause one or more processors to implement the functions outlined in the claims. That is, the communication apparatus includes transmission media with signals indicative of information to perform disclosed functions.

Memory 1804 may represent any data storage mechanism. Memory 1804 may include, for example, a primary memory and/or a secondary memory. Primary memory may include, for example, a random access memory, read only memory, etc. While illustrated in this example as being separate from one or more processors 1802, it should be understood that all or part of a primary memory may be provided within or otherwise co-located/coupled with the one or more processors 1802. Secondary memory may include, for example, the same or similar type of memory as primary memory and/or one or more data storage devices or systems, such as, for example, a disk drive, an optical disc drive, a tape drive, a solid state memory drive, etc.

In certain implementations, secondary memory may be operatively receptive of, or otherwise configurable to couple to a non-transitory computer readable medium 1820. As such, in certain example implementations, the methods and/or apparatuses presented herein may take the form in whole or part of a computer readable medium 1820 that may include computer implementable code 1808 stored thereon, which if executed by one or more processors 1802 may be operatively enabled to perform all or portions of the example operations as described herein. Computer readable medium 1820 may be a part of memory 1804.

A serving base station, such as serving base station 1800, configured for positioning of a UE may include a means for providing a configuration of at least one of multiple downlink (DL) Positioning Reference Signals (PRS), multiple uplink (UL) PRS, or a combination thereof to the UE, which may be, e.g., at least one wireless transceiver 1810, communications interface 1816, and one or more processors 1802 with dedicated hardware or implementing executable code or software instructions in memory 1804 or medium 1820 such as the PRS configuration module 1822. A means for transmitting a single Medium Access Control-Control Element (MAC-CE) block to the UE that activates or deactivates in the UE at least one of transmissions of the multiple UL PRS; reception of the multiple DL PRS, or the combination thereof may be, e.g., at least one wireless transceiver 1810 and one or more processors 1802 with dedicated hardware or implementing executable code or software instructions in memory 1804 or medium 1820 such as the MAC-CE transmit module 1826. In response to the single MAC-CE block, a means for receiving or transmitting receives or stops receiving from the UE the transmissions of the multiple UL PRS, transmits or stop transmitting to the UE multiple DL PRS, or a combination thereof, which may be, e.g., at least one wireless transceiver 1810 and one or more processors 1802 with dedicated hardware or implementing executable code or software instructions in memory 1804 or medium 1820 such as the DL PRS transmit module 1828 and UL PRS receive module 1830.

In one implementation, the serving base station may further include a means for transmitting a Radio Resource Control (RRC) message that includes a plurality of different sets of the multiple UL PRS or multiple DL PRS, which may be, e.g., at least one wireless transceiver 1810 and one or more processors 1802 with dedicated hardware or implementing executable code or software instructions in memory 1804 or medium 1820 such as the RRC PRS sets module 1824. The single MAC-CE block, for example, may include an identifier of one or more of the different sets of the multiple UL PRS or multiple DL PRS in the RRC message.

In one implementation, the serving base station may further include a means for transmitting a Radio Resource Control (RRC) message that includes a plurality of different sets of multiple UL PRS and multiple DL PRS, which may be, e.g., at least one wireless transceiver 1810 and one or more processors 1802 with dedicated hardware or implementing executable code or software instructions in memory 1804 or medium 1820 such as the RRC PRS sets module 1824. The single MAC-CE block, for example, may include an identifier of one or more of the different sets of the multiple UL PRS and multiple DL PRS in the RRC message, wherein at least one UL PRS and at least one DL PRS are jointly activated or deactivated using the single MAC-CE block.

Reference throughout this specification to "one example", "an example", "certain examples", or "exemplary implementation" means that a particular feature, structure, or characteristic described in connection with the feature and/ or example may be included in at least one feature and/or example of claimed subject matter. Thus, the appearances of the phrase "in one example", "an example", "in certain examples" or "in certain implementations" or other like phrases in various places throughout this specification are not necessarily all referring to the same feature, example, and/or limitation. Furthermore, the particular features, structures, or characteristics may be combined in one or more examples and/or features.

Some portions of the detailed description included herein are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular operations pursuant to instructions from program software. Algorithmic descriptions or symbolic representations are examples of techniques used by those of ordinary skill in the signal processing or related arts to convey the substance of their work to others skilled in the art. An algorithm is here, and generally, is considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals, or the like. It should be understood, however, that all of these or similar terms are to be associated with appropriate physical quantities and are merely convenient labels. Unless specifically stated otherwise, as apparent from the discussion herein, it is appreciated that throughout this specification discussions utilizing terms such as "processing," "computing," "calculating," "determining" or the like refer to actions or processes of a specific apparatus, such as a special purpose computer, special purpose computing apparatus or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

In the preceding detailed description, numerous specific details have been set forth to provide a thorough understanding of claimed subject matter. However, it will be understood by those skilled in the art that claimed subject matter may be practiced without these specific details. In other instances, methods and apparatuses that would be known by one of ordinary skill have not been described in detail so as not to obscure claimed subject matter.

The terms, "and", "or", and "and/or" as used herein may include a variety of meanings that also are expected to depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein may be used to describe any feature, structure, or characteristic in the singular or may be used to describe a plurality or some other combination of features, structures or characteristics. Though, it should be noted that this is merely an illustrative example and claimed subject matter is not limited to this example.

While there has been illustrated and described what are presently considered to be example features, it will be understood by those skilled in the art that various other modifications may be made, and equivalents may be substituted, without departing from claimed subject matter. Additionally, many modifications may be made to adapt a particular situation to the teachings of claimed subject matter without departing from the central concept described herein.

Implementation examples are described in the following numbered clauses:

1. A method for a user equipment (UE) positioning performed by the UE, comprising:

receiving a configuration of at least one of multiple downlink (DL) Positioning Reference Signals (PRS), multiple uplink (UL) PRS, or a combination thereof from a network entity;

receiving a single Medium Access Control-Control Element (MAC-CE) block from a serving base station that activates or deactivates at least one of transmissions of the multiple UL PRS; reception of the multiple DL PRS, or the combination thereof; and in response to the single MAC-CE block, activating or deactivating at least one of the transmissions of the multiple UL PRS, reception of the multiple DL PRS, or the combination thereof.

2. The method of clause 1, wherein the single MAC-CE block activates or deactivates transmissions of multiple UL PRS resource sets, wherein each UL PRS resource set comprises at least one PRS resource, and in response, the method comprises activating or deactivating transmissions of the multiple UL PRS.

3. The method of clause 2, wherein the at least one UL PRS resource comprise at least one Sounding Reference Signals resource (SRS) for positioning.

4. The method of any of clauses 1-3, wherein the single MAC-CE block activates or deactivates reception of multiple DL PRS resources, multiple DL PRS resource sets, or multiple DL PRS frequency layers, and in response, the method comprises activating or deactivating reception of the multiple DL PRS resources, multiple DL PRS resource sets, or multiple DL PRS frequency layers.

5. The method of any of clauses 1-4, wherein the single MAC-CE block activates or deactivates transmission of multiple UL PRS resource sets for positioning and reception of multiple DL PRS resources, multiple DL PRS resource sets, or multiple DL PRS frequency layers, and in response, the method comprises activating or deactivating transmission of the multiple UL PRS resource sets for positioning and reception of the multiple DL PRS resources, multiple DL PRS resource sets, or multiple DL PRS frequency layers.

6. The method of clause 5, further comprising performing multiple cell round trip time (RTT) positioning using transmitted multiple UL PRS resource sets for positioning and received multiple DL PRS resources, multiple DL PRS resource sets, or multiple DL PRS frequency layers.

7. The method of any of clauses 1-6, wherein the single MAC-CE block comprises a resource set identifier (ID) for each of the multiple UL PRS or multiple DL PRS, and further comprises a single bandwidth part (BWP) ID and a single component carrier (CC) ID for all of the multiple UL PRS, multiple DL PRS, or combination thereof.

8. The method of any of clauses 1-7, wherein the single MAC-CE block comprises a resource set identifier (ID) for each of the multiple UL PRS or multiple DL PRS, and further comprises a single activate/deactivate (A/D) bit for all of the multiple UL PRS, multiple DL PRS, or combination thereof.

9. The method of any of clauses 1-8, wherein the single MAC-CE block comprises a resource set identifier (ID) for each of the multiple UL PRS or multiple DL PRS, and further comprises a single type or single case of spatial relation for all of the multiple UL PRS, multiple DL PRS, or combination thereof.

10. The method of any of clauses 1-9, further comprising:

receiving a Radio Resource Control (RRC) message that includes a plurality of ifferent sets of the multiple UL PRS or multiple DL PRS;

wherein the single MAC-CE block comprises an identifier of one or more of the different sets of the multiple UL PRS or multiple DL PRS in the RRC message.

11. The method of any of clauses 1-10, wherein the single MAC-CE block comprises a resource set identifier (ID) for each of the multiple UL PRS or multiple DL PRS, and further comprises a single spatial relation information identifier for all of the multiple UL PRS or multiple DL PRS.

12. The method of any of clauses 1-11, further comprising:

receiving a Radio Resource Control (RRC) message that includes a plurality of different sets of multiple UL PRS and multiple DL PRS;

wherein the single MAC-CE block comprises an identifier of one or more of the different sets of the multiple UL PRS and multiple DL PRS in the RRC message, wherein at least one UL PRS and at least one DL PRS are jointly activated or deactivated using the single MAC-CE block.

13. The method of any of clauses 1-12, wherein the single MAC-CE block comprises a single Quasi Co-Location source that applies to the multiple UL PRS and multiple DL PRS.

14. The method of clause 13, wherein a reference signal applied as single Quasi Co-Location (QCL) source to the multiple UL PRS and multiple DL PRS is another DL PRS resource, and wherein a Transmission Reception Point (TRP) identifier of the multiple DL PRS is also the TRP identifier for the DL PRS resource used as the QCL source.

15. A user equipment (UE) configured to perform positioning, comprising:

at least one wireless transceiver configured to wirelessly communicate with a wireless network; and at least one processor coupled to the at least one wireless transceiver and configured to:

receive, via the at least one wireless transceiver, a configuration of at least one of multiple downlink (DL) Positioning Reference Signals (PRS), multiple uplink (UL) PRS, or a combination thereof from a network entity;

receive, via the at least one wireless transceiver, a single Medium Access Control-Control Element (MAC-CE) block from a serving base station that activates or deactivates at least one of transmissions of the multiple UL PRS; reception of the multiple DL PRS, or the combination thereof; and in response to the single MAC-CE block, activate or deactivate at least one of the transmissions of the multiple UL PRS, reception of the multiple DL PRS, or the combination thereof.

16. The UE of clause 15, wherein the single MAC-CE block activates or deactivates transmissions of multiple UL PRS resource sets, wherein each UL PRS resource set comprises at least one PRS resource, and in response, the at least one processor is further configured to activate or deactivate transmissions of the multiple UL PRS.

17. The UE of clause 16, wherein the at least one UL PRS resource comprise at least one Sounding Reference Signals resource (SRS) for positioning.

18. The UE of any of clauses 15-17, wherein the single MAC-CE block activates or deactivates reception of multiple DL PRS resources, multiple DL PRS resource sets, or multiple DL PRS frequency layers, and in response, the at least one processor is further configured to activates or deactivates reception of the multiple DL PRS resources, multiple DL PRS resource sets, or multiple DL PRS frequency layers.

19. The UE of any of clauses 15-18, wherein the single MAC-CE block activates or deactivates transmission of multiple UL PRS resource sets for positioning and reception of multiple DL PRS resources, multiple DL PRS resource sets, or multiple DL PRS frequency layers, and in response, the at least one processor is further configured to activate or deactivate transmission of the multiple UL PRS resource sets for positioning and reception of the multiple DL PRS resources, multiple DL PRS resource sets, or multiple DL PRS frequency layers.

20. The UE of clause 19, wherein the at least one processor is further configured to perform multiple cell round trip time (RTT) positioning using transmitted multiple UL PRS resource sets for positioning and received multiple DL PRS resources, multiple DL PRS resource sets, or multiple DL PRS frequency layers.

21. The UE of any of clauses 15-20, wherein the single MAC-CE block comprises a resource set identifier (ID) for each of the multiple UL PRS or multiple DL PRS, and further comprises a single bandwidth part (BWP) ID and a single component carrier (CC) ID for all of the multiple UL PRS, multiple DL PRS, or combination thereof.

22. The UE of any of clauses 15-21, wherein the single MAC-CE block comprises a resource set identifier (ID) for each of the multiple UL PRS or multiple DL PRS, and further comprises a single activate/deactivate (A/D) bit for all of the multiple UL PRS, multiple DL PRS, or combination thereof.

23. The UE of any of clauses 15-22, wherein the single MAC-CE block comprises a resource set identifier (ID) for each of the multiple UL PRS or multiple DL PRS, and further comprises a single type or single case of spatial relation for all of the multiple UL PRS, multiple DL PRS, or combination thereof.

24. The UE of any of clauses 15-23, wherein the at least one processor is further configured to:

receive, via the at least one wireless transceiver, a Radio Resource Control (RRC) message that includes a plurality of different sets of the multiple UL PRS or multiple DL PRS;

wherein the single MAC-CE block comprises an identifier of one or more of the different sets of the multiple UL PRS or multiple DL PRS in the RRC message.

25. The UE of any of clauses 15-24, wherein the single MAC-CE block comprises a resource set identifier (ID) for each of the multiple UL PRS or multiple DL PRS, and further comprises a single spatial relation information identifier for all of the multiple UL PRS or multiple DL PRS.

26. The UE of any of clauses 15-25, wherein the at least one processor is further configured to:

receive, via the at least one wireless transceiver, a Radio Resource Control (RRC) message that includes a plurality of different sets of multiple UL PRS and multiple DL PRS;

wherein the single MAC-CE block comprises an identifier of one or more of the different sets of the multiple UL PRS and multiple DL PRS in the RRC message, wherein at least one UL PRS and at least one DL PRS are jointly activated or deactivated using the single MAC-CE block.

27. The UE of any of clauses 15-27, wherein the single MAC-CE block comprises a single Quasi Co-Location source that applies to the multiple UL PRS and multiple DL PRS.

28. The UE of clause 27, wherein a reference signal applied as single Quasi Co-Location (QCL) source to the multiple UL PRS and multiple DL PRS is another DL PRS resource, and wherein a Transmission Reception Point (TRP) identifier of the multiple DL PRS is also the TRP identifier for the DL PRS resource used as the QCL source.

29. A user equipment (UE) configured to perform positioning, comprising:

means for receiving a configuration of at least one of multiple downlink (DL) Positioning Reference Signals (PRS), multiple uplink (UL) PRS, or a combination thereof from a network entity;

means for receiving a single Medium Access Control-Control Element (MAC-CE) block from a serving base station that activates or deactivates at least one of transmissions of the multiple UL PRS; reception of the multiple DL PRS, or the combination thereof; and means for activating or deactivating at least one of the transmissions of the multiple UL PRS, reception of the multiple DL PRS, or the combination thereof in response to the single MAC-CE block.

30. The UE of clause 29, wherein the single MAC-CE block activates or deactivates transmissions of multiple UL PRS resource sets, wherein each UL PRS resource set comprises at least one PRS resource, and in response, the transmissions of the multiple UL PRS are activated or deactivated.

31. The UE of clause 30, wherein the at least one UL PRS resource comprise at least one Sounding Reference Signals resource (SRS) for positioning.

32. The UE of any of clauses 29-31, wherein the single MAC-CE block activates or deactivates reception of multiple DL PRS resources, multiple DL PRS resource sets, or multiple DL PRS frequency layers, and in response, the reception of the multiple DL PRS resources, multiple DL PRS resource sets, or multiple DL PRS frequency layers is activated or deactivated.

33. The UE of any of clauses 29-32, wherein the single MAC-CE block activates or deactivates transmission of multiple UL PRS resource sets for positioning and reception of multiple DL PRS resources, multiple DL PRS resource sets, or multiple DL PRS frequency layers, and in response, the transmission of the multiple UL PRS resource sets for positioning and reception of the multiple DL PRS resources, multiple DL PRS resource sets, or multiple DL PRS frequency layers are activated or deactivated.

34. The UE of clause 33, further comprising means for performing multiple cell round trip time (RTT) positioning using transmitted multiple UL PRS resource sets for positioning and received multiple DL PRS resources, multiple DL PRS resource sets, or multiple DL PRS frequency layers.

35. The UE of any of clauses 29-34, wherein the single MAC-CE block comprises a resource set identifier (ID) for each of the multiple UL PRS or multiple DL PRS, and further comprises a single bandwidth part (BWP) ID and a single component carrier (CC) ID for all of the multiple UL PRS, multiple DL PRS, or combination thereof.

36. The UE of any of clauses 29-35, wherein the single MAC-CE block comprises a resource set identifier (ID)

for each of the multiple UL PRS or multiple DL PRS, and further comprises a single activate/deactivate (A/D) bit for all of the multiple UL PRS, multiple DL PRS, or combination thereof.

37. The UE of any of clauses 29-36, wherein the single MAC-CE block comprises a resource set identifier (ID) for each of the multiple UL PRS or multiple DL PRS, and further comprises a single type or single case of spatial relation for all of the multiple UL PRS, multiple DL PRS, or combination thereof.

38. The UE of any of clauses 29-37, further comprising:

means for receiving a Radio Resource Control (RRC) message that includes a plurality of different sets of the multiple UL PRS or multiple DL PRS;

wherein the single MAC-CE block comprises an identifier of one or more of the different sets of the multiple UL PRS or multiple DL PRS in the RRC message.

39. The UE of any of clauses 29-38, wherein the single MAC-CE block comprises a resource set identifier (ID) for each of the multiple UL PRS or multiple DL PRS, and further comprises a single spatial relation information identifier for all of the multiple UL PRS or multiple DL PRS.

40. The UE of any of clauses 29-39, further comprising:

receiving a Radio Resource Control (RRC) message that includes a plurality of different sets of multiple UL PRS and multiple DL PRS;

wherein the single MAC-CE block comprises an identifier of one or more of the different sets of the multiple UL PRS and multiple DL PRS in the RRC message, wherein at least one UL PRS and at least one DL PRS are jointly activated or deactivated using the single MAC-CE block.

41. The UE of any of clauses 29-40, wherein the single MAC-CE block comprises a single Quasi Co-Location source that applies to the multiple UL PRS and multiple DL PRS.

42. The UE of clause 41, wherein a reference signal applied as single Quasi Co-Location (QCL) source to the multiple UL PRS and multiple DL PRS is another DL PRS resource, and wherein a Transmission Reception Point (TRP) identifier of the multiple DL PRS is also the TRP identifier for the DL PRS resource used as the QCL source.

43. A non-transitory computer readable storage medium including program code stored thereon, the program code is operable to configure at least one processor in a user equipment (UE) configured to perform positioning, comprising:

program code to receive a configuration of at least one of multiple downlink (DL) Positioning Reference Signals (PRS), multiple uplink (UL) PRS, or a combination thereof from a network entity;

program code to receive a single Medium Access Control-Control Element (MAC-CE) block from a serving base station that activates or deactivates at least one of transmissions of the multiple UL PRS; reception of the multiple DL PRS, or the combination thereof; and program code to activate or deactivate at least one of the transmissions of the multiple UL PRS, reception of the multiple DL PRS, or the combination thereof in response to the single MAC-CE block.

44. A method for a user equipment (UE) positioning performed by a serving base station for the UE, comprising:

providing a configuration of at least one of multiple downlink (DL) Positioning Reference Signals (PRS), multiple uplink (UL) PRS, or a combination thereof to the UE;

transmitting a single Medium Access Control-Control Element (MAC-CE) block to the UE that activates or deactivates in the UE at least one of transmissions of the multiple UL PRS; reception of the multiple DL PRS, or the combination thereof; and in response to the single MAC-CE block, receiving or stop receiving from the UE the transmissions of the multiple UL PRS, transmitting or stop transmitting to the UE multiple DL PRS, or a combination thereof.

45. The method of clause 44, wherein providing the configuration of the at least one of the multiple DL PRS, the multiple UL PRS, or the combination thereof to the UE, comprises providing the configuration from a location server to the UE.

46. The method of either of clauses 44 or 45, wherein the single MAC-CE block activates or deactivates in the UE transmissions of multiple UL PRS resource sets, wherein each UL PRS resource set comprises at least one PRS resource, and in response, the method comprises receiving or stop receiving the transmissions of the multiple UL PRS.

47. The method of clause 46, wherein the at least one UL PRS resource comprise at least one Sounding Reference Signals resource (SRS) for positioning.

48. The method of any of clauses 44-47, wherein the single MAC-CE block activates or deactivates in the UE reception of multiple DL PRS resources, multiple DL PRS resource sets, or multiple DL PRS frequency layers, and in response, the method comprises transmitting or stop transmitting the multiple DL PRS resources, multiple DL PRS resource sets, or multiple DL PRS frequency layers.

49. The method of any of clauses 44-48, wherein the single MAC-CE block activates or deactivates in the UE transmission of multiple UL PRS resource sets for positioning and reception of multiple DL PRS resources, multiple DL PRS resource sets, or multiple DL PRS frequency layers, and in response, the method comprises receiving or stop receiving the transmission of the multiple UL PRS resource sets for positioning and transmitting or stop transmitting to the UE the multiple DL PRS resources, multiple DL PRS resource sets, or multiple DL PRS frequency layers.

50. The method of clause 49, wherein the multiple UL PRS resource sets for positioning and the UE the multiple DL PRS resources, multiple DL PRS resource sets, or multiple DL PRS frequency layers are used for multiple cell round trip time (RTT) positioning.

51. The method of any of clauses 44-50, wherein the single MAC-CE block comprises a resource set identifier (ID) for each of the multiple UL PRS or multiple DL PRS, and further comprises a single bandwidth part (BWP) ID and a single component carrier (CC) ID for all of the multiple UL PRS, multiple DL PRS, or combination thereof.

52. The method of any of clauses 44-51, wherein the single MAC-CE block comprises a resource set identifier (ID) for each of the multiple UL PRS or multiple DL PRS, and further comprises a single activate/deactivate (A/D) bit for all of the multiple UL PRS, multiple DL PRS, or combination thereof.

53. The method of any of clauses 44-52, wherein the single MAC-CE block comprises a resource set identifier (ID) for each of the multiple UL PRS or multiple
DL PRS, and further comprises a single type or single
case of spatial relation for all of the multiple UL PRS,
multiple DL PRS, or combination thereof.

54. The method of any of clauses 44-53, further comprising:
transmitting a Radio Resource Control (RRC) message
that includes a plurality of different sets of the multiple
UL PRS or multiple DL PRS;
wherein the single MAC-CE block comprises an identifier
of one or more of the different sets of the multiple UL
PRS or multiple DL PRS in the RRC message.

55. The method of any of clauses 44-54, wherein the
single MAC-CE block comprises a resource set identifier (ID) for each of the multiple UL PRS or multiple
DL PRS, and further comprises a single spatial relation
information identifier for all of the multiple UL PRS or
multiple DL PRS.

56. The method of any of clauses 44-55, further comprising:
transmitting a Radio Resource Control (RRC) message
that includes a plurality of different sets of multiple UL
PRS and multiple DL PRS;
wherein the single MAC-CE block comprises an identifier
of one or more of the different sets of the multiple UL
PRS and multiple DL PRS in the RRC message,
wherein at least one UL PRS and at least one DL PRS
are jointly activated or deactivated using the single
MAC-CE block.

57. The method of any of clauses 44-56, wherein the
single MAC-CE block comprises a single Quasi Co-
Location source that applies to the multiple UL PRS
and multiple DL PRS.

58. The method of clause 57, wherein a reference signal
applied as single Quasi Co-Location (QCL) source to
the multiple UL PRS and multiple DL PRS is another
DL PRS resource, and wherein a Transmission Reception Point (TRP) identifier of the multiple DL PRS is
also the TRP identifier for the DL PRS resource used as
the QCL source.

59. A serving base station for a user equipment (UE)
configured for positioning for the UE, comprising:
at least one wireless transceiver configured to wirelessly
communicate with the UE; and
at least one processor coupled to the at least one wireless
transceiver and configured to:
provide, via the at least one wireless transceiver, a configuration of at least one of multiple downlink (DL)
Positioning Reference Signals (PRS), multiple uplink
(UL) PRS, or a combination thereof to the UE;
transmit, via the at least one wireless transceiver, a single
Medium Access Control-Control Element (MAC-CE)
block to the UE that activates or deactivates in the UE
at least one of transmissions of the multiple UL PRS;
reception of the multiple DL PRS, or the combination
thereof; and
in response to the single MAC-CE block, receive or stop
receiving from the UE the transmissions of the multiple
UL PRS, transmit or stop transmitting to the UE
multiple DL PRS, or a combination thereof.

60. The serving base station of clause 59, wherein the at
least one processor is configured to provide the configuration of the at least one of the multiple DL PRS,
the multiple UL PRS, or the combination thereof to the
UE, by being configured to provide the configuration
from a location server to the UE.

46

61. The serving base station of either of clauses 59 or 60,
wherein the single MAC-CE block activates or deactivates in the UE transmissions of multiple UL PRS
resource sets, wherein each UL PRS resource set comprises at least one PRS resource, and in response, the at
least one processor is configured to receive or stop
receiving the transmissions of the multiple UL PRS.

62. The serving base station of clause 61, wherein the at
least one UL PRS resource comprise at least one
Sounding Reference Signals resource (SRS) for positioning.

63. The serving base station of any of clauses 59-62,
wherein the single MAC-CE block activates or deactivates in the UE reception of multiple DL PRS
resources, multiple DL PRS resource sets, or multiple
DL PRS frequency layers, and in response, the at least
one processor is configured to transmit or stop transmitting the multiple DL PRS resources, multiple DL
PRS resource sets, or multiple DL PRS frequency
layers.

64. The serving base station of any of clauses 59-63,
wherein the single MAC-CE block activates or deactivates in the UE transmission of multiple UL PRS
resource sets for positioning and reception of multiple
DL PRS resources, multiple DL PRS resource sets, or
multiple DL PRS frequency layers, and in response, the
at least one processor is configured to receive or stop
receiving the transmission of the multiple UL PRS
resource sets for positioning and transmit or stop transmitting to the UE the multiple DL PRS resources,
multiple DL PRS resource sets, or multiple DL PRS
frequency layers.

65. The serving base station of clause 64, wherein the
multiple UL PRS resource sets for positioning and the
UE the multiple DL PRS resources, multiple DL PRS
resource sets, or multiple DL PRS frequency layers are
used for multiple cell round trip time (RTT) positioning.

66. The serving base station of any of clauses 59-65,
wherein the single MAC-CE block comprises a
resource set identifier (ID) for each of the multiple UL
PRS or multiple DL PRS, and further comprises a
single bandwidth part (BWP) ID and a single component carrier (CC) ID for all of the multiple UL PRS,
multiple DL PRS, or combination thereof.

67. The serving base station of any of clauses 59-66,
wherein the single MAC-CE block comprises a
resource set identifier (ID) for each of the multiple UL
PRS or multiple DL PRS, and further comprises a
single activate/deactivate (A/D) bit for all of the multiple UL PRS, multiple DL PRS, or combination
thereof.

68. The serving base station of any of clauses 59-67,
wherein the single MAC-CE block comprises a
resource set identifier (ID) for each of the multiple UL
PRS or multiple DL PRS, and further comprises a
single type or single case of spatial relation for all of the
multiple UL PRS, multiple DL PRS, or combination
thereof.

69. The serving base station of any of clauses 59-68,
wherein the at least one processor is further configured
to:
transmit, via the at least one wireless transceiver, a Radio
Resource Control (RRC) message that includes a plurality of different sets of the multiple UL PRS or
multiple DL PRS;

wherein the single MAC-CE block comprises an identifier of one or more of the different sets of the multiple UL PRS or multiple DL PRS in the RRC message.

70. The serving base station of any of clauses 59-69, wherein the single MAC-CE block comprises a resource set identifier (ID) for each of the multiple UL PRS or multiple DL PRS, and further comprises a single spatial relation information identifier for all of the multiple UL PRS or multiple DL PRS.

71. The serving base station of any of clauses 59-70, wherein the at least one processor is further configured to:

transmit, via the at least one wireless transceiver, a Radio Resource Control (RRC) message that includes a plurality of different sets of multiple UL PRS and multiple DL PRS;

wherein the single MAC-CE block comprises an identifier of one or more of the different sets of the multiple UL PRS and multiple DL PRS in the RRC message, wherein at least one UL PRS and at least one DL PRS are jointly activated or deactivated using the single MAC-CE block.

72. The serving base station of any of clauses 59-71, wherein the single MAC-CE block comprises a single Quasi Co-Location source that applies to the multiple UL PRS and multiple DL PRS.

73. The serving base station of clause 72, wherein a reference signal applied as single Quasi Co-Location (QCL) source to the multiple UL PRS and multiple DL PRS is another DL PRS resource, and wherein a Transmission Reception Point (TRP) identifier of the multiple DL PRS is also the TRP identifier for the DL PRS resource used as the QCL source.

74. A serving base station for a user equipment (UE) configured for positioning for the UE, comprising:

means for providing a configuration of at least one of multiple downlink (DL) Positioning Reference Signals (PRS), multiple uplink (UL) PRS, or a combination thereof to the UE;

means for transmitting a single Medium Access Control-Control Element (MAC-CE) block to the UE that activates or deactivates in the UE at least one of transmissions of the multiple UL PRS; reception of the multiple DL PRS, or the combination thereof; and in response to the single MAC-CE block, a means for receiving or transmitting receives or stops receiving from the UE the transmissions of the multiple UL PRS, transmits or stops transmitting to the UE multiple DL PRS, or a combination thereof.

75. The serving base station of clause 74, wherein the means for providing the configuration of the at least one of the multiple DL PRS, the multiple UL PRS, or the combination thereof to the UE, provides the configuration from a location server to the UE.

76. The serving base station of either of clauses 74 or 75, wherein the single MAC-CE block activates or deactivates in the UE transmissions of multiple UL PRS resource sets, wherein each UL PRS resource set comprises at least one PRS resource, and in response, the means for receiving or transmitting receives or stops receiving the transmissions of the multiple UL PRS.

77. The serving base station of clause 76, wherein the at least one UL PRS resource comprise at least one Sounding Reference Signals resource (SRS) for positioning.

78. The serving base station of any of clauses 74-77, wherein the single MAC-CE block activates or deactivates in the UE reception of multiple DL PRS resources, multiple DL PRS resource sets, or multiple DL PRS frequency layers, and in response, the means for receiving or transmitting transmits or stops transmitting the multiple DL PRS resources, multiple DL PRS resource sets, or multiple DL PRS frequency layers.

79. The serving base station of any of clauses 74-78, wherein the single MAC-CE block activates or deactivates in the UE transmission of multiple UL PRS resource sets for positioning and reception of multiple DL PRS resources, multiple DL PRS resource sets, or multiple DL PRS frequency layers, and in response, the means for receiving or transmitting receives or stops receiving the transmission of the multiple UL PRS resource sets for positioning and transmits or stops transmitting to the UE the multiple DL PRS resources, multiple DL PRS resource sets, or multiple DL PRS frequency layers.

80. The serving base station of clause 79, wherein the multiple UL PRS resource sets for positioning and the UE the multiple DL PRS resources, multiple DL PRS resource sets, or multiple DL PRS frequency layers are used for multiple cell round trip time (RTT) positioning.

81. The serving base station of any of clauses 74-80, wherein the single MAC-CE block comprises a resource set identifier (ID) for each of the multiple UL PRS or multiple DL PRS, and further comprises a single bandwidth part (BWP) ID and a single component carrier (CC) ID for all of the multiple UL PRS, multiple DL PRS, or combination thereof.

82. The serving base station of any of clauses 74-81, wherein the single MAC-CE block comprises a resource set identifier (ID) for each of the multiple UL PRS or multiple DL PRS, and further comprises a single activate/deactivate (A/D) bit for all of the multiple UL PRS, multiple DL PRS, or combination thereof.

83. The serving base station of any of clauses 74-82, wherein the single MAC-CE block comprises a resource set identifier (ID) for each of the multiple UL PRS or multiple DL PRS, and further comprises a single type or single case of spatial relation for all of the multiple UL PRS, multiple DL PRS, or combination thereof.

84. The serving base station of any of clauses 74-83, further comprising:

means for transmitting a Radio Resource Control (RRC) message that includes a plurality of different sets of the multiple UL PRS or multiple DL PRS;

wherein the single MAC-CE block comprises an identifier of one or more of the different sets of the multiple UL PRS or multiple DL PRS in the RRC message.

85. The serving base station of any of clauses 74-84, wherein the single MAC-CE block comprises a resource set identifier (ID) for each of the multiple UL PRS or multiple DL PRS, and further comprises a single spatial relation information identifier for all of the multiple UL PRS or multiple DL PRS.

86. The serving base station of any of clauses 74-85, further comprising:

means for transmitting a Radio Resource Control (RRC) message that includes a plurality of different sets of multiple UL PRS and multiple DL PRS;

wherein the single MAC-CE block comprises an identifier of one or more of the different sets of the multiple UL PRS and multiple DL PRS in the RRC message, wherein at least one UL PRS and at least one DL PRS are jointly activated or deactivated using the single MAC-CE block.

87. The serving base station of any of clauses 74-86, wherein the single MAC-CE block comprises a single Quasi Co-Location source that applies to the multiple UL PRS and multiple DL PRS.

88. The serving base station of clause 87, wherein a reference signal applied as single Quasi Co-Location (QCL) source to the multiple UL PRS and multiple DL PRS is another DL PRS resource, and wherein a Transmission Reception Point (TRP) identifier of the multiple DL PRS is also the TRP identifier for the DL PRS resource used as the QCL source.

89. A non-transitory computer readable storage medium including program code stored thereon, the program code is operable to configure at least one processor in a serving base station for a user equipment (UE) configured for positioning for the UE, comprising:

program code to provide a configuration of at least one of multiple downlink (DL) Positioning Reference Signals (PRS), multiple uplink (UL) PRS, or a combination thereof to the UE;

program code to transmitting a single Medium Access Control-Control Element (MAC-CE) block to the UE that activates or deactivates in the UE at least one of transmissions of the multiple UL PRS; reception of the multiple DL PRS, or the combination thereof; and program code to receive or stop receiving from the UE the transmissions of the multiple UL PRS, transmit or stop transmitting to the UE multiple DL PRS, or a combination thereof in response to the single MAC-CE block.

Therefore, it is intended that claimed subject matter not be limited to the particular examples disclosed, but that such claimed subject matter may also include all aspects falling within the scope of appended claims, and equivalents thereof.

What is claimed is:

1. A method for a user equipment (UE) positioning performed by the UE, comprising:

receiving a configuration of downlink (DL) Positioning reference Signals (PRS) resource sets from a network entity;

receiving a single Medium Access Control-Control Element (MAC-CE) block from a serving base station that activates or deactivates receptions of multiple DL PRS resource sets; and in response to the single MAC-CE block, activating or deactivating the receptions of the multiple DL PRS resource sets.

2. The method of claim 1, further comprising:

receiving a configuration of multiple uplink (UL) PRS resource sets for positioning from the network entity, wherein the single MAC-CE block activates or deactivates transmissions of the multiple UL PRS resource sets.

3. The method of claim 1, further comprising:

receiving a configuration of uplink (UL) PRS resource sets for positioning from the network entity, wherein the single MAC-CE block comprises a resource set identifier (ID) for each of the UL PRS resource sets or the multiple DL PRS resource sets, and further comprises a single bandwidth part (BWP) ID and a single component carrier (CC) ID for all of the UL PRS resource sets or the multiple DL PRS resource sets.

4. The method of claim 1, further comprising:

receiving a configuration of multiple uplink (UL) PRS resource sets for positioning from the network entity, wherein the single MAC-CE block comprises a resource set identifier (ID) for each of the multiple UL PRS resource sets or the multiple DL PRS resource sets, and further comprises a single activate/deactivate (A/D) bit for all of the multiple UL PRS resource sets or the multiple DL PRS resource sets.

5. The method of claim 1, further comprising:

receiving a configuration of uplink (UL) PRS resource sets for positioning from the network entity, wherein the single MAC-CE block comprises a resource set identifier (ID) for each of the UL PRS resource sets or the multiple DL PRS resource sets, and further comprises a single type or single case of spatial relation for all of the UL PRS resource sets or the multiple DL PRS resource sets.

6. The method of claim 1, further comprising:

receiving a configuration of uplink (UL) PRS resource sets for positioning from the network entity, receiving a Radio Resource Control (RRC) message that includes an indication of the UL PRS resource sets or the multiple DL PRS resource sets;

wherein the single MAC-CE block comprises an identifier of one or more of the UL PRS resource sets or the multiple DL PRS resource sets indicated by the RRC message.

7. The method of claim 1, further comprising:

receiving a configuration of uplink (UL) PRS resource sets for positioning from the network entity, wherein the single MAC-CE block comprises a resource set identifier (ID) for each of the UL PRS resource sets or the multiple DL PRS resource sets, and further comprises a single spatial relation information identifier for all of the UL PRS resource sets or the multiple DL PRS resource sets.

8. The method of claim 1, further comprising:

receiving a configuration of uplink (UL) PRS resource sets for positioning from the network entity, receiving a Radio Resource Control (RRC) message that includes an indication of the UL PRS resource sets and the multiple DL PRS resource sets;

wherein the single MAC-CE block comprises an identifier of the UL PRS resource sets and the multiple DL PRS resource sets indicated by the RRC message, wherein at least one UL PRS and at least one DL PRS are jointly activated or deactivated using the single MAC-CE block.

9. The method of claim 1, further comprising:

receiving a configuration of uplink (UL) PRS resource sets for positioning from the network entity, wherein the single MAC-CE block comprises a single Quasi Co-Location source that applies to the UL PRS resource sets and the multiple DL PRS resource sets.

10. The method of claim 1, further comprising:

receiving a configuration of uplink (UL) PRS resource sets for positioning from the network entity, wherein the single MAC-CE block activates or deactivates transmissions of at least one UL Sounding Reference Signal (SRS) for positioning.

11. A user equipment (UE) configured to perform positioning, comprising:

at least one wireless transceiver configured to wirelessly communicate with a wireless network; and at least one processor coupled to the at least one wireless transceiver and configured to:

receive, via the at least one wireless transceiver, a configuration of downlink (DL) Positioning Reference Signals (PRS) resource sets from a network entity;

receive, via the at least one wireless transceiver, a single Medium Access Control-Control Element (MAC-CE) block from a serving base station that activates or deactivates receptions of multiple DL PRS resource sets; and in response to the single MAC-CE block, activate or deactivate the receptions of the multiple DL PRS resource sets.

12. The UE of claim 11, wherein the at least one processor is further configured to:

receive a configuration of uplink (UL) PRS resource sets for positioning from the network entity, wherein the single MAC-CE block activates or deactivates transmissions of multiple UL PRS resource sets.

13. The UE of claim 11, wherein the at least one processor is further configured to:

receive a configuration of uplink (UL) PRS resource sets for positioning from the network entity, wherein the single MAC-CE block comprises a resource set identifier (ID) for each of the UL PRS resource sets or the multiple DL PRS resource sets, and further comprises a single bandwidth part (BWP) ID and a single component carrier (CC) ID for all of the UL PRS resource sets or the multiple DL PRS resource sets.

14. The UE of claim 11, wherein the at least one processor is further configured to:

receive a configuration of uplink (UL) PRS resource sets for positioning from the network entity, wherein the single MAC-CE block comprises a resource set identifier (ID) for each of the UL PRS resource sets or the multiple DL PRS resource sets, and further comprises a single activate/deactivate (A/D) bit for all of the UL PRS resource sets or the multiple DL PRS resource sets.

15. The UE of claim 11, wherein the at least one processor is further configured to:

receive a configuration of uplink (UL) PRS resource sets for positioning from the network entity, wherein the single MAC-CE block comprises a resource set identifier (ID) for each of the UL PRS resource sets or the multiple DL PRS resource sets, and further comprises a single type or single case of spatial relation for all of the UL PRS resource sets or the multiple DL PRS resource sets.

16. The UE of claim 11, wherein the at least one processor is further configured to:

receive a configuration of uplink (UL) PRS resource sets for positioning from the network entity, receive, via the at least one wireless transceiver, a Radio Resource Control (RRC) message that includes an indication of the UL PRS resource sets or the multiple DL PRS resource sets;

wherein the single MAC-CE block comprises an identifier of one or more of the UL PRS resource sets or the multiple DL PRS resource sets indicated by the RRC message.

17. The UE of claim 11, wherein the at least one processor is further configured to:

receive a configuration of uplink (UL) PRS resource sets for positioning from the network entity, wherein the single MAC-CE block comprises a resource set identifier (ID) for each of the UL PRS resource sets or the DL PRS resource sets, and further comprises a single spatial relation information identifier for all of the UL PRS resource sets or the multiple DL PRS resource sets.

18. The UE of claim 11, wherein the at least one processor is further configured to:

receive a configuration of uplink (UL) PRS resource sets for positioning from the network entity, receive, via the at least one wireless transceiver, a Radio Resource Control (RRC) message that includes an indication of the UL PRS resource sets and the multiple DL PRS resource sets;

wherein the single MAC-CE block comprises an identifier of the UL PRS resource sets and the multiple DL PRS resource sets indicated by the RRC message, wherein at least one UL PRS and at least one DL PRS are jointly activated or deactivated using the single MAC-CE block.

19. The UE of claim 11, wherein the at least one processor is further configured to:

receive a configuration of uplink (UL) PRS resource sets for positioning from the network entity, wherein the single MAC-CE block comprises a single Quasi Co-Location source that applies to the UL PRS resource sets and the multiple DL PRS resource sets.

20. The UE of claim 11, wherein the at least one processor is further configured to:

receive a configuration of uplink (UL) PRS resource sets for positioning from the network entity, wherein the single MAC-CE block activates or deactivates transmissions of at least one UL Sounding Reference Signal (SRS) for positioning.

21. A method for a user equipment (UE) positioning performed by a serving base station for the UE, comprising:

providing a configuration of multiple downlink (DL) Positioning Reference Signals (PRS) resource sets to the UE;

transmitting a single Medium Access Control-Control Element (MAC-CE) block to the UE that activates or deactivates, in the UE, receptions of the multiple DL PRS resource sets; and in response to transmitting the single MAC-CE block, transmitting or stop transmitting the multiple DL PRS resource sets.

22. The method of claim 21, further comprising:

providing a configuration of multiple uplink (UL) PRS resource sets for positioning from the serving base station, wherein the single MAC-CE block activates or deactivates, in the UE, transmission of the multiple UL PRS resource sets; and in response to the single MAC-CE block, receiving or stop receiving from the UE the transmissions of the multiple UL PRS sets.

23. The method of claim 21, further comprising:

providing a configuration of multiple uplink (UL) PRS resource sets for positioning from the serving base station, wherein the single MAC-CE block activates or deactivates, in the UE, transmissions of the multiple UL PRS resource sets for positioning and reception of the multiple DL PRS resource sets.

24. The method of claim 21, further comprising:

providing a configuration of multiple uplink (UL) PRS resource sets for positioning from the serving base station, wherein the single MAC-CE block comprises a resource set identifier (ID) for each of the multiple UL PRS resource sets or the multiple DL PRS resource sets, and further comprises a single bandwidth part

53

(BWP) ID and a single component carrier (CC) ID for all of the multiple UL PRS resource sets or the multiple DL PRS resource sets.

25. The method of claim 21, further comprising:

providing a configuration of multiple uplink (UL) PRS resource sets for positioning from the serving base station, wherein the single MAC-CE block comprises a resource set identifier (ID) for each of the multiple UL PRS resource sets or the multiple DL PRS resource sets, and further comprises a single activate/deactivate (A/D) bit for all of the multiple UL PRS resource sets or the multiple DL PRS resource sets.

26. The method of claim 21, further comprising:

providing a configuration of multiple uplink (UL) PRS resource sets for positioning from the serving base station, wherein the single MAC-CE block comprises a resource set identifier (ID) for each of the multiple UL PRS resource sets or the multiple DL PRS resource sets, and further comprises a single type or a single case of spatial relation for all of the multiple UL PRS resource sets or the multiple DL PRS resource sets.

27. The method of claim 21, further comprising:

providing a configuration of multiple uplink (UL) PRS resource sets for positioning from the serving base station, transmitting a Radio Resource Control (RRC) message that includes an indication of the UL PRS resource sets or the multiple DL PRS resource sets;

wherein the single MAC-CE block comprises an identifier of one or more of the UL PRS resource sets or the multiple DL PRS resource sets indicated by the RRC message.

28. The method of claim 21, further comprising:

providing a configuration of multiple uplink (UL) PRS resource sets for positioning from the serving base station, wherein the single MAC-CE block comprises a resource set identifier (ID) for each of the multiple UL PRS resource sets or the multiple DL PRS resource sets, and further comprises a single spatial relation information identifier for all of the multiple UL PRS resource sets or the multiple DL PRS resource sets.

29. The method of claim 21, further comprising:

providing a configuration of multiple uplink (UL) PRS resource sets for positioning from the serving base station, transmitting a Radio Resource Control (RRC) message that includes an indication of the multiple UL PRS resource sets and the multiple DL PRS resource sets;

wherein the single MAC-CE block comprises an identifier of the multiple UL PRS resource sets and the multiple DL PRS resource sets indicated by the RRC message, wherein at least one UL PRS and at least one DL PRS are jointly activated or deactivated using the single MAC-CE block.

30. The method of claim 21, further comprising:

providing a configuration of multiple uplink (UL) PRS resource sets for positioning from the serving base station, wherein the single MAC-CE block comprises a single Quasi Co-Location source that applies to the multiple UL PRS resource sets and the multiple DL PRS resource sets.

31. The method of claim 21, further comprising:

providing a configuration of uplink (UL) PRS resource sets for positioning from the serving base station, wherein the single MAC-CE block activates or deactivates transmissions of at least one UL Sounding Reference Signal (SRS) for positioning.

32. A serving base station for a user equipment (UE) configured for positioning for the UE, comprising:

at least one wireless transceiver configured to wirelessly communicate with the UE; and at least one processor coupled to the at least one wireless transceiver and configured to:

provide, via the at least one wireless transceiver, a configuration of multiple downlink (DL) Positioning Reference Signals (PRS) resource sets to the UE;

transmit, via the at least one wireless transceiver, a single Medium Access Control-Control Element (MAC-CE) block to the UE that activates or deactivates, in the UE, receptions of the multiple DL PRS resource sets; and in response to the single MAC-CE block, transmit or stop transmitting the multiple DL PRS resource sets.

33. The serving base station of claim 32, wherein the at least one processor is further configured to:

provide a configuration of multiple uplink (UL) PRS resource sets for positioning from the serving base station, wherein the single MAC-CE block activates or deactivates, in the UE, transmissions of the multiple UL PRS resource sets, wherein each UL PRS resource set in the UL PRS resource sets comprises at least one PRS resource, and in response, the at least one processor is configured to receive or stop receiving the transmissions of the multiple UL PRS resource sets; and in response to the single MAC-CE block, receive or stop receiving from the UE the transmissions of the multiple UL PRS resource sets.

34. The serving base station of claim 32, wherein the at least one processor is further configured to:

provide a configuration of multiple uplink (UL) PRS resource sets for positioning from the serving base station, wherein the single MAC-CE block activates or deactivates, in the UE, transmission of the multiple UL PRS resource sets for positioning and reception of the multiple DL PRS resource sets.

35. The serving base station of claim 32, wherein the at least one processor is further configured to:

provide a configuration of uplink (UL) PRS resource sets for positioning from the serving base station, wherein the single MAC-CE block comprises a resource set identifier (ID) for each of the UL PRS resource sets or the multiple DL PRS resource sets, and further comprises a single bandwidth part (BWP) ID and a single component carrier (CC) ID for all of the UL PRS resource sets or the multiple DL PRS resource sets.

36. The serving base station of claim 32, wherein the at least one processor is further configured to:

provide a configuration of multiple uplink (UL) PRS resource sets for positioning from the serving base station, wherein the single MAC-CE block comprises a resource set identifier (ID) for each of the multiple UL PRS resource sets or the multiple DL PRS resource sets, and further comprises a single activate/deactivate (A/D) bit for all of the multiple UL PRS resource sets or the multiple DL PRS resource sets.

37. The serving base station of claim 32, wherein the at least one processor is further configured to:

provide a configuration of uplink (UL) PRS resource sets for positioning from the serving base station, wherein the single MAC-CE block comprises a resource set identifier (ID) for each of the UL PRS resource sets or the multiple DL PRS resource sets, and further comprises a single type or a single case of spatial relation for all of the UL PRS resource sets or the multiple DL PRS resource sets.

38. The serving base station of claim 32, wherein the at least one processor is further configured to:

provide a configuration of uplink (UL) PRS resource sets for positioning from the serving base station, transmit, via the at least one wireless transceiver, a Radio Resource Control (RRC) message that includes an indication of the UL PRS resource sets or the multiple DL PRS resource sets;

wherein the single MAC-CE block comprises an identifier of one or more of the UL PRS resource sets or the multiple DL PRS resource sets indicated by the RRC message.

39. The serving base station of claim 32, wherein the at least one processor is further configured to:

provide a configuration of uplink (UL) PRS resource sets for positioning from the serving base station, wherein the single MAC-CE block comprises a resource set identifier (ID) for each of the UL PRS resource sets or the multiple DL PRS resource sets, and further comprises a single spatial relation information identifier for all of the UL PRS resource sets or the multiple DL PRS resource sets.

40. The serving base station of claim 32, wherein the at least one processor is further configured to:

provide a configuration of uplink (UL) PRS resource sets for positioning from the serving base station, transmit, via the at least one wireless transceiver, a Radio Resource Control (RRC) message that includes an indication of the UL PRS resource sets and the multiple DL PRS resource sets;

wherein the single MAC-CE block comprises an identifier of the UL PRS resource sets and the multiple DL PRS resource sets indicated by the RRC message, wherein at least one UL PRS and at least one DL PRS are jointly activated or deactivated using the single MAC-CE block.

41. The serving base station of claim 32, wherein the at least one processor is further configured to:

provide a configuration of uplink (UL) PRS resource sets for positioning from the serving base station, wherein the single MAC-CE block comprises a single Quasi Co-Location source that applies to the UL PRS resource sets and the multiple DL PRS resource sets.

42. The serving base station of claim 32, wherein the at least one processor is further configured to:

provide a configuration of uplink (UL) PRS resource sets for positioning from the serving base station, wherein the single MAC-CE block activates or deactivates transmissions of at least one UL Sounding Reference Signal (SRS) for positioning.

* * * * *